(12) United States Patent
Renaud et al.

(10) Patent No.: US 9,677,294 B2
(45) Date of Patent: Jun. 13, 2017

(54) POOL CLEANING DEVICE WITH WHEEL DRIVE ASSEMBLIES

(71) Applicant: Hayward Industries, Inc., Elizabeth, NJ (US)

(72) Inventors: Benoit Joseph Renaud, Fort Atkinson, WI (US); Seth Darrell Renigar, Winston-Salem, NC (US); Graham M. Hayes, Bermuda Run, NC (US); Omar E. Osuna, Clemmons, NC (US)

(73) Assignee: Hayward Industries, Inc., Elizabeth, NJ (US)

( * ) Notice: Subject to any disclaimer, the term of this patent is extended or adjusted under 35 U.S.C. 154(b) by 39 days.

(21) Appl. No.: 14/204,548

(22) Filed: Mar. 11, 2014

(65) Prior Publication Data

US 2014/0259464 A1 Sep. 18, 2014

Related U.S. Application Data

(60) Provisional application No. 61/799,128, filed on Mar. 15, 2013, provisional application No. 61/883,407, filed on Sep. 27, 2013.

(51) Int. Cl.
*E04H 4/16* (2006.01)
*B60B 37/10* (2006.01)

(52) U.S. Cl.
CPC .......... *E04H 4/1654* (2013.01); *B60B 37/10* (2013.01)

(58) Field of Classification Search
CPC ........ E04H 4/16; E04H 4/1654; E04H 4/1663
USPC ........ 15/1.7; 301/5.301, 5.302, 5.305, 5.309, 301/6.1; 4/490; 16/18 R–18 B
See application file for complete search history.

(56) References Cited

U.S. PATENT DOCUMENTS

| 389,790 | A |   | 9/1888 | Boutell |
|---|---|---|---|---|
| 1,639,170 | A |   | 8/1927 | Fell |
| D144,063 | S |   | 3/1946 | McAllister |
| 2,479,538 | A | * | 8/1949 | Liljenberg ............... B62K 9/02 |
|   |   |   |   | 280/282 |

(Continued)

FOREIGN PATENT DOCUMENTS

| AU |  704603 B2 |  4/1999 |
|---|---|---|
| AU | 1086599 A | 12/1999 |

(Continued)

OTHER PUBLICATIONS

International Search Report of the International Searching Authority mailed on Aug. 29, 2014, issued in connection with International Application No. PCT/US2014/023447, corresponding to U.S. Appl. No. 14/204,548 (4 pages).

(Continued)

*Primary Examiner* — Mark Spisich
(74) *Attorney, Agent, or Firm* — McCarter & English, LLP

(57) ABSTRACT

A drive system for a pool cleaner is disclosed, the drive system including a motor operatively connected relative to an axle for driving rotation of the axle. The axel in turn is connected to and drives the rotation of (i) a roller assembly including a roller for cleaning a target surface and (ii) a wheel drive assembly engaged with an idler gear for driving a wheel. Notably the axis of rotation of the roller assembly is different than the axis of rotation of the wheel. Thus, the wheel drive assembly may drive the wheel by interacting with a surface of a cylindrical flange of the wheel.

5 Claims, 65 Drawing Sheets

(56) References Cited

U.S. PATENT DOCUMENTS

| | | |
|---|---|---|
| D175,210 S | 7/1955 | Dreyfuss |
| 2,717,807 A * | 9/1955 | Kapp .................. A63H 17/262 |
| | | 301/1 |
| D176,635 S | 1/1956 | Shalvoy |
| 2,751,038 A | 6/1956 | Acheson |
| 2,751,068 A | 6/1956 | Haddox, Jr. |
| D186,872 S | 12/1959 | Swann |
| 3,019,462 A | 2/1962 | Nash et al. |
| 3,039,122 A | 6/1962 | Birdsall |
| 3,310,173 A | 3/1967 | Sosower |
| 3,321,787 A | 5/1967 | Myers |
| 3,324,492 A | 6/1967 | Myers |
| 3,337,889 A | 8/1967 | West |
| 3,347,386 A | 10/1967 | Kraissl, Jr. |
| 3,439,368 A | 4/1969 | Myers |
| RE26,741 E | 12/1969 | Myers |
| 3,551,930 A | 1/1971 | Myers |
| 3,665,942 A | 5/1972 | Moore |
| 3,676,885 A | 7/1972 | Wulc |
| 3,688,908 A | 9/1972 | Myers et al. |
| 3,689,408 A | 9/1972 | Edmiston et al. |
| 3,767,055 A | 10/1973 | Flatland |
| 3,769,729 A * | 11/1973 | Engler .................. G09F 21/045 |
| | | 301/37.25 |
| 3,794,052 A | 2/1974 | Koble, Jr. et al. |
| 3,797,508 A | 3/1974 | Jacobs |
| 3,805,815 A | 4/1974 | Goodin |
| 3,822,754 A | 7/1974 | Henkin et al. |
| 3,868,739 A | 3/1975 | Hargrave |
| 3,886,616 A | 6/1975 | Hayes |
| 3,921,654 A | 11/1975 | Pansini |
| 3,936,899 A | 2/1976 | Henkin et al. |
| 3,972,339 A | 8/1976 | Henkin et al. |
| 3,979,788 A | 9/1976 | Strausak |
| 4,009,675 A | 3/1977 | Zollner et al. |
| 4,040,864 A | 8/1977 | Steeves |
| 4,100,641 A | 7/1978 | Pansini |
| 4,152,802 A | 5/1979 | Chauvier |
| 4,154,680 A | 5/1979 | Sommer |
| 4,156,948 A | 6/1979 | Chauvier et al. |
| 4,168,557 A | 9/1979 | Rasch et al. |
| 4,193,156 A | 3/1980 | Chauvier |
| 4,208,752 A | 6/1980 | Hofmann |
| 4,240,174 A | 12/1980 | Thiem et al. |
| 4,281,995 A | 8/1981 | Pansini |
| 4,299,051 A | 11/1981 | Pauly et al. |
| 4,306,329 A | 12/1981 | Yokoi |
| D264,797 S | 6/1982 | Burglin et al. |
| 4,338,697 A | 7/1982 | Broadwater |
| 4,351,077 A | 9/1982 | Hofmann |
| 4,402,101 A | 9/1983 | van Zyl |
| 4,429,429 A | 2/1984 | Altschul |
| 4,431,538 A | 2/1984 | Selsted |
| 4,434,519 A | 3/1984 | Raubenheimer |
| 4,449,265 A | 5/1984 | Hoy |
| D279,227 S | 6/1985 | Price |
| 4,533,945 A | 8/1985 | Lauvray et al. |
| 4,536,908 A | 8/1985 | Raubenheimer |
| 4,558,479 A | 12/1985 | Greskovics et al. |
| 4,575,423 A | 3/1986 | Alanis et al. |
| 4,589,986 A | 5/1986 | Greskovics et al. |
| 4,618,420 A | 10/1986 | Alanis |
| 4,645,593 A | 2/1987 | Dunk et al. |
| 4,651,376 A | 3/1987 | Ford |
| 4,652,366 A | 3/1987 | Brooks |
| 4,656,683 A | 4/1987 | Raubenheimer |
| 4,692,956 A | 9/1987 | Kassis |
| 4,761,848 A | 8/1988 | Hofmann |
| 4,768,532 A | 9/1988 | Johnson |
| 4,769,867 A | 9/1988 | Stoltz |
| 4,776,953 A | 10/1988 | Frentzel |
| 4,776,954 A | 10/1988 | Brooks |
| 4,778,599 A | 10/1988 | Brooks |
| 4,802,592 A | 2/1989 | Wessels |
| 4,807,318 A | 2/1989 | Kallenbach |
| 4,839,063 A | 6/1989 | Brooks |
| 4,849,024 A | 7/1989 | Supra |
| D304,505 S | 11/1989 | Maier et al. |
| 4,920,599 A | 5/1990 | Rief |
| 4,950,393 A | 8/1990 | Goettl |
| 4,959,146 A | 9/1990 | Kristan |
| 4,962,559 A | 10/1990 | Schuman |
| 4,994,178 A | 2/1991 | Brooks |
| D315,624 S | 3/1991 | Kimura et al. |
| 5,001,800 A | 3/1991 | Parenti et al. |
| 5,014,382 A | 5/1991 | Kallenbach |
| 5,033,148 A | 7/1991 | Chauvier et al. |
| 5,093,950 A | 3/1992 | Heier |
| 5,097,559 A | 3/1992 | Brunt et al. |
| 5,099,535 A | 3/1992 | Chauvier et al. |
| 5,105,496 A | 4/1992 | Gray, Jr. et al. |
| 5,133,503 A | 7/1992 | Giordano et al. |
| 5,133,854 A | 7/1992 | Horvath |
| D328,778 S | 8/1992 | Gefter et al. |
| 5,143,605 A | 9/1992 | Masciarelli |
| D330,582 S | 10/1992 | Gefter et al. |
| 5,169,236 A | 12/1992 | Iest |
| 5,172,445 A | 12/1992 | Chandler |
| 5,197,158 A | 3/1993 | Moini |
| 5,226,205 A | 7/1993 | Pearce |
| 5,245,723 A | 9/1993 | Sommer |
| 5,265,297 A | 11/1993 | Gould et al. |
| 5,269,913 A | 12/1993 | Atkins |
| 5,293,659 A | 3/1994 | Rief et al. |
| D349,150 S | 7/1994 | Garrigos Ruiz |
| 5,329,648 A | 7/1994 | Davey |
| 5,337,434 A | 8/1994 | Erlich |
| 5,342,513 A | 8/1994 | Wall et al. |
| 5,351,355 A | 10/1994 | Chiniara |
| 5,352,358 A | 10/1994 | Davey |
| 5,364,512 A | 11/1994 | Earl |
| 5,398,362 A | 3/1995 | Chauvier |
| 5,412,826 A | 5/1995 | Raubenheimer |
| 5,435,031 A | 7/1995 | Minami et al. |
| 5,450,644 A | 9/1995 | Berman |
| 5,450,645 A | 9/1995 | Atkins |
| 5,454,129 A | 10/1995 | Kell |
| 5,507,058 A | 4/1996 | Minami et al. |
| 5,507,068 A | 4/1996 | Fan et al. |
| D373,230 S | 8/1996 | Sebor et al. |
| 5,546,982 A | 8/1996 | Clark et al. |
| 5,554,277 A | 9/1996 | Rief et al. |
| 5,569,371 A | 10/1996 | Perling |
| D376,450 S | 12/1996 | Campbell et al. |
| 5,603,135 A | 2/1997 | Jones et al. |
| 5,604,950 A | 2/1997 | Stern |
| 5,617,600 A | 4/1997 | Frattini et al. |
| 5,634,229 A | 6/1997 | Stoltz |
| 5,645,721 A | 7/1997 | Carroll, Jr. |
| D384,782 S | 10/1997 | Gefter |
| 5,681,110 A | 10/1997 | Burzacchi |
| 5,716,107 A * | 2/1998 | Parker .................... B60B 37/10 |
| | | 301/111.07 |
| 5,720,068 A | 2/1998 | Clark et al. |
| 5,768,734 A * | 6/1998 | Dietrich ................ E04H 4/1618 |
| | | 15/1.7 |
| 5,771,987 A | 6/1998 | Marbach |
| 5,788,850 A | 8/1998 | Tuomey |
| 5,794,293 A | 8/1998 | Hoffinger |
| 5,797,156 A | 8/1998 | Sebor |
| 5,802,653 A | 9/1998 | Roumagnac |
| 5,810,999 A | 9/1998 | Bachand et al. |
| D400,319 S | 10/1998 | Hofheins et al. |
| 5,830,350 A | 11/1998 | Voss et al. |
| 5,842,243 A | 12/1998 | Horvath et al. |
| 5,863,425 A | 1/1999 | Herlehy et al. |
| D408,104 S | 4/1999 | Adam |
| 5,893,188 A | 4/1999 | Campbell et al. |
| 5,896,610 A | 4/1999 | Sebor et al. |
| 5,930,856 A | 8/1999 | Van Der Meyden et al. |
| 5,933,899 A | 8/1999 | Campbell et al. |
| 5,935,179 A | 8/1999 | Kleiner et al. |
| 5,961,822 A | 10/1999 | Polimeni, Jr. |
| 5,970,557 A | 10/1999 | Supra |

(56) References Cited

U.S. PATENT DOCUMENTS

| | | |
|---|---|---|
| D417,047 S | 11/1999 | Tsuda |
| D417,322 S | 11/1999 | Hollinger |
| 5,985,156 A | 11/1999 | Henkin et al. |
| 5,996,906 A | 12/1999 | Cooper |
| 6,003,184 A | 12/1999 | Campbell et al. |
| D418,640 S | 1/2000 | Veloskey et al. |
| 6,013,178 A | 1/2000 | Strano et al. |
| D421,512 S | 3/2000 | Campbell |
| 6,039,886 A | 3/2000 | Henkin et al. |
| 6,049,933 A | 4/2000 | McLaughlin |
| 6,090,219 A | 7/2000 | Henkin et al. |
| D429,393 S | 8/2000 | Rief et al. |
| 6,094,764 A | 8/2000 | Veloskey et al. |
| 6,099,658 A | 8/2000 | Porat |
| 6,112,354 A | 9/2000 | Stoltz et al. |
| 6,115,864 A | 9/2000 | Davidsson et al. |
| 6,119,293 A | 9/2000 | Phillipson et al. |
| 6,119,707 A | 9/2000 | Jordan |
| 6,125,492 A | 10/2000 | Prowse |
| 6,131,227 A | 10/2000 | Rief et al. |
| D433,545 S | 11/2000 | Hollinger et al. |
| 6,155,657 A | 12/2000 | Erlich et al. |
| 6,193,885 B1 | 2/2001 | Campbell |
| 6,199,237 B1 | 3/2001 | Budden |
| 6,200,487 B1 | 3/2001 | Denkewicz, Jr. et al. |
| 6,206,547 B1 | 3/2001 | Erlich |
| 6,212,725 B1 | 4/2001 | Porat |
| 6,238,553 B1 | 5/2001 | Lin |
| D443,737 S | 6/2001 | Rief et al. |
| D444,280 S | 6/2001 | Rief et al. |
| D445,225 S | 7/2001 | Schaub |
| 6,280,611 B1 | 8/2001 | Henkin et al. |
| 6,292,970 B1 | 9/2001 | Rief et al. |
| 6,294,084 B1 | 9/2001 | Henkin et al. |
| 6,299,699 B1 | 10/2001 | Porat et al. |
| 6,309,468 B1 | 10/2001 | Sommer |
| 6,311,353 B1 | 11/2001 | Phillipson et al. |
| 6,357,478 B1 | 3/2002 | Campbell et al. |
| 6,365,039 B1 | 4/2002 | Henkin et al. |
| 6,387,250 B1 | 5/2002 | Henkin et al. |
| 6,398,878 B1 | 6/2002 | Henkin et al. |
| 6,409,916 B1 | 6/2002 | Zelas et al. |
| 6,412,133 B1 | 7/2002 | Erlich et al. |
| 6,473,927 B1 | 11/2002 | Sommer |
| 6,473,928 B1 | 11/2002 | Veloskey et al. |
| 6,485,638 B2 | 11/2002 | Henkin et al. |
| D469,589 S | 1/2003 | Wichmann et al. |
| 6,502,269 B1 | 1/2003 | Balchan et al. |
| D471,330 S | 3/2003 | Campbell |
| 6,564,417 B2 | 5/2003 | Porat |
| 6,601,255 B1 | 8/2003 | van der Meyden et al. |
| 6,627,074 B2 | 9/2003 | Lincke |
| D481,181 S | 10/2003 | Lath et al. |
| 6,645,375 B2 | 11/2003 | Henkin et al. |
| 6,652,742 B2 | 11/2003 | Henkin et al. |
| 6,665,900 B2 | 12/2003 | Wichmann et al. |
| RE38,479 E | 3/2004 | Henkin et al. |
| 6,725,489 B1 | 4/2004 | Zell |
| 6,740,233 B2 | 5/2004 | Stoltz et al. |
| 6,742,613 B2 | 6/2004 | Erlich et al. |
| 6,751,822 B2 | 6/2004 | Phillipson et al. |
| 6,758,226 B2 | 7/2004 | Porat |
| 6,782,578 B1 | 8/2004 | Rief et al. |
| 6,802,963 B2 | 10/2004 | Campbell |
| 6,842,931 B2 | 1/2005 | Porat et al. |
| 6,854,148 B1 | 2/2005 | Rief et al. |
| 6,886,205 B1 | 5/2005 | Pichon |
| 6,942,790 B1 | 9/2005 | Dolton |
| 6,954,960 B2 | 10/2005 | Pichon |
| 6,965,814 B2 | 11/2005 | Hadari |
| 6,971,136 B2 | 12/2005 | Horvath et al. |
| 6,979,400 B2 | 12/2005 | Bauckman et al. |
| 7,001,159 B2 | 2/2006 | Peterson, Jr. et al. |
| 7,039,980 B2 | 5/2006 | Van Der Meyden et al. |
| 7,080,424 B2 | 7/2006 | Kallenbach et al. |
| D526,101 S | 8/2006 | Blanc-Tailleur |
| 7,103,449 B2 | 9/2006 | Woo et al. |
| D529,669 S | 10/2006 | Blanc-Tailleur |
| 7,117,554 B2 | 10/2006 | Pichon |
| 7,118,632 B2 | 10/2006 | Sumonthee |
| 7,118,678 B2 | 10/2006 | Porat |
| 7,143,502 B2 | 12/2006 | Porat et al. |
| 7,145,074 B2 | 12/2006 | Henkin et al. |
| 7,165,284 B2 | 1/2007 | Erlich et al. |
| D537,576 S | 2/2007 | Koury et al. |
| 7,207,604 B2 | 4/2007 | Wilson |
| 7,208,083 B2 | 4/2007 | Meritt-Powell |
| 7,213,287 B2 | 5/2007 | Hui |
| D550,906 S | 9/2007 | Fritz et al. |
| 7,273,546 B2 | 9/2007 | Meritt-Powell |
| 7,316,751 B2 | 1/2008 | Horvath et al. |
| 7,318,448 B2 | 1/2008 | Fleischer et al. |
| 7,395,571 B2 | 7/2008 | Van Der Meijden et al. |
| D575,915 S | 8/2008 | Dreyer |
| 7,501,056 B2 | 3/2009 | Henkin et al. |
| 7,504,025 B2 | 3/2009 | Burgassi |
| 7,507,332 B2 | 3/2009 | Henkin et al. |
| 7,515,991 B2 | 4/2009 | Egawa et al. |
| 7,543,607 B2 | 6/2009 | Henkin et al. |
| D598,168 S | 8/2009 | Sumonthee |
| 7,575,675 B2 | 8/2009 | Gopalan |
| D599,967 S | 9/2009 | Blanc-Tailleur |
| 7,661,381 B2 | 2/2010 | Gorelik et al. |
| 7,677,268 B2 | 3/2010 | Griffin et al. |
| 7,682,461 B2 | 3/2010 | Sommer et al. |
| 7,690,066 B2 | 4/2010 | Stoltz et al. |
| 7,721,370 B2 | 5/2010 | Gopalan |
| 7,723,934 B2 | 5/2010 | Adam et al. |
| 7,786,381 B2 | 8/2010 | Henkin et al. |
| 7,805,792 B2 | 10/2010 | Roumagnac |
| 7,827,643 B2 | 11/2010 | Erlich et al. |
| D630,808 S | 1/2011 | Dye et al. |
| D630,809 S | 1/2011 | Dye et al. |
| 7,867,389 B2 | 1/2011 | Hui |
| 7,900,308 B2 | 3/2011 | Erlich et al. |
| 7,908,696 B2 | 3/2011 | Pareti |
| 7,908,697 B2 | 3/2011 | Lavabre et al. |
| 8,007,653 B2 | 8/2011 | Porat |
| 8,117,704 B2 | 2/2012 | Schneider et al. |
| 8,266,752 B2 | 9/2012 | Henkin et al. |
| 8,296,891 B1 | 10/2012 | Rowam et al. |
| 8,307,485 B2 | 11/2012 | Sumonthee |
| 8,341,789 B2 | 1/2013 | Garti |
| 8,343,339 B2 | 1/2013 | Sumonthee |
| 8,393,033 B2 | 3/2013 | Pichon et al. |
| 8,402,585 B2 | 3/2013 | Rief et al. |
| 8,434,182 B2 | 5/2013 | Horvath et al. |
| 8,709,243 B2 | 4/2014 | Hui |
| 8,784,652 B2 | 7/2014 | Rief et al. |
| 2002/0104790 A1 | 8/2002 | Lincke |
| 2002/0116772 A1 | 8/2002 | Phillipson et al. |
| 2003/0106174 A1 | 6/2003 | Kallenbach et al. |
| 2003/0177594 A1 | 9/2003 | Van Der Meyden et al. |
| 2003/0182742 A1* | 10/2003 | Wichmann ............ E04H 4/1672 15/1.7 |
| 2004/0007522 A1 | 1/2004 | Garti |
| 2004/0010867 A1 | 1/2004 | Habif et al. |
| 2004/0021439 A1 | 2/2004 | Porat et al. |
| 2004/0025268 A1 | 2/2004 | Porat et al. |
| 2004/0074524 A1 | 4/2004 | Horvath et al. |
| 2004/0216251 A1 | 11/2004 | Van Der Meijden et al. |
| 2005/0029177 A1 | 2/2005 | Peterson et al. |
| 2005/0108836 A1 | 5/2005 | Rowan et al. |
| 2005/0123408 A1 | 6/2005 | Koehl |
| 2005/0262652 A1 | 12/2005 | Sumonthee |
| 2005/0274099 A1* | 12/2005 | Burns .................. A01D 34/001 56/17.2 |
| 2005/0279682 A1 | 12/2005 | Davidson et al. |
| 2006/0042688 A1 | 3/2006 | Sebor |
| 2006/0054229 A1 | 3/2006 | van der Meijden et al. |
| 2006/0059637 A1 | 3/2006 | Fridman et al. |
| 2006/0085929 A1 | 4/2006 | Deklinski |
| 2006/0101596 A1 | 5/2006 | Hui et al. |
| 2006/0177325 A1 | 8/2006 | Peterson et al. |

(56) References Cited

U.S. PATENT DOCUMENTS

| | | |
|---|---|---|
| 2006/0207041 A1 | 9/2006 | Van Der Meyden et al. |
| 2006/0225768 A1 | 10/2006 | Erlich et al. |
| 2007/0028405 A1 | 2/2007 | Garti |
| 2007/0056124 A1 | 3/2007 | Wichmann et al. |
| 2007/0067930 A1 | 3/2007 | Garti |
| 2007/0094817 A1 | 5/2007 | Stoltz et al. |
| 2007/0251032 A1 | 11/2007 | Pichon et al. |
| 2007/0251859 A1 | 11/2007 | Zhu |
| 2007/0272274 A1 | 11/2007 | Adam et al. |
| 2008/0060984 A1 | 3/2008 | Henkin et al. |
| 2008/0078039 A1 | 4/2008 | Katz |
| 2008/0087299 A1 | 4/2008 | Erlich et al. |
| 2008/0099409 A1 | 5/2008 | Gorelik et al. |
| 2008/0128343 A1 | 6/2008 | Garti |
| 2008/0202997 A1 | 8/2008 | Davidson et al. |
| 2008/0222821 A1 | 9/2008 | Pichon |
| 2008/0235887 A1 | 10/2008 | Horvath et al. |
| 2008/0236628 A1 | 10/2008 | Horvath et al. |
| 2008/0250580 A1 | 10/2008 | Lavabre et al. |
| 2008/0276388 A1 | 11/2008 | Dodd |
| 2008/0307589 A1 | 12/2008 | Schneider et al. |
| 2009/0045110 A1 | 2/2009 | Garti |
| 2009/0232701 A1 | 9/2009 | Porat |
| 2009/0255069 A1 | 10/2009 | Hui |
| 2009/0282627 A1 | 11/2009 | Porat |
| 2009/0301522 A1 | 12/2009 | Abehasera et al. |
| 2010/0011521 A1 | 1/2010 | Collins |
| 2010/0043154 A1 | 2/2010 | Kellogg |
| 2010/0058546 A1 | 3/2010 | Erlich |
| 2010/0065482 A1 | 3/2010 | Sumonthee |
| 2010/0122422 A1 | 5/2010 | Hui |
| 2010/0132136 A1 | 6/2010 | Sommer et al. |
| 2010/0306931 A1 | 12/2010 | Garti |
| 2011/0000030 A1 | 1/2011 | Pichon et al. |
| 2011/0000031 A1 | 1/2011 | Pichon et al. |
| 2011/0000032 A1 | 1/2011 | Pichon et al. |
| 2011/0000033 A1 | 1/2011 | Pichon et al. |
| 2011/0000034 A1 | 1/2011 | Pichon et al. |
| 2011/0000035 A1 | 1/2011 | Pichon et al. |
| 2011/0000036 A1 | 1/2011 | Pichon et al. |
| 2011/0005009 A1 | 1/2011 | Pichon et al. |
| 2011/0016646 A1 | 1/2011 | Pichon et al. |
| 2011/0020139 A1 | 1/2011 | Pichon et al. |
| 2011/0023247 A1 | 2/2011 | Pichon et al. |
| 2011/0047727 A1 | 3/2011 | Pichon et al. |
| 2011/0067729 A1 | 3/2011 | Erlich et al. |
| 2011/0088181 A1 | 4/2011 | Rief et al. |
| 2011/0088182 A1 | 4/2011 | Hui |
| 2011/0154585 A1 | 6/2011 | Mastio et al. |
| 2011/0154586 A1 | 6/2011 | Mastio et al. |
| 2011/0155186 A1 | 6/2011 | Mastio et al. |
| 2011/0162683 A1 | 7/2011 | Mastio et al. |
| 2011/0197932 A1 | 8/2011 | Mastio et al. |
| 2011/0203060 A1 | 8/2011 | Pichon et al. |
| 2011/0301752 A1 | 12/2011 | Finezilber |
| 2011/0302728 A1 | 12/2011 | Sumonthee |
| 2011/0314617 A1 | 12/2011 | Van Der Meijden et al. |
| 2012/0060307 A1 | 3/2012 | Stoltz |
| 2012/0074050 A1 | 3/2012 | Rief et al. |
| 2012/0103365 A1 | 5/2012 | Sumonthee |
| 2012/0210527 A1 | 8/2012 | Erlich et al. |
| 2012/0279001 A1 | 11/2012 | Fu et al. |
| 2013/0031734 A1 | 2/2013 | Porat et al. |
| 2013/0091641 A1 | 4/2013 | Ben Zion |
| 2013/0092193 A1* | 4/2013 | Porat ............... B08B 9/093 134/22.1 |
| 2013/0152316 A1 | 6/2013 | Rief et al. |
| 2014/0042063 A1 | 2/2014 | Rief |
| 2014/0115796 A1 | 5/2014 | Sebor et al. |
| 2014/0165306 A1* | 6/2014 | Hui ............... E04H 4/1654 15/1.7 |
| 2015/0020322 A1 | 1/2015 | Rief et al. |
| 2015/0020368 A1 | 1/2015 | Rief et al. |
| 2015/0059106 A1 | 3/2015 | Rief et al. |
| 2015/0076048 A1 | 3/2015 | Rief et al. |
| 2015/0267432 A1 | 9/2015 | Erlich et al. |

FOREIGN PATENT DOCUMENTS

| | | | |
|---|---|---|---|
| AU | 156881 | B2 | 1/2003 |
| AU | 2010302872 | A1 | 5/2012 |
| CA | 2299581 | A1 | 12/1999 |
| CN | 103089040 | A | 5/2013 |
| DE | 2612043 | A1 | 9/1977 |
| DE | 3003698 | * | 8/1981 |
| DE | 3110203 | A1 | 9/1982 |
| EP | 0314259 | A2 | 5/1989 |
| EP | 0323883 | A1 | 7/1989 |
| EP | 0426365 | A1 | 5/1991 |
| EP | 0268876 | A1 | 1/1992 |
| EP | 0656226 | A1 | 10/1993 |
| EP | 0657603 | A1 | 6/1995 |
| EP | 0990749 | A2 | 4/2000 |
| EP | 0990750 | A2 | 4/2000 |
| EP | 1002173 | A1 | 5/2000 |
| EP | 1122382 | A1 | 8/2001 |
| EP | 1489249 | A2 | 12/2004 |
| EP | 1785552 | A2 | 5/2007 |
| EP | 1849934 | A1 | 10/2007 |
| EP | 1921229 | A2 | 5/2008 |
| EP | 2275626 | A2 | 1/2011 |
| EP | 2292876 | A2 | 3/2011 |
| EP | 2484847 | A1 | 8/2012 |
| ES | 2384076 | T3 | 6/2012 |
| ES | 2 374 887 | | 1/2013 |
| ES | 2575219 | T3 | 6/2016 |
| FR | 2584442 | A1 | 1/1987 |
| FR | 2693499 | A1 | 1/1994 |
| FR | 2729995 | A1 | 8/1996 |
| FR | 2864129 | A1 | 6/2005 |
| FR | 2925557 | A1 | 6/2009 |
| FR | 2929310 | A1 | 10/2009 |
| GB | 283250 | * | 12/1927 |
| WO | 3700883 | A1 | 2/1987 |
| WO | 9009498 | A1 | 8/1990 |
| WO | 99/63185 | A1 | 12/1999 |
| WO | 0127415 | A1 | 4/2001 |
| WO | 0192664 | A1 | 12/2001 |
| WO | 01092663 | A1 | 12/2001 |
| WO | 03085225 | A1 | 10/2003 |
| WO | 2004038130 | A2 | 5/2004 |
| WO | 2005007998 | A2 | 1/2005 |
| WO | 2005118984 | A2 | 12/2005 |
| WO | 2006109118 | A1 | 10/2006 |
| WO | 2006121808 | A2 | 11/2006 |
| WO | 2007055960 | A2 | 5/2007 |
| WO | 2008096323 | A2 | 8/2008 |
| WO | 2008102325 | A1 | 8/2008 |
| WO | 2011038602 | A1 | 4/2011 |
| WO | 2011049594 | A1 | 4/2011 |
| WO | 2011/153551 | A1 | 12/2011 |
| WO | 2014052234 | A2 | 4/2014 |
| WO | 2015031150 | A1 | 3/2015 |
| ZA | 200000498 | B | 10/2000 |

OTHER PUBLICATIONS

Written Opinion mailed on Aug. 29, 2014, issued in connection with International Application No. PCT/US2014/023447, corresponding to U.S. Appl. No. 14/204,548 (5 pages).
Tiger Shark Owner's Manual (Mar. 2007) (16 pages).
Digital Image of Squirrel Cleaner (more than one year prior to Sep. 16, 2008) (1 page) Exact Date Unknown.
Digital Image of Pool Rover Cleaner (more than one year prior to Sep. 16, 2008) (1 page) Exact Date Unknown.
Digital Image of Robby Cleaner (more than one year prior to Sep. 16, 2008) (1 page) Exact Date Unknown.
Digital Image of Dolphin Cleaner (more than one year prior to Sep. 16, 2008) (1 page) Exact Date Unknown.
Digital Image of Merlin Cleaner (more than one year prior to Sep. 16, 2008) (1 page) Exact Date Unknown.

(56) References Cited

OTHER PUBLICATIONS

Digital Image of Aquabot Cleaner (more than one year prior to Sep. 16, 2008) (1 page) Exact Date Unknown.

Dolphin Supreme M4 Robotic Pool Cleaners (Cleaner seen at a show circa Oct. 2009) (5 pages) Exact Date Unknown.

Zodiac Cybernaut Manual (dated Sep. 3, 2006) (6 pages).

Polaris 9300 and Vortex 3 Cleaners (manuals dated Copyright 2010 and V3 cleaner seen at a show circa Oct. 2009) (125 pages) Exact Date Unknown.

Hexagone Cleaners (more than one year prior to Sep. 16, 2008) (8 pages).

Caratti Catalog (dated 2007) (8 pages).

Brock Catalog (dated 2005) (8 pages).

Dolphin Dx2 Hybrid Advertisement (dated 2009) (2 pages).

DX3 and DX4 Cleaners and Related Manuals (more than one year prior to Sep. 16, 2008) (17 pages) Exact Date Unknown.

Picture Sheet Showing Multiple Commercial Cleaners (more than one year prior to Sep. 16, 2008) (1 page) Exact Date Unknown.

Picture Sheet Showing Multiple Double-Wide Cleaners (more than one year prior to Sep. 16, 2008) (1 page) Exact Date Unknown.

Smartpool Nitro Robotic Pool Cleaner Operation Manual (more than one year prior to Sep. 16, 2008) (56 pages) Exact Date Unknown.

AquaBot Advertisement, Pool & Spa News (Oct. 2009) (2 pages).

Nave Cleaner (cleaner seen at show circa Oct./Nov. 2008) (25 pages) Exact Date Unknown.

Dolphin Two by Two Robot Pool Cleaner (more than one year prior to Sep. 16, 2008) (8 pages).

Hayward Tiger Shark Series Owner's Manual (16 pages) (more than one year prior to Nov. 2, 2009).

Cleaner shown at archive.org, link for Apr. 4, 2007 (2 sheets): http://web.archive.org/web/20070404093845/http:/www.mariner-3s.com/mariner_en/produkte/navigator/navigator.php.

YouTube Video of Mopper Cleaner, http://www.youtube.com/watch?=d8NAUWHOQCk&feature=BFa&list=ULopZLfx7W4Po, e.g., attached screen shots (45 pages).

Photo of Zodiac Pool Cleaner MX8, printed on Aug. 3, 2012 from www.zodiacpoolsystems.com.

* cited by examiner

Section 62-62

SECTION 68-68

POOL CLEANING DEVICE WITH WHEEL DRIVE ASSEMBLIES

CROSS-REFERENCE TO RELATED APPLICATIONS

The present application claims the benefit of priority to U.S. Provisional Patent Application No. 61/799,128, filed Mar. 15, 2013, and U.S. Provisional Patent Application No. 61/883,407, filed Sep. 27, 2013, the contents of both of which are incorporated herein by reference in their entirety for all purposes.

FIELD OF THE INVENTION

The present disclosure generally relates to apparatus for cleaning a pool. More particularly, exemplary embodiments of the disclosure relate to wheel and wheel drive assemblies for an automatic pool cleaning apparatus.

BACKGROUND OF THE INVENTION

Swimming pools commonly require a significant amount of maintenance. Beyond the treatment and filtration of pool water, the bottom wall (the "floor") and side walls of a pool (the floor and the side walls collectively, the "walls" of the pool) must be scrubbed regularly. Additionally, leaves and other debris often times elude a pool filtration system and settle on the bottom of the pool. Conventional means for scrubbing and/or cleaning a pool, e.g., nets, handheld vacuums, etc., require tedious and arduous efforts by the user, which can make owning a pool a commitment.

Automated pool cleaning devices, such as the TigerShark or TigerShark 2 by AquaVac, have been developed to routinely navigate over the pool surfaces, cleaning as they go. A pump system continuously circulates water through an internal filter assembly capturing debris therein. A rotating cylindrical roller (formed of foam and/or provided with a brush) can be included on the bottom of the unit to scrub the pool walls.

Automated pool cleaning devices that traverse surfaces to be cleaned are known. Notwithstanding, features which provide enhanced cleaner traversal of the surfaces to be cleaned, improve navigation and/or adapt a cleaner to a particular pool to achieve better efficiency and/or effectiveness remain a desirable objective.

SUMMARY OF THE INVENTION

The present disclosure relates to apparatus for facilitating operation of a pool cleaner in cleaning surfaces of a pool containing water.

In exemplary embodiments, a drive system for a pool cleaner is disclosed, the drive system including a motor operatively connected relative to an axle for driving rotation of the axle. In accordance with exemplary embodiments, the motor may be connected to a drive shaft which rotates a drive belt, which in turn rotates a bushing assembly that rotates the axle. The axle in turn is connected to and drives the rotation of (i) a roller assembly including a roller for cleaning a target surface and (ii) a wheel drive assembly engaged with an idler gear for driving a wheel. Notably the axis of rotation of the roller assembly is different than the axis of rotation of the wheel.

In some embodiments, the wheel drive assembly may drive the wheel by drivingly engaging the idler gear which interacts with a surface of a cylindrical flange of the wheel. Thus, the wheel drive assembly may include a drive gear that defines a first plurality of gear teeth for interacting with a second plurality of gear teeth defined by the idler gear, the second plurality of gear teeth for interacting with a third plurality of gear teeth around a cylindrical flange of the wheel. Advantageously, at least one of (i) the third plurality of the gear teeth and (ii) roots of the third plurality of the gear teeth may be angled with respect to the axis of rotation of the wheel.

In some embodiments, the wheel and the wheel drive assembly may be configured so that an outer circumference of the roller assembly and an outer circumference of the wheel are substantially tangent. In other embodiments, the wheel and wheel drive assembly may be configured so that a bottom of the roller is lower in elevation than a bottom of the wheel and/or so that, when the roller assembly is a front roller assembly and the wheel is a front wheel, a front of the roller assembly is back of a front of the wheel.

In some embodiments, the wheel may be part of a wheel assembly further including a wheel bushing and a wheel hub for defining a race for the wheel. The wheel assembly may further includes a wheel hub cap for securing the wheel with respect to the wheel race. In particular, the wheel hub cap may include a flange having one or more deflectable arms for locking the wheel hub cap into place with respect to an aperture in the wheel bushing. In some embodiments, the wheel hub cap may be interchangeable and/or may include cleaning capabilities.

In some embodiments, the wheel may include an interchangeable trim. The interchangeable trim.

In further exemplary embodiments, a drive system for a pool cleaner is disclosed, the drive system including a motor operatively connected relative to an axle for driving rotation of the axle wherein the axel is connected to and drives the rotation of a wheel drive assembly for driving an idler gear that is connected to an drives the rotation of a wheel, wherein the wheel drive assembly includes a drive gear that defines a first plurality of gear teeth for interacting with a second plurality of gear teeth defined by the idler gear, the second plurality of gear teeth for interacting with a third plurality of gear teeth around the inner circumferential surface of the wheel, wherein the third plurality of the gear teeth and/or the roots of the third plurality of the gear teeth are angled with respect to an axis of rotation of the wheel for facilitating the egress of debris from the wheel. In some embodiments the angling is such that the radial distance from the axis of rotation to the third plurality of the gear teeth and/or the roots of the third plurality of the gear teeth increases toward an open face of the wheel. Advantageously, the angling of the third plurality of the gear teeth and/or the roots of the third plurality of the gear teeth may be effective to promote removal of debris from around the third plurality of the gear teeth.

In further exemplary embodiments, a wheel assembly for a pool cleaner is disclosed, the wheel assembly including a wheel bushing and a wheel hub configured to cooperatively define a race for a wheel. The wheel bushing and the wheel hub may be operatively coupled relative to a structural element of the pool cleaner, e.g., relative to a side panel of a cleaner. More particularly, the wheel bushing and the wheel hub may each include a flange, wherein the flanges are inserted in opposite directions through an aperture in the structural element thereby defining the race. The race may be substantially cylindrical and may be configured for operative association with a first cylindrical flange of the wheel. In some embodiments, the structural element may define a cylindrical lip configured for association with a cylindrical slot defined in a base of the wheel hub.

In some embodiments, the wheel assembly may further include a wheel hub cap for securing a wheel with respect to the race. In particular, the wheel hub cap may include a flange having one or more deflectable arms for locking the wheel hub cap into place with respect to an aperture in the wheel bushing.

Additional features, functions and benefits of the disclosed apparatus, systems and methods will be apparent from the description which follows, particularly when read in conjunction with the appended figures.

BRIEF DESCRIPTION OF THE DRAWINGS

To assist those of ordinary skill in the art in making and using the disclosed apparatus, reference is made to the appended figures, wherein.

DETAILED DESCRIPTION OF EXEMPLARY EMBODIMENTS

According to the present disclosure, advantageous apparatus are provided for facilitating maintenance and operation of a pool cleaning device. More particularly, the present disclosure, includes, but is not limited to, discussion of a windowed top-access lid assembly for a pool cleaner, a bucket-type filter assembly for a pool cleaner, and quick-release roller assembly for a pool cleaner. These features are also disclosed in U.S. patent application Ser. No. 12/211,720, entitled, Apparatus for Facilitating Maintenance of a Pool Cleaning Device, published Mar. 18, 2010 as U.S. Patent Publication No. 2010/0065482, which application is incorporated herein by reference in its entirety. In addition, the cleaner may be provided with an adjustable buoyancy/weighting distribution which can be used to alter the dynamics (motion path) of the cleaner when used in a swimming pool, spa or other reservoir, as disclosed in U.S. patent application Ser. No. 12/938,041, entitled Pool Cleaning Device with Adjustable Buoyant Element, published May 3, 2012 as U.S. Patent Publication No. 2012/0103365, which application is incorporated herein by reference in its entirety.

Figure 1:
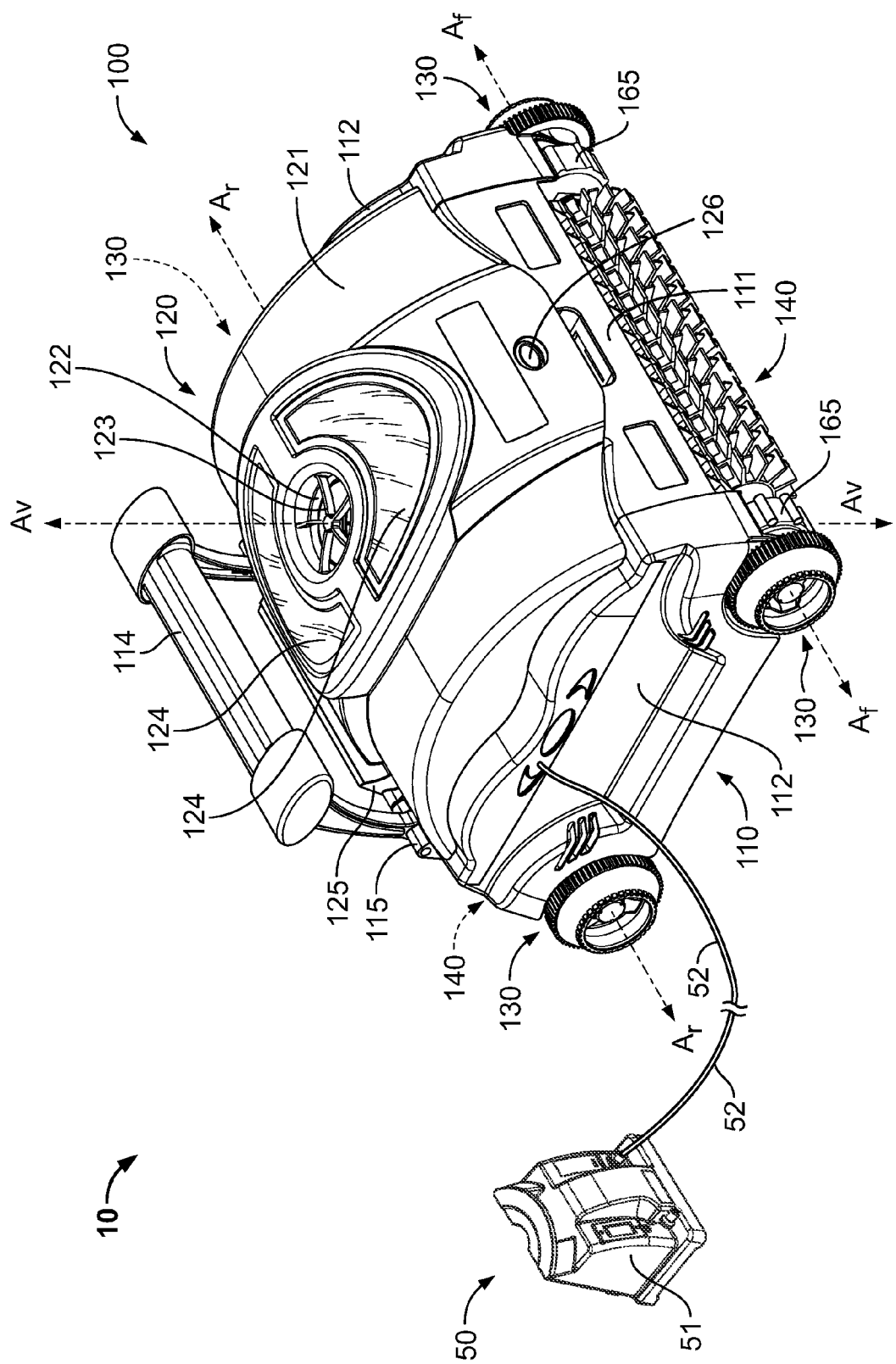
FIG. 1 depicts a front perspective view of an exemplary cleaner assembly having a cleaner and a power supply, the cleaner including a housing assembly, a lid assembly, a plurality of wheel assemblies, a plurality of roller assemblies, a motor drive assembly, and a filter assembly.
Figure 2:
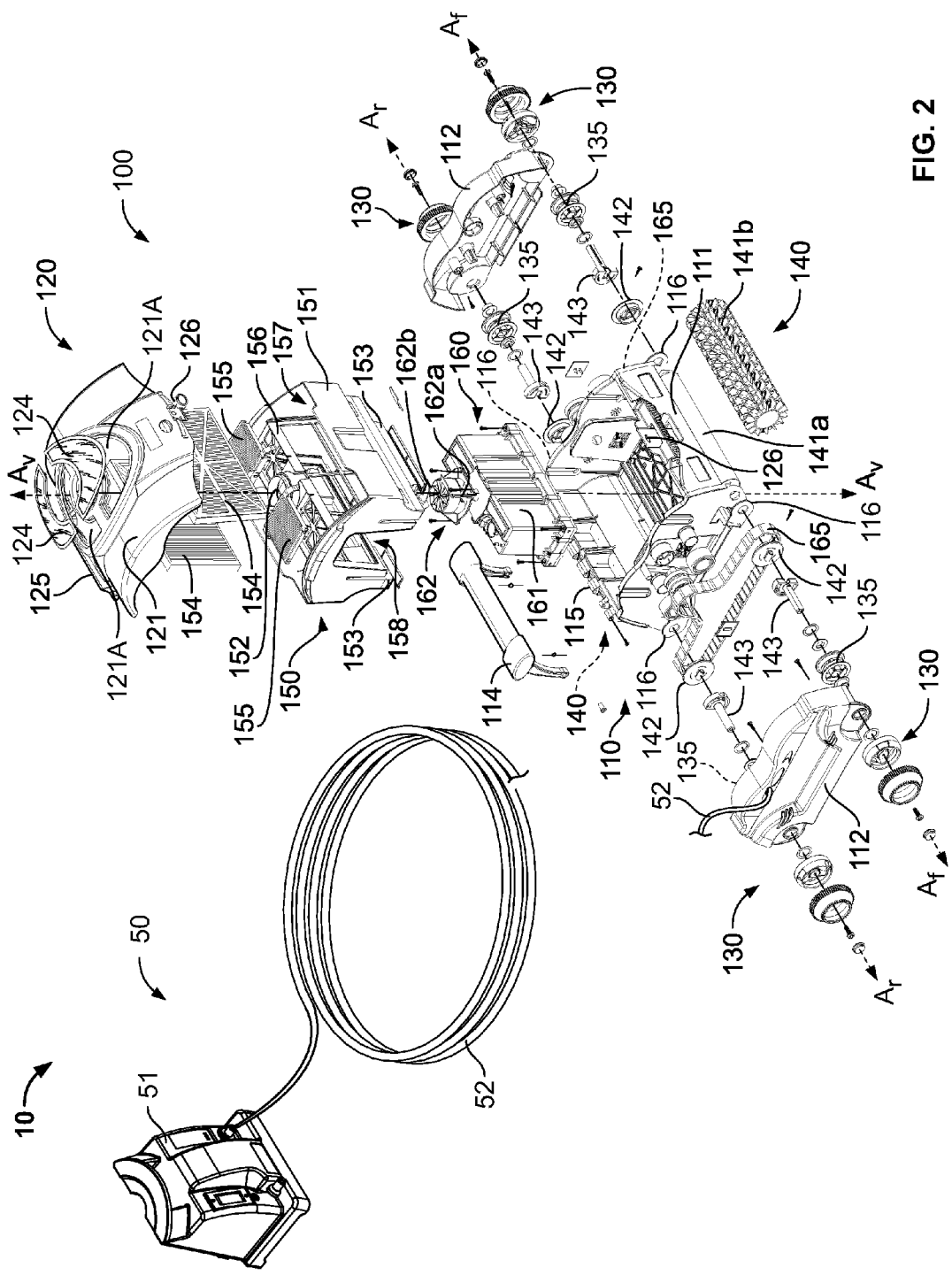
FIG. 2 depicts an exploded perspective view of the cleaner assembly of FIG. 1.
Figure 3:
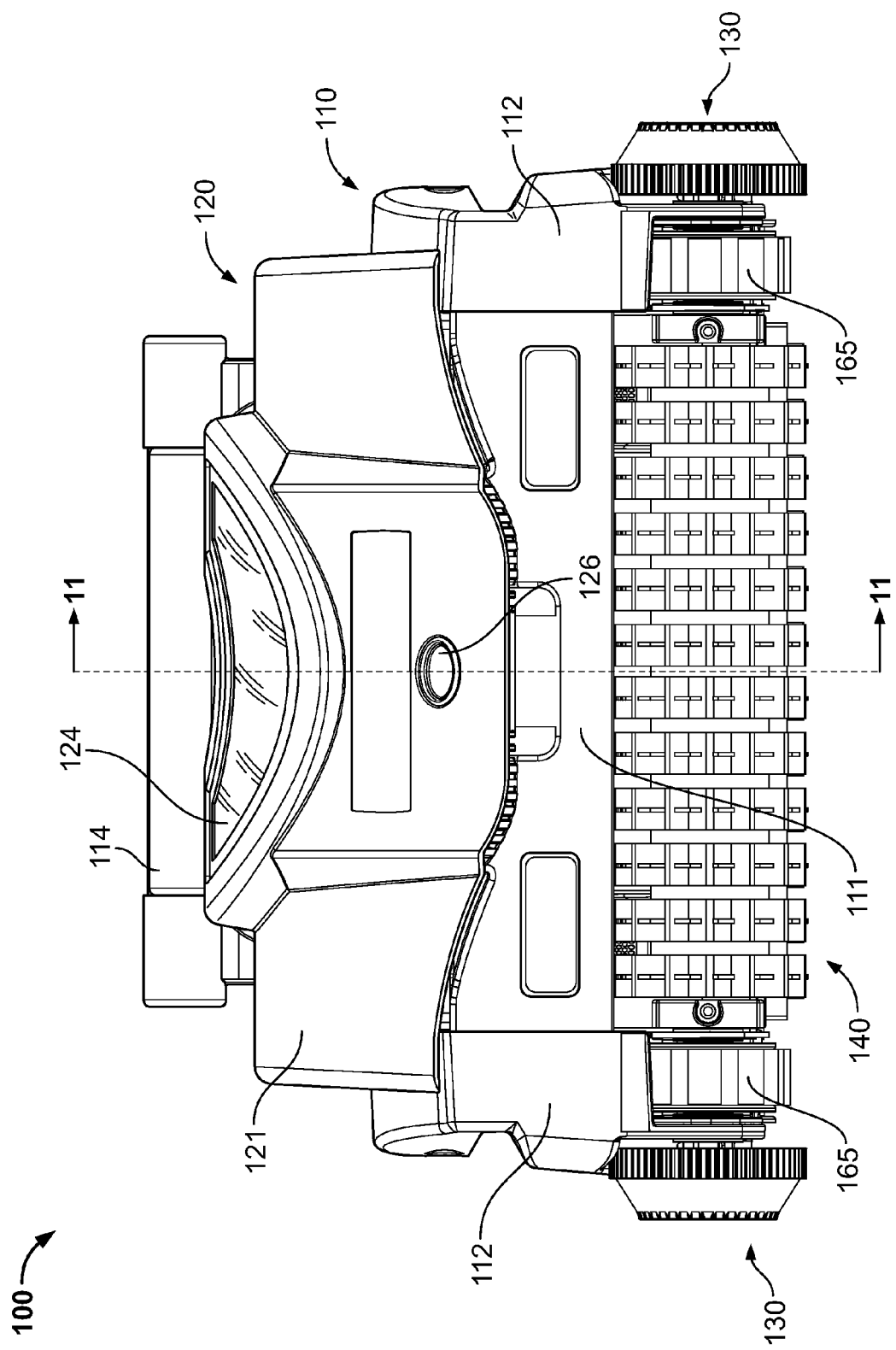
FIG. 3 depicts a front elevational view of the cleaner of FIGS. 1-2.
Figure 4:
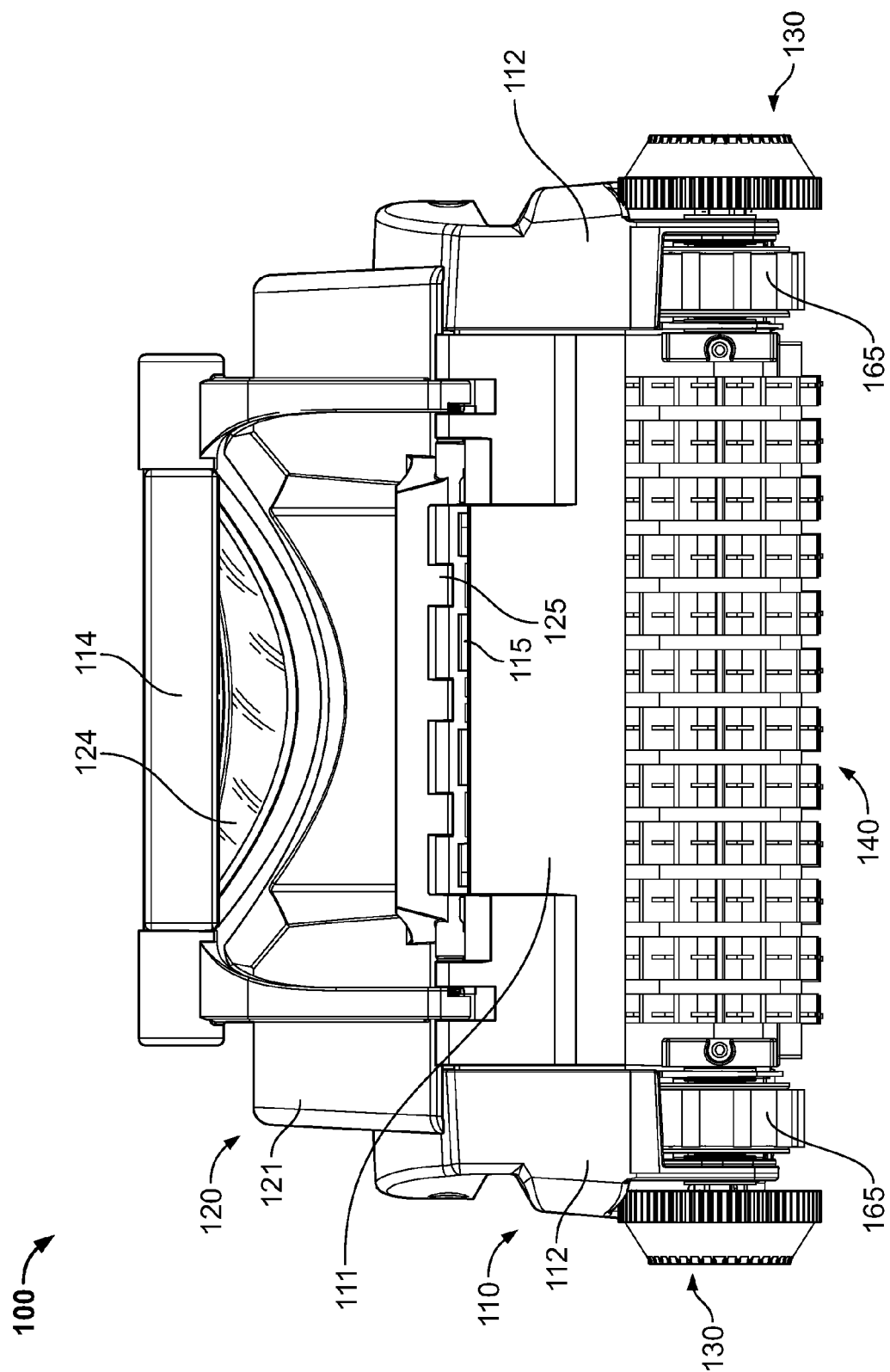
FIG. 4 depicts a rear elevational view of the cleaner of FIGS. 1-3.
Figure 5:
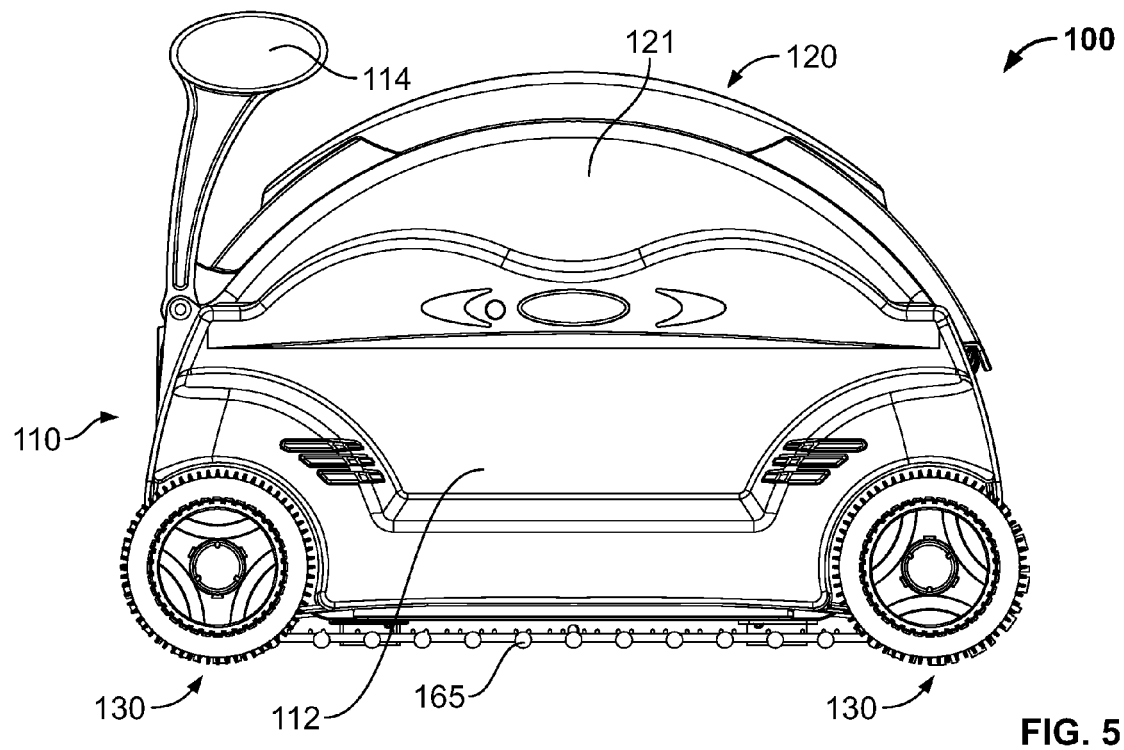
FIG. 5 depicts a left side elevational view of the cleaner of FIGS. 1-4.
Figure 6:
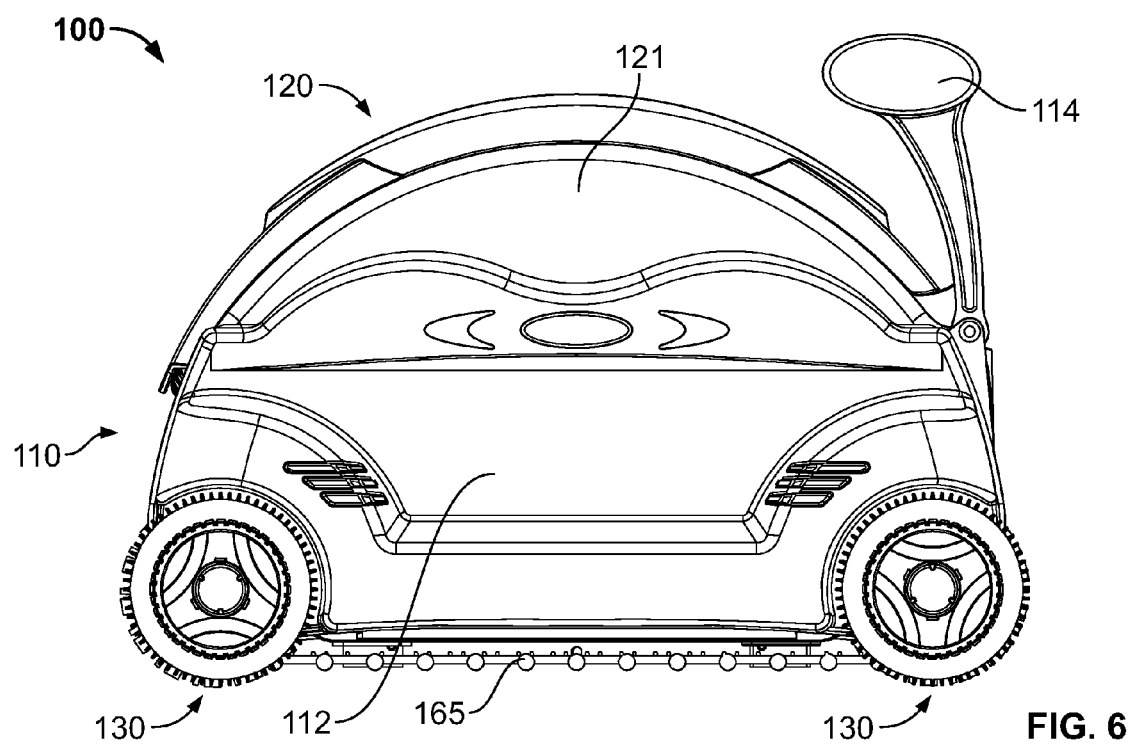
FIG. 6 depicts a right side elevational view of the cleaner of FIGS. 1-5.
Figure 7:
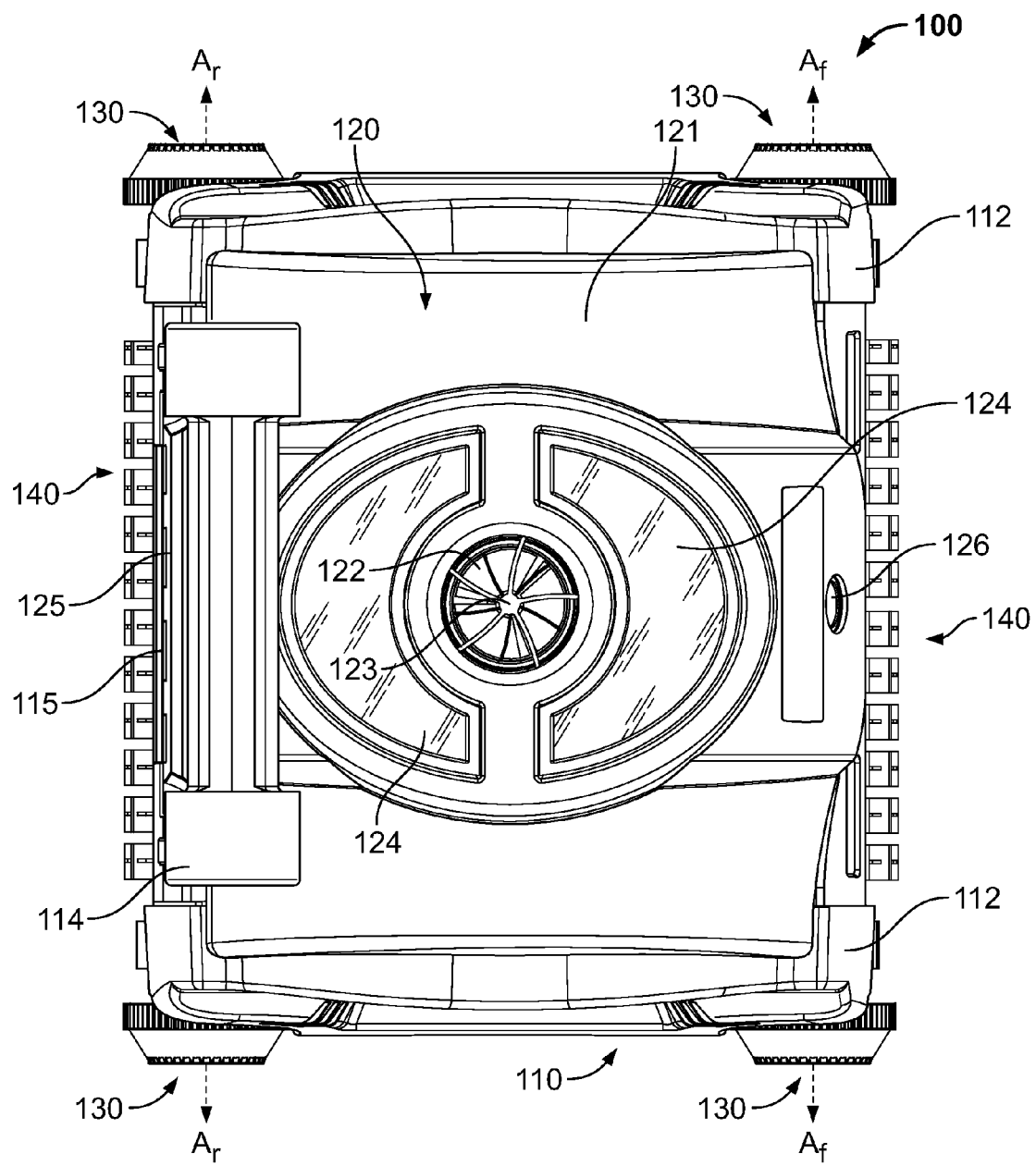
FIG. 7 depicts a top plan view of the cleaner of FIGS. 1-6.
Figure 8:
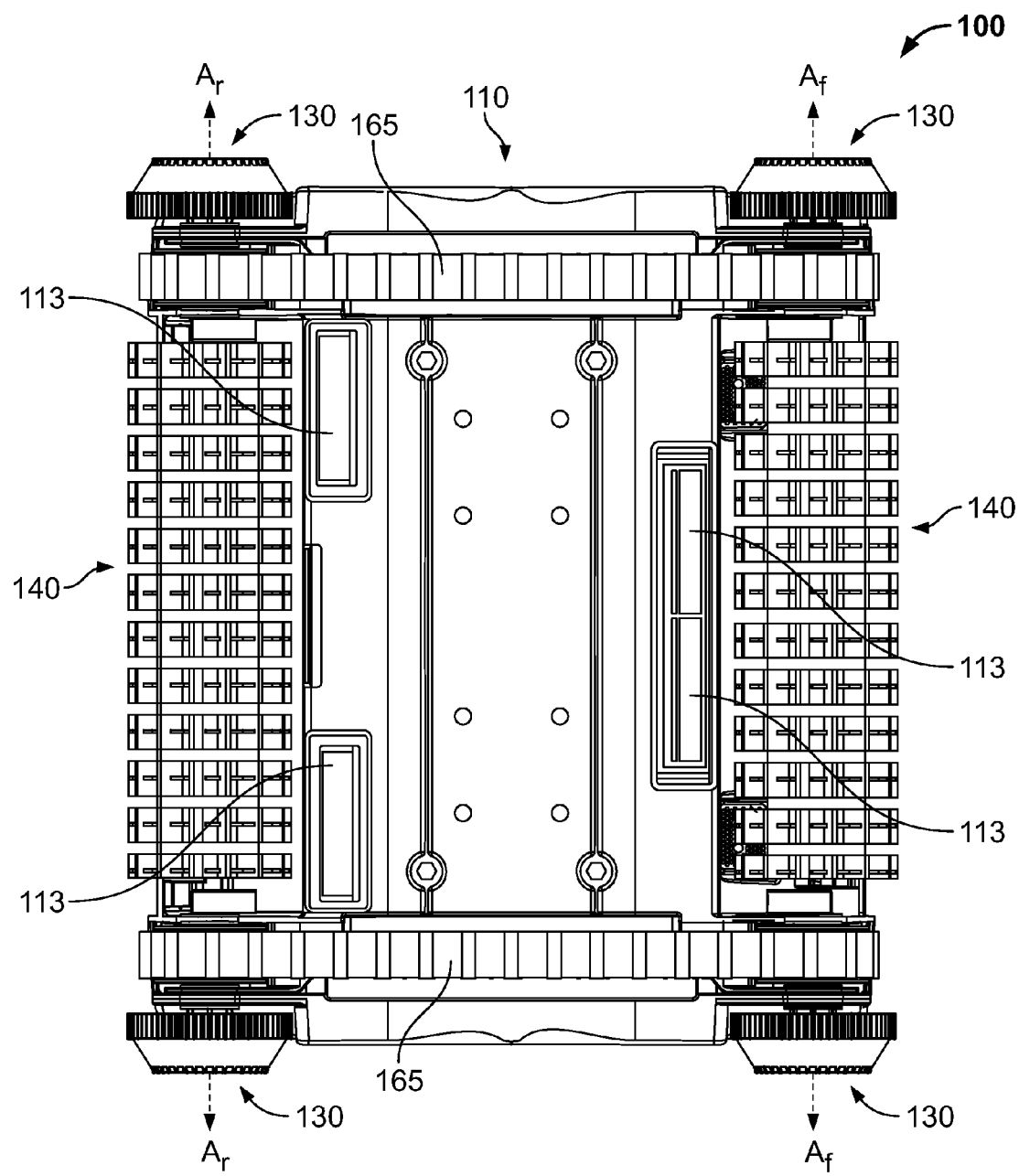
FIG. 8 depicts a bottom plan view of the cleaner of FIGS. 1-7.
Figure 18A:
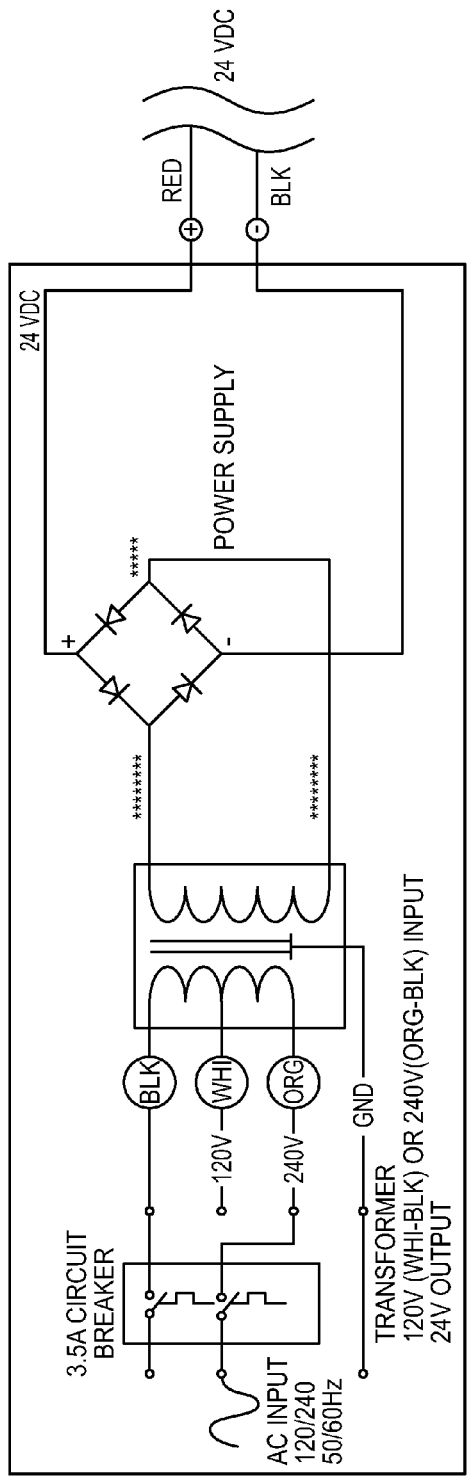
FIGS. 18A and 18B depicts electrical schematics for the cleaner assembly of FIGS. 1 and 2.
Figure 18B:
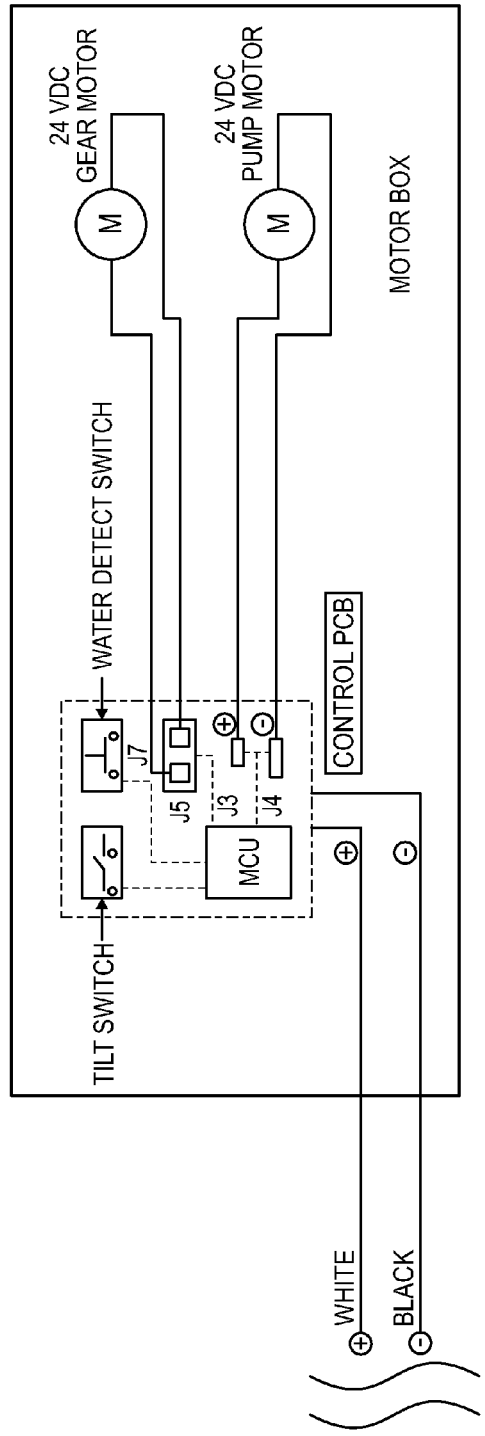

With initial reference to FIGS. 1-2, a cleaner assembly 10 generally includes a cleaner 100 and a power source such as an external power supply 50. Power supply 50 generally includes a transformer/control box 51 and a power cable 52 in communication with the transformer/control box 51 and the cleaner. In an exemplary embodiment, the pool cleaner 10 is an electrical pool cleaner, and sample electrical schematics for the cleaner assembly 10 generally are depicted in FIGS. 18A and 18B. Additional and/or alternative power sources are contemplated.

Referring to FIGS. 1-8 and 10, the cleaner 100 generally includes a housing assembly 110, a lid assembly 120, a plurality of wheel assemblies 130, a plurality of roller assemblies 140, a filter assembly 150 and a motor drive assembly 160, which shall each be discussed further below.

The housing assembly 110 and lid assembly 120 cooperate to define internal cavity space for housing internal components of the cleaner 100. In exemplary embodiments, the housing assembly 110 may define a plurality of internal cavity spaces for housing components of the cleaner 100. The housing assembly 110 includes a central cavity defined by base 111 and side cavities defined by side panels 112. The central cavity may house and receive the filter assembly 150 and the motor drive assembly 160. The side cavities may be used to house drive transfer system components, such as the drive belts 165, for example.

The drive transfer system is typically used to transfer power from the motor drive assembly 160 to the wheel assemblies 130 and the roller assemblies 140. For example, one or more drive shafts 166 (see, in particular, FIG. 10) may extend from the motor drive assembly 160, each drive shaft 166 extending through a side wall of the base 111, and into a side cavity. Therein the one or more drive shafts 166 may interact with the drive transfer system, e.g., by turning the drive belts 165. The drive belts 165 generally extend around and act to turn the bushing assemblies 135. Each mount 143 of the quick release mechanism includes an irregularly shaped axle 143B extending through complementary-shaped apertures within an associated one of the bushing assemblies 135 and an associated one of the wheel assemblies, such that rotation of the bushing assemblies 135 thereby rotates the irregularly shaped axle 143B, hence driving both the associated roller assembly 140 and the associated wheel assembly 130.

Regarding the position of the bushing assemblies 135, etc., the housing assembly 110 may include a plurality of brackets 116 each extending out from a side wall of the base 111 and having a flange parallel to said side wall, wherein a bushing assembly 135 can be positioned between the flange and side wall. The side walls and brackets 116 typically define a plurality of holes to co-axially align with an aperture defined through each bushing assembly 135. In exemplary embodiments, the axle 143B (discussed in greater detail with reference to FIG. 9B), may be inserted through each bracket 116, bushing assembly 135 and the corresponding side wall, defining an axis of rotation for the corresponding wheel assembly 130 and a roller assembly 140 associated with said axle.

The housing assembly 110 typically includes a plurality of filtration intake apertures 113 (see, in particular, FIGS. 8 and 10) located, for example, on the bottom and/or side of the housing assembly 110. The intake apertures 113 are generally configured and dimensioned to correspond with openings, e.g., intake channels 153, in the filter assembly 150. The intake apertures 113 and intake channels 153 can be large enough to allow for the passage of debris such as leaves, twigs, etc. However, since the suction power of the filtration assembly 150 may depend in part on surface area of the intake apertures 113 and/or intake channels 153, it may be advantageous, in some embodiments, to minimize the size of the intake apertures 113 and/or intake channels 153, e.g., to increase the efficiency of the cleaner 100. The intake apertures 113 and/or intake channels 153 may be located such that the cleaner 100 cleans the widest area during operation. For example, the front intake apertures 113 for the cleaner 100 can be positioned towards the middle of the housing assembly 110, while the rear intake apertures 113 can be positioned towards the sides of the housing assembly 110. In exemplary embodiments, intake apertures 113 may be included proximal the roller assemblies 140 to facilitate the collection of debris and particles from the roller assemblies 140 (see, in particular, FIG. 10). The intake apertures 113 can advantageously serve as drains for when the cleaner 100 is removed from the water.

In exemplary embodiments, the housing assembly 110 may include a cleaner handle 114, e.g., for facilitating extraction of the cleaner 100 from a pool.

In order to facilitate easy access to the internal components of the cleaner 100, the lid assembly 120 includes a lid 121 which is pivotally associated with the housing assembly 110. For example, the housing assembly 110 and lid assembly 120 may include hinge components 115, 125, respectively, for hingedly connecting the lid 121 relative to the housing assembly 110. Note, however, that other joining mechanisms, e.g., pivot mechanism, a sliding mechanism, etc., may be used, provided that the joining mechanism effect a removable relationship between the lid 121 and housing assembly 110. In this regard, a user may advantageously change the lid assembly 120 back and forth between an open position and a closed position, and it is contemplated that the lid assembly 120 can be provided so as to be removably securable to the housing assembly 110.

The lid assembly 120 may advantageously cooperate with the housing assembly 110 to provide for top access to the internal components of the cleaner 100. The filter assembly 150 may be removed quickly and easily for cleaning and maintenance without having to "flip" the cleaner 100 over. In some embodiments, the housing assembly 110 has a first side in secured relationship with the wheel assemblies 130 and a second side opposite such first side and in secured relationship with the lid assembly 120. The lid assembly 120 and the housing assembly 110 may include a latch mechanism, e.g., a locking mechanism 126, to secure the lid 121 in place relative to the housing assembly 110.

The lid 121 is typically configured and dimensioned to cover an open top-face of the housing assembly 110. The lid 121 defines a vent aperture 122 that cooperates with other openings (discussed below) to form a filtration vent shaft. For example, the vent aperture 122 is generally configured and dimensioned to correspond with an upper portion of a vent channel 152 of the filter assembly 150. The structure and operation of the filtration vent shaft and the vent channel 152 of the filter assembly are discussed in greater detail herein. Note that the vent aperture 122 generally includes guard elements 123 to prevent the introduction of objects, e.g., a user's hands, into the vent shaft. The lid assembly 120 can advantageously includes one or more transparent elements, e.g., windows 124 associated with the lid 121, which allow a user to see the state of the filter assembly 150 while the lid assembly 120 is in the closed position. In some embodiments, it is contemplated that the entire lid 121 may be constructed from a transparent material. Exemplary embodiments of the lid assembly 120 and the lid 121 are discussed in greater detail below with reference to FIGS. 16-17.

The cleaner 100 is typically supported/propelled about a pool by the wheel assemblies 130 located relative to the bottom of the cleaner 100. The wheel assemblies 130 are usually powered by the motor drive assembly 160 in conjunction with the drive transfer system, as discussed herein. In exemplary embodiments, the cleaner 100 includes a front pair of wheel assemblies 130 aligned along a front axis $A_f$ and a rear pair of wheel assemblies 130 aligned along a rear axis $A_r$. Each wheel assembly 130 may include a bushing assembly 135 aligned along the proper corresponding axis $A_f$ or $A_r$, and axially connected to a corresponding wheel, e.g., by means of and in secured relationship with the axle 143B. As discussed herein, the drive belts 165 turn the bushing assemblies 135 which turn the wheels.

The cleaner 100 can include roller assemblies 140 to scrub the walls of the pool during operation. In this regard, the roller assemblies 140 may include front and rear roller assemblies 140 integrally associated with said front and rear sets of wheel assemblies, respectively (e.g., wherein the front roller assembly 140 and front set of wheel assemblies 130 rotate in cooperation around axis $A_f$ and/or share a common axle, e.g., the axle 143B).

While the four-wheel, two-roller configuration discussed herein advantageously promotes device stability/drive efficiency, the current disclosure is not limited to such configuration. Indeed, three-wheel configurations (such as for a tricycle), two-tread configurations (such as for a tank), tri-axial configurations, etc., may be appropriate, e.g. to achieve a better turn radius, or increase traction. Similarly, in exemplary embodiments, the roller assemblies 140 may be independent from the wheel assemblies 130, e.g., with an autonomous axis of rotation and/or independent drive. Thus, the brush speed and/or brush direction may advantageously be adjusted, e.g., to optimize scrubbing.

The roller assemblies 140 advantageously include a quick release mechanism which allows a user to quickly and easily remove a roller 141 for cleaning or replacement. In exemplary embodiments (see FIG. 2), an inner core 141A and an outer disposable/replaceable brush 141B may cooperate to form the roller (not designated in FIG. 2). Note, however, that various other rollers 141 may be employed without departing from the spirit or scope of the present disclosure, e.g., a cylindrical sponge, a reusable brush without an inner core element, etc. The roller assemblies 140 and the quick release mechanism are discussed in greater detail with reference to FIGS. 9A and 9B. It is contemplated that the roller 141 can be integrally formed, such that the core and brush are monolithic, for example.

Figure 9A:
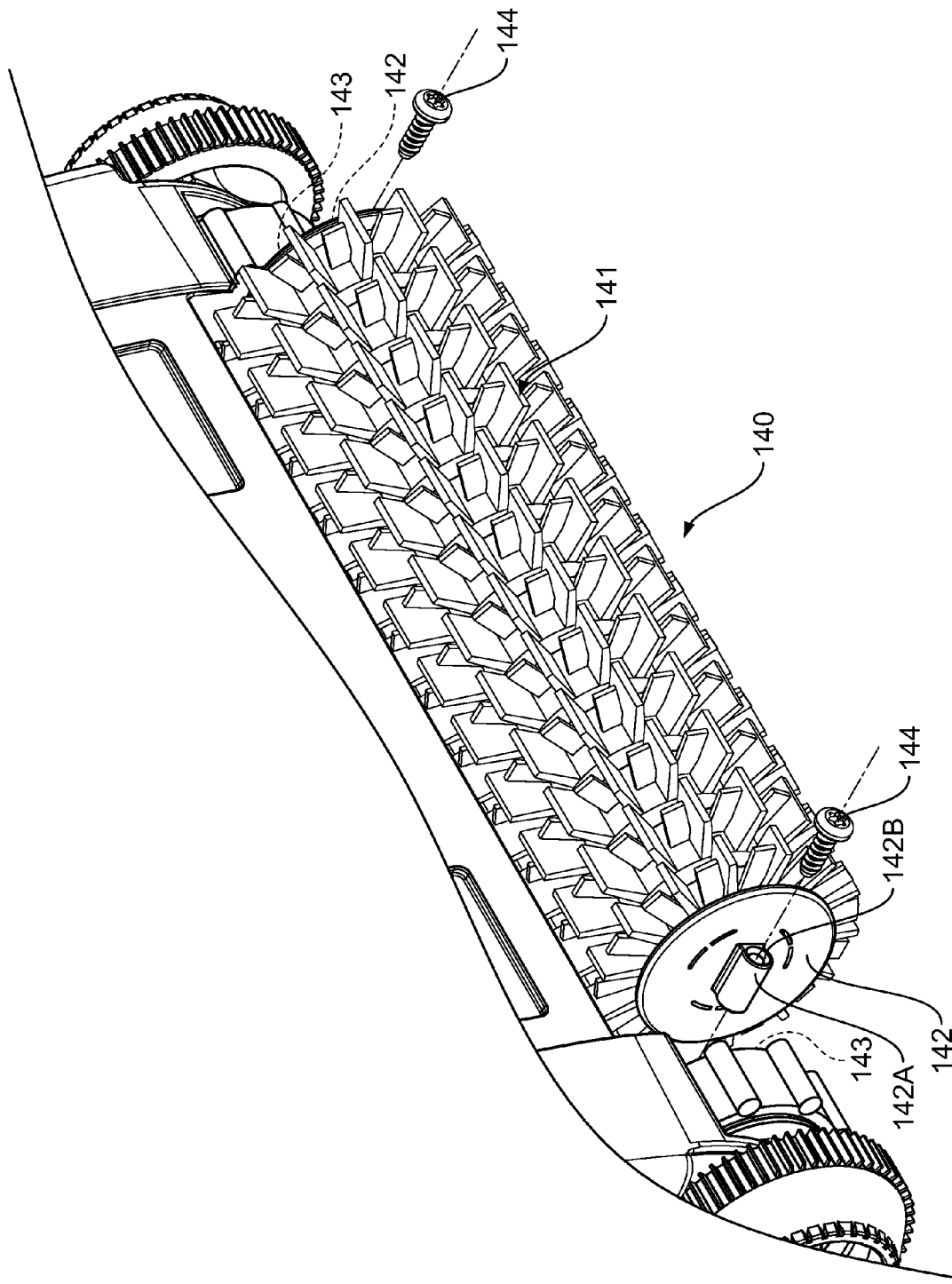
FIGS. 9A and 9B depict a quick-release mechanism associated with the roller assemblies of FIGS. 1-8.
Figure 9B:
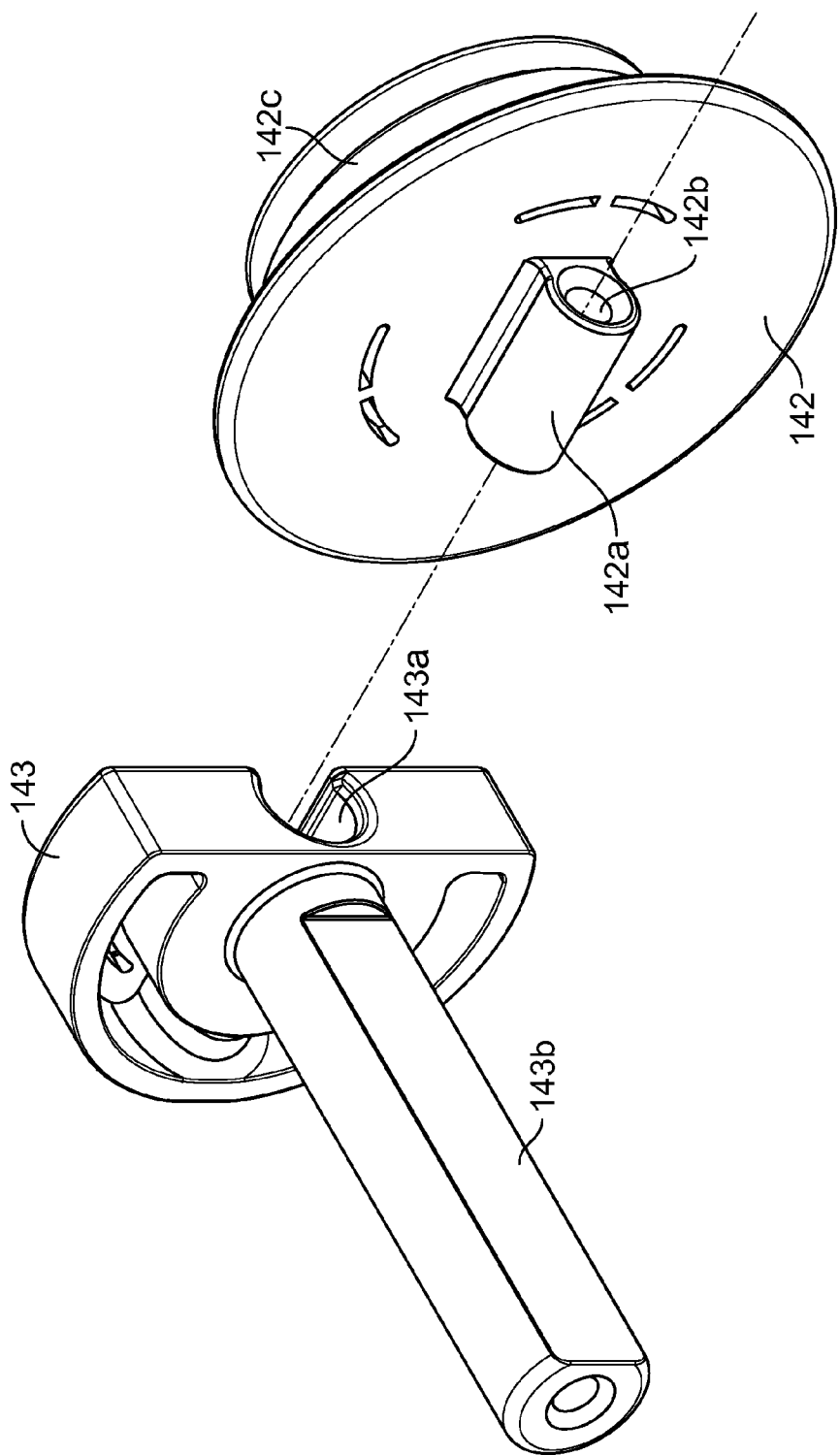
Figure 10:
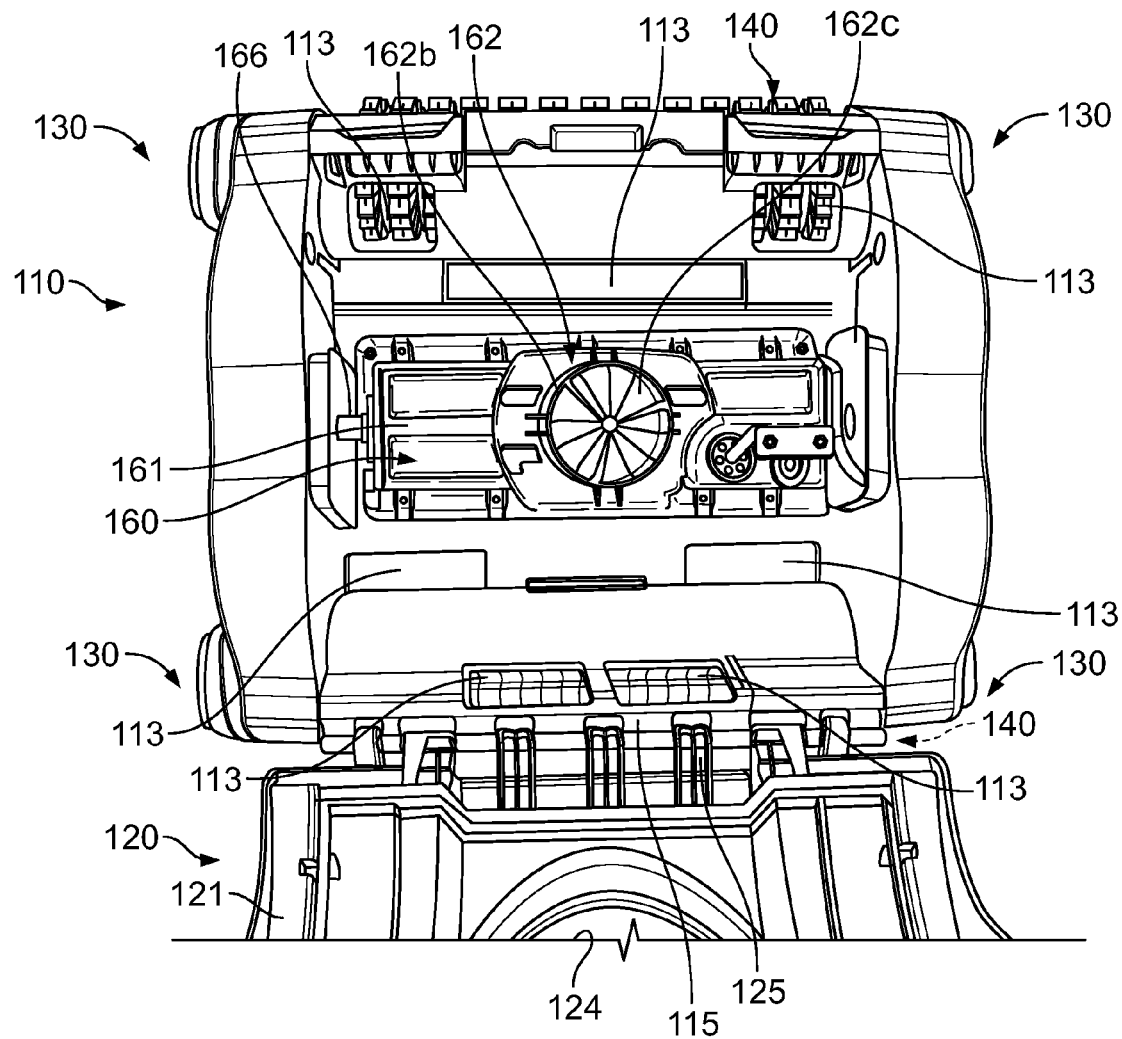
FIG. 10 depicts a top plan view of the cleaner of FIGS. 1-8, wherein the lid assembly is shown in an open position and the filter assembly has been removed.

With reference now to FIG. 9A, an enlarged exploded view of the front roller assembly 140 of the cleaner 100 is depicted. The front roller assembly 140 is advantageously provided with a quick release mechanism for removing/replacing a roller. Referring now to FIG. 9B, an exemplary quick release mechanism for a roller assembly, e.g., the front roller assembly 140 of FIG. 9A, is depicted using a tongue and groove. Referring now to FIGS. 9A and 9B, the front roller assembly 140 typically includes a roller 141, end joints 142 and mounts 143. In exemplary embodiments, the end joints 142 include annular lipped protrusions 142C to secure the end joints relative to the ends of the roller 141. In exemplary embodiments, the annular lipped protrusions 142C are dimensioned and configured to be received by the core 141A of the roller 141. Generally, the end joints 142 may cooperate with the mounts 143 to removably connect the roller 141 relative to the cleaner during operation. Each mount 143, therefore generally includes an axle 143B which may include a flat surface, extend along the front axis $A_f$ through an eyelet in the corresponding side wall of the base 111, through the corresponding bushing assembly 135, through an eyelet in the corresponding bracket 116, and secure the corresponding wheel assembly 130. The axle 143B may advantageously include a flat edge and the roller bushing assembly 135 and wheel assembly 130 have a correspondingly shaped and dimensioned aperture receiving the axle 143B, such that drive of the bushing assembly 135 drives the mount 143 and the roller assembly 140 generally (and the wheel assembly 130).

The roller assembly 140 disclosed herein advantageously employs a facially accessible, quick release mechanism wherein the roller 141 may quickly be removed from the mounts 143 for cleaning or replacement purposes. Thus, in exemplary embodiments, each roller end 142 may include a tongue element 142A configured and dimensioned to correspond with a groove element 143A defined in the corresponding mount 143. A fastener 144, e.g., a pin, screw, rod, bolt etc., may be inserted through a slot 142B defined radially in the tongue element 142B and into the mount to secure the roller in place. In this regard, the roller 141 can be positioned within a geometric space bound at locations proximal the ends of the roller 141, while still allowing for quick-release. In some embodiments, such as those shown, for example, a longitudinal side of the roller 141 remains unobstructed and the fastener-receiving passage is orientated radially, thereby allowing easy removal of the fastener through the unobstructed area. The tongue and groove configuration advantageously allows a user to remove/load a roller 141 from a radially oriented direction. Though the tongue and groove configuration is shown, it is contemplated that other suitable configurations can be employed, e.g., a spring release, latch, etc.

Figure 11:
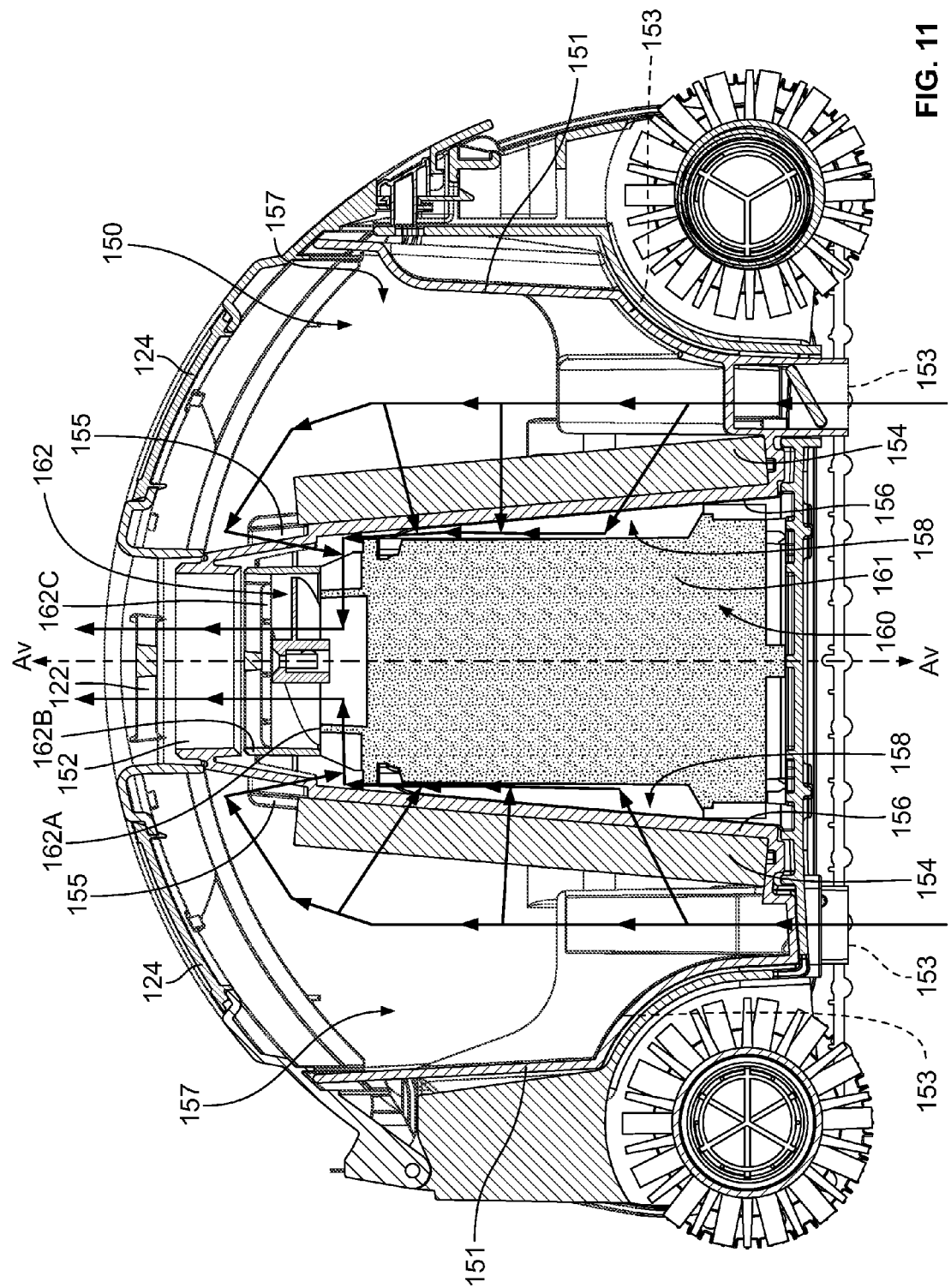
FIG. 11 depicts a partial cross-section of the cleaner of FIGS. 1-8 along section line 11-11 of FIG. 3 with the handle having been removed, with portions of the motor drive assembly being represented generally without section, and with directional arrows added to facilitate discussion of an exemplary fluid flow through the pool cleaner.

Referring now to FIGS. 2 and 11, the filter assembly 150 is depicted in cross-section and the motor drive assembly 160 is depicted generally. The motor drive assembly 160 generally includes a motor box 161 and an impeller unit 162. The impeller unit 162 is typically secured relative to the top of the motor box 161, e.g., by screws, bolts, etc. In exemplary embodiments, the motor box 161 houses electrical and mechanical components which control the operation of the cleaner 100, e.g., drive the wheel assemblies 130, the roller assemblies 140, and the impeller unit 162.

In exemplary embodiments, the impeller unit 162 includes an impeller 162C, an apertured support 162A (which defines intake openings below the impeller 162C), and a duct 162B (which houses the impeller 162C and forms a lower portion of the filtration vent shaft). The duct 162B is generally configured and dimensioned to correspond with a lower portion of the vent channel 152 of the filter assembly 150. The duct 162B, vent channel 152, and vent aperture 122 may cooperate to define the filtration vent shaft which, in some embodiments, extends up along the ventilation axis $A_v$, and out through the lid 121. The impeller unit 162 acts as a pump for the cleaner 100, drawing water through the filter assembly 150 and pushing filtered water out through the filtration vent shaft. An exemplary filtration flow path for the cleaner 100 is designated by directional arrows depicted in FIG. 11.

The motor drive assembly 160 is typically secured, e.g., by screws, bolts, etc., relative to the inner bottom surface of the housing assembly 110. The motor drive assembly 160 is configured and dimensioned so as to not obstruct the filtration intake apertures 113 of the housing assembly 110. Furthermore, the motor drive assembly 160 is configured and dimensioned such that cavity space remains in the housing assembly 110 for the filter assembly 150.

The filter assembly 150 includes one or more filter elements (e.g., side filter panels 154 and top filter panels 155), a body 151 (e.g., walls, floor, etc.), and a frame 156 configured and dimensioned for supporting the one or more filter elements relative thereto. The body 151 and the frame 156 and/or filter elements generally cooperate to define a plurality of flow regions including at least one intake flow region 157 and at least one vent flow region 158. More particularly, each intake flow region 157 shares at least one common defining side with at least one vent flow region 158, wherein the common defining side is at least partially defined by the frame 156 and/or filter element(s) supported thereby. The filter elements, when positioned relative to the frame 156, form a semi-permeable barrier between each intake flow region 157 and at least one vent flow region 158.

In exemplary embodiments, the body 151 defines at least one intake channel 153 in communication with each intake flow region 157, and the frame 156 defines at least one vent channel 152 in communication with each vent flow region 158. Each intake flow region 157 defined by the body 151 can be bucket-shaped to facilitate trapping debris therein. For example, the body 151 and frame 156 may cooperate to define a plurality of surrounding walls and a floor for each intake flow region 157. Exemplary embodiments of the structure and configuration of the filter assembly 150 are discussed in greater detail with reference to FIGS. 12-15.

Figure 12:
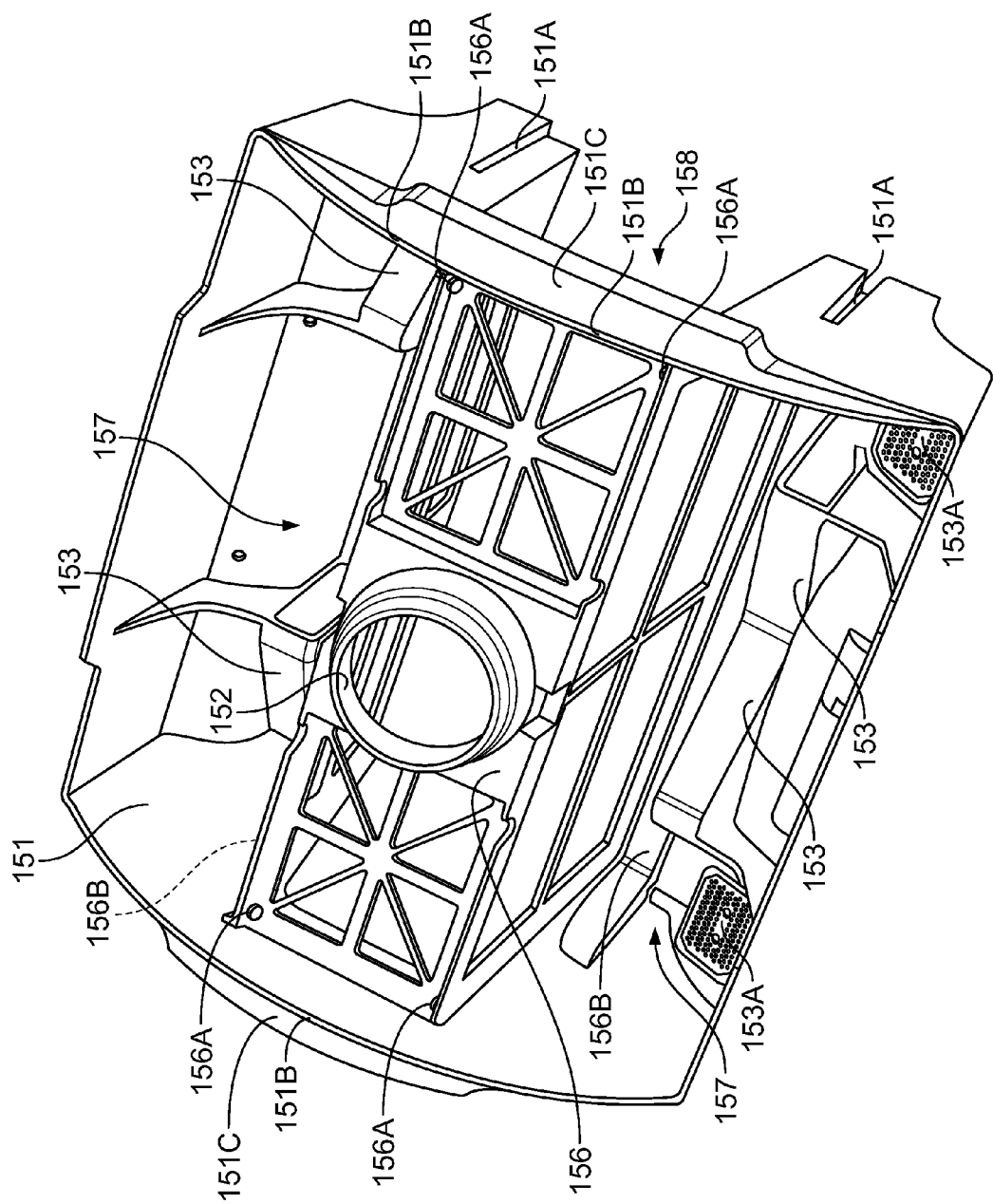
FIG. 12 depicts a top perspective view of a body and a frame included in the filter assembly of FIGS. 1-8, the body being shown integrally formed with the frame.
Figure 13:
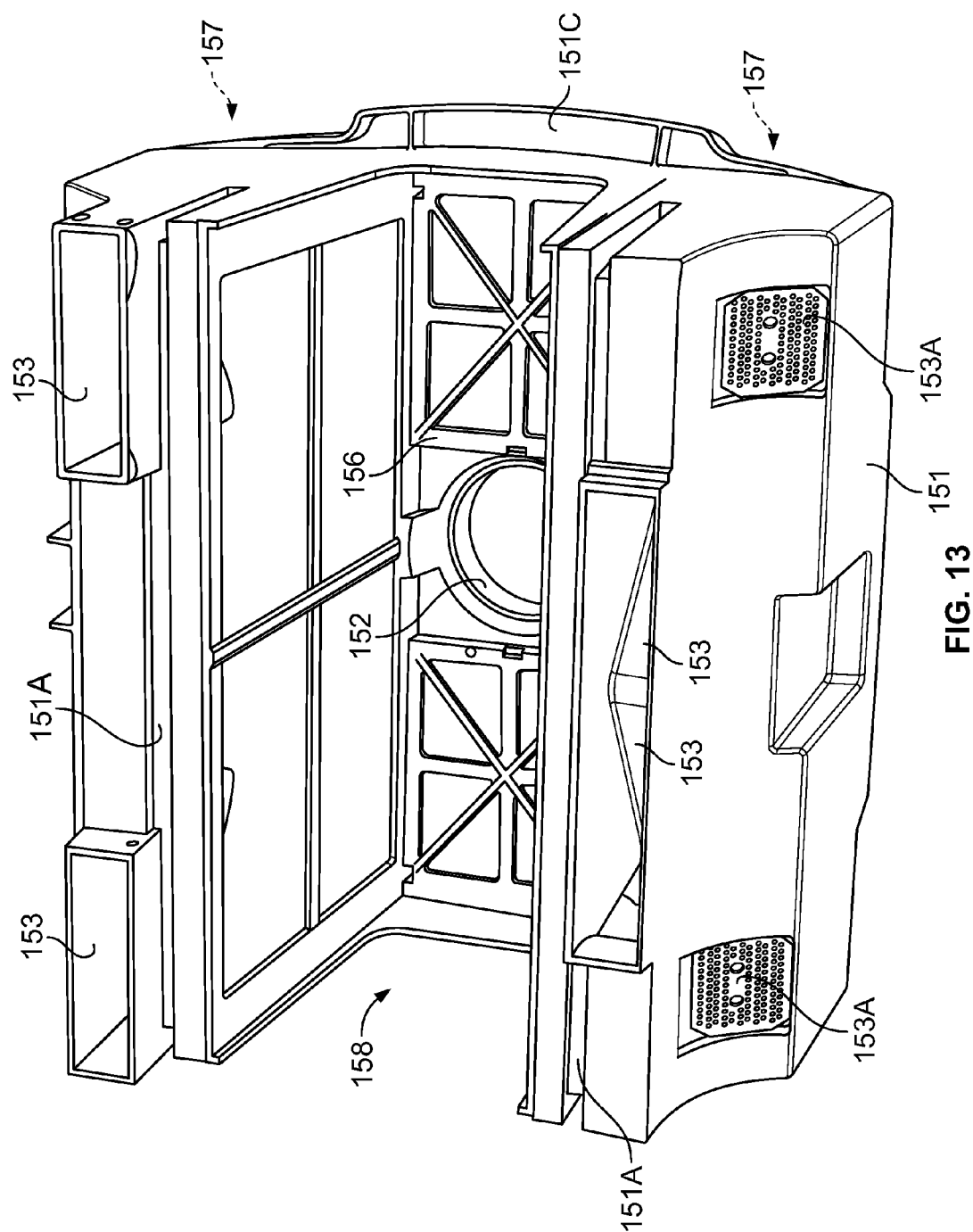
FIG. 13 depicts a bottom perspective view of the body and the frame integrally formed therewith of FIG. 12.

With reference now to FIGS. 12-13, the body 151 of the filter assembly 150 is depicted with the frame 156 shown integrally formed therewith. The body 151 has a saddle-shaped elevation. The body 151 is configured, sized, and/or dimensioned to be received for seating in the base 111 and the frame 156 is configured, sized, and/or dimensioned to fit over the motor drive assembly 160. When the filter assembly 150 is positioned within the housing assembly 110, the motor drive assembly 160 in effect divides the original vent flow region 158 into a plurality of vent flow regions 158, with each of the vent flow regions 158 in fluid communication with the intake openings defined by the apertured support 162A of the impeller 162C (see FIG. 11). To facilitate proper positioning of the filter assembly 150 within the cleaner 100, the body 151 may define slots 151A for association with flanges (not depicted) on the interior of the housing assembly 110. Filter handles 151C can be included for facilitating removal and replacement of the filter assembly 150 within the housing assembly 110. Though the filter assembly 150 can be bucket-like and/or have a saddle-shaped elevation, it is contemplated that any suitable configuration can be employed.

The body 151 can define a plurality of openings, e.g., intake channels 153 for association with the intake flow regions 157 and the intake apertures 113 of the housing assembly 110. In exemplary embodiments, such as depicted in FIG. 12, the intake channels 153 define an obliquely extending structure with negative space at a lower elevation and positive space at a higher elevation in alignment therewith. A bent flow path of the intake channels 153 helps prevent debris trapped within the intake flow regions 157 from escaping, e.g., descending downward through the channels by virtue of gravity or other force. Note, however, that alternative embodiments are contemplated. Also, it is contemplated that intake channels might extend up along the outside of the filter body and traverse the body 151 through the sides. In exemplary embodiments, lattice structures, e.g., lattices 153A, are provided for drainage, e.g., when the cleaner 100 is removed from a pool.

Figure 14:
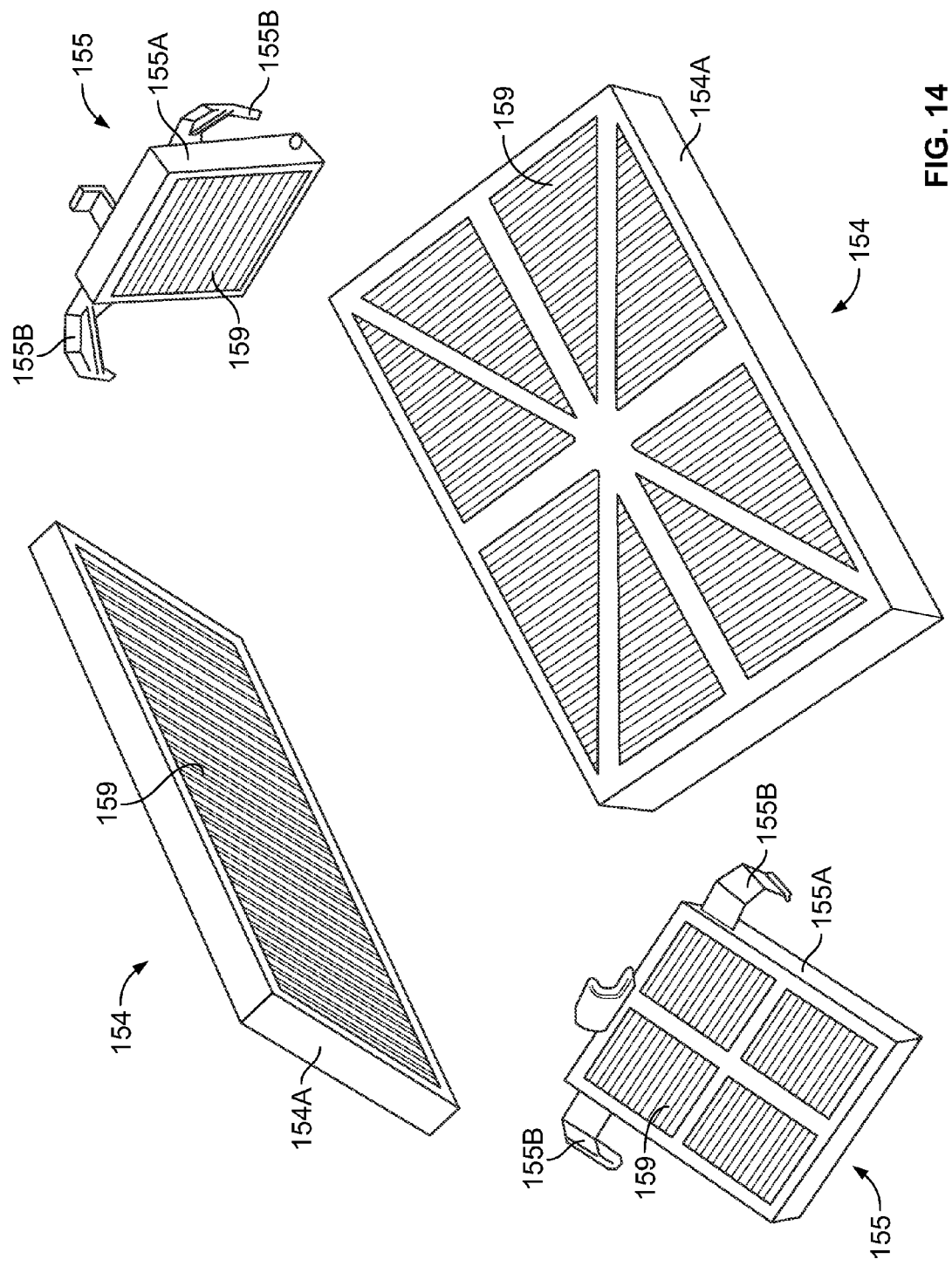
FIG. 14 depicts a top perspective view of a plurality of filter elements included in the filter assembly of FIGS. 1-8, the filter elements being shown to include top filter panels and side filter panels.
Figure 15:
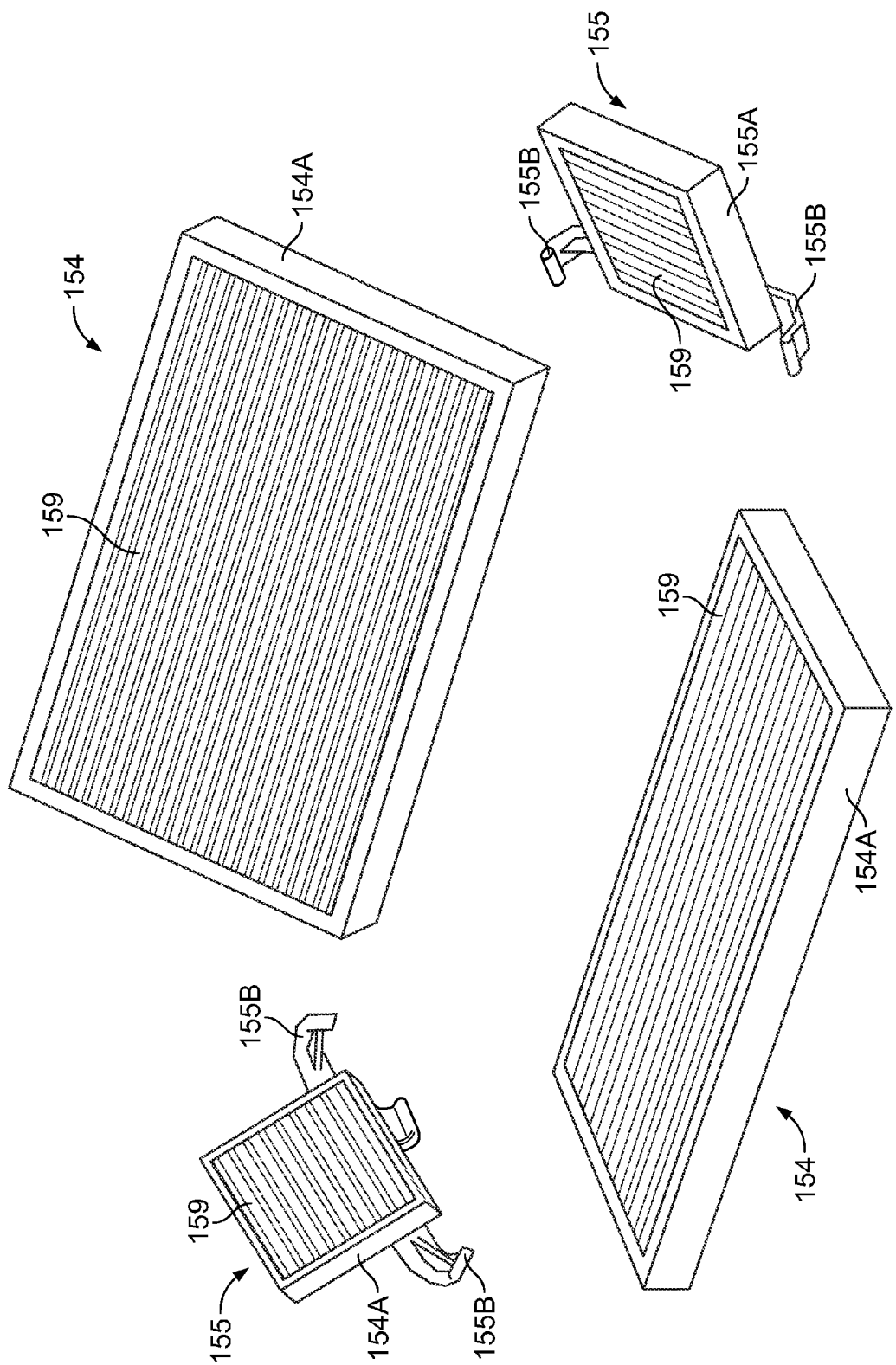
FIG. 15 depicts a bottom perspective view of the plurality of filter elements of FIG. 14.

As discussed, FIGS. 12-13 show a frame 156 designed to support filter elements, e.g., side and top filter panels relative thereto. Referring now to FIGS. 14-15, exemplary side filter panels 154 and top filter panels 155 are depicted. Each one of the filter panels 154, 155 includes a filter frame 154A or 155A and a filter material 159 supported thereby. The filter material 159 of the filter panels 154, 155 may be saw-toothed to increase the surface area thereof. Referring now to FIGS. 12-15, the frame 156 includes protrusions 156A for hingedly connecting the top filter panels 155 relative thereto. The side filter panels 154 fit into slots 156B in the body 151 and are supported by the sides of the frame 156. The top filter panels 155 may include finger elements 155B for securing the side filter panels 154 relative to the frame 156.

Note, however, that the exemplary frame/filter configuration presented herein is not limiting. Single-side, double side, top-only, etc., filter element configurations may be used. Indeed, filter elements and frames of suitable shapes, sizes, and configurations are contemplated. For example, while the semi-permeable barrier can be a porous material forming a saw tooth pattern, it is contemplated, for example, that the filter elements can include filter cartridges that include a semi-permeable material formed of a wire mesh having screen holes defined therethrough.

Figure 16:
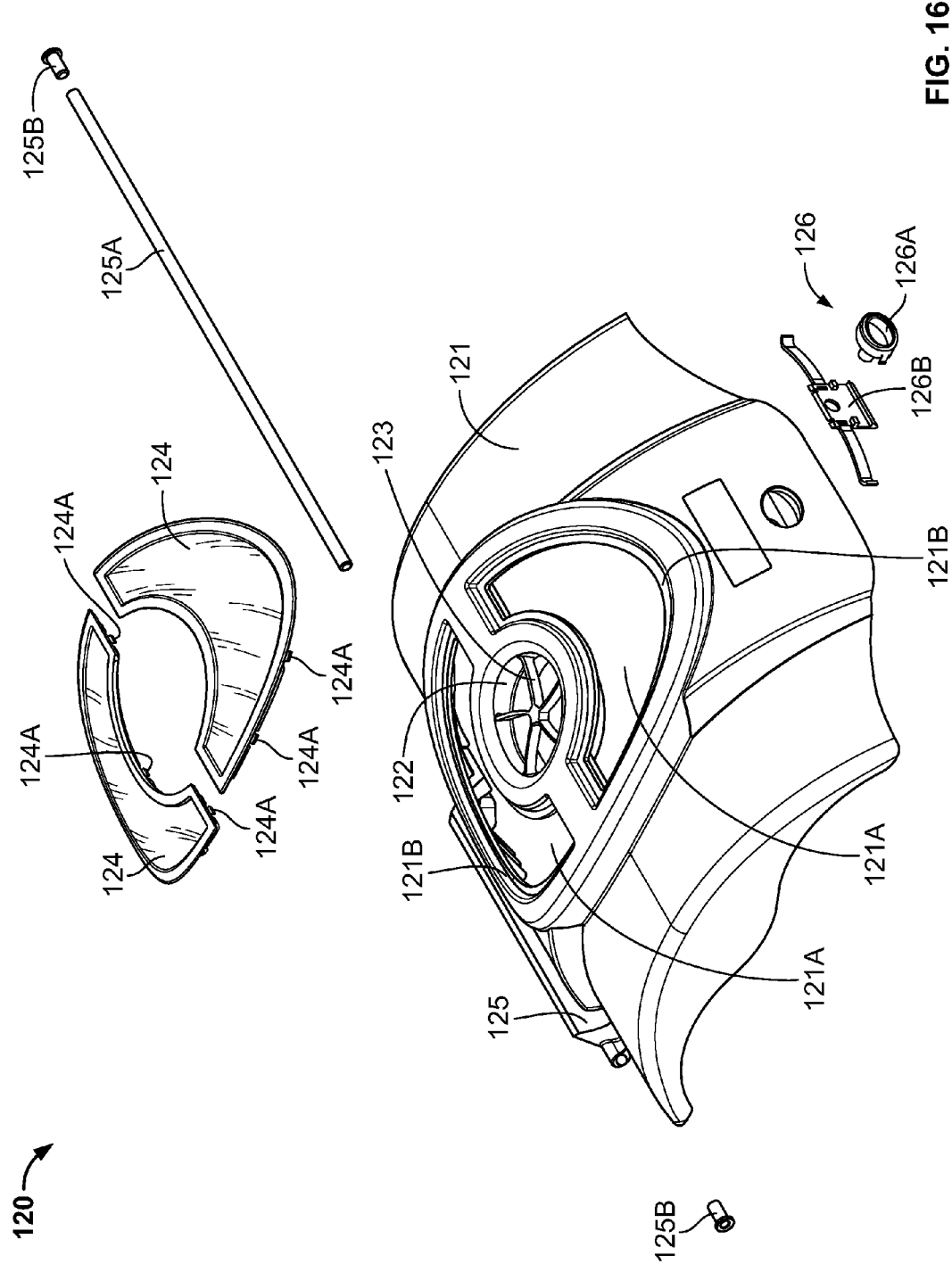
FIG. 16 depicts a top perspective view of the lid assembly of FIGS. 1-8. including a lid, windows, a latch mechanism, and a hinge component.
Figure 17:
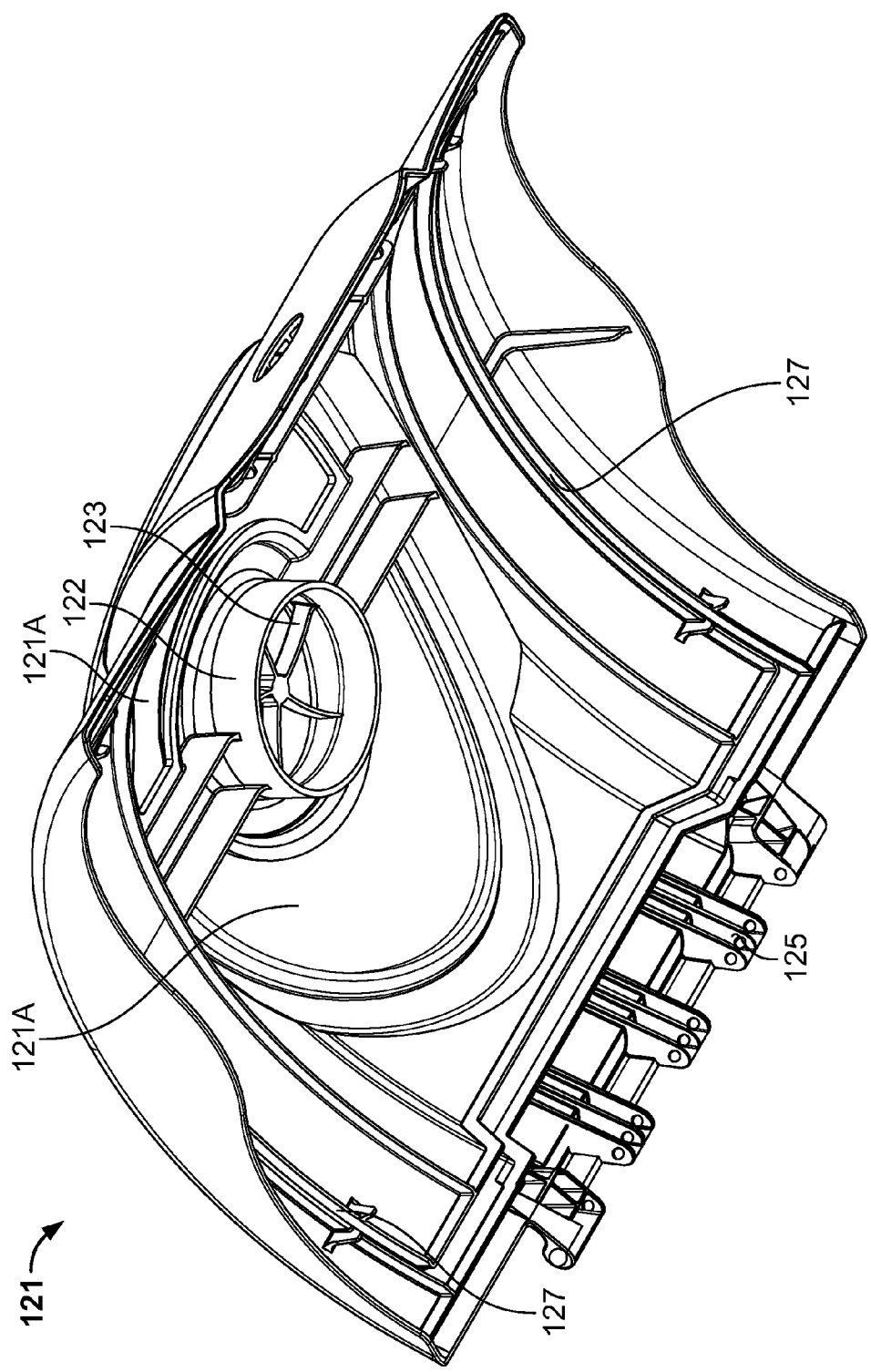
FIG. 17 depicts a bottom perspective view of the lid of FIG. 16 including grooves configured and dimensioned to mate with ridges on the filter assembly of FIGS. 1-8.

Referring to FIGS. 16 and 17, an exemplary lid assembly 120 for the cleaner 100 is depicted. Generally, the lid assembly 120 includes a lid 121 which is pivotally attached to the top of the housing assembly 110 by means of hinge components 115, 125 (note that the hinge component 115 of the housing assembly 110 is not depicted in FIG. 16). The hinge component 125 of the lid assembly 120 may be secured to the hinge component 115 of the housing assembly 110 using an axis rod 125A and end caps 125B. The lid assembly 20 advantageously provides top access to internal components of the cleaner 100. The lid 121 may be secured relative to the housing assembly 110 by means of a locking mechanism 126, e.g., a button 126A and spring 126B system. In some embodiments, it is contemplated that the lid assembly 120 is removable.

The lid 121 can include windows 124 formed of a transparent material. Thus, in exemplary embodiments, the lid 121 defines one or more window openings 121A, therethrough. The window openings 121A may include a rimmed region 121B for supporting windows 124 relative thereto. Tabs 124A can be included to facilitate securing the windows 124 relative to the lid 121. The windows 124 may be advantageously configured and dimensioned to allow an unobstructed line of site to the intake flow regions 157 of the filter assembly 150 while the filter assembly 150 is positioned within the cleaner 100. Thus, a user is able to observe the state of the filter assembly 150, e.g., how much dirt/debris is trapped in the intake flow regions 157, and quickly ascertain whether maintenance is needed.

In exemplary embodiments, the lid 121 may define a vent aperture 122, the vent aperture 122 forming the upper portion of a filtration vent shaft for the cleaner 100. Guard elements 123 may be included to advantageously protect objects, e.g., hands, from entering the filtration vent shaft and reaching the impeller 162C. The lid 121 preferably defines grooves 127 relative to the bottom of the lid assembly 120. These grooves advantageously interact with ridges 151B defined around the top of the filter assembly 150 (see FIG. 12) to form a makeshift seal. By sealing the top of the filter assembly 150, suction power generated by the impeller 162C may be maximized.

Figure 19:
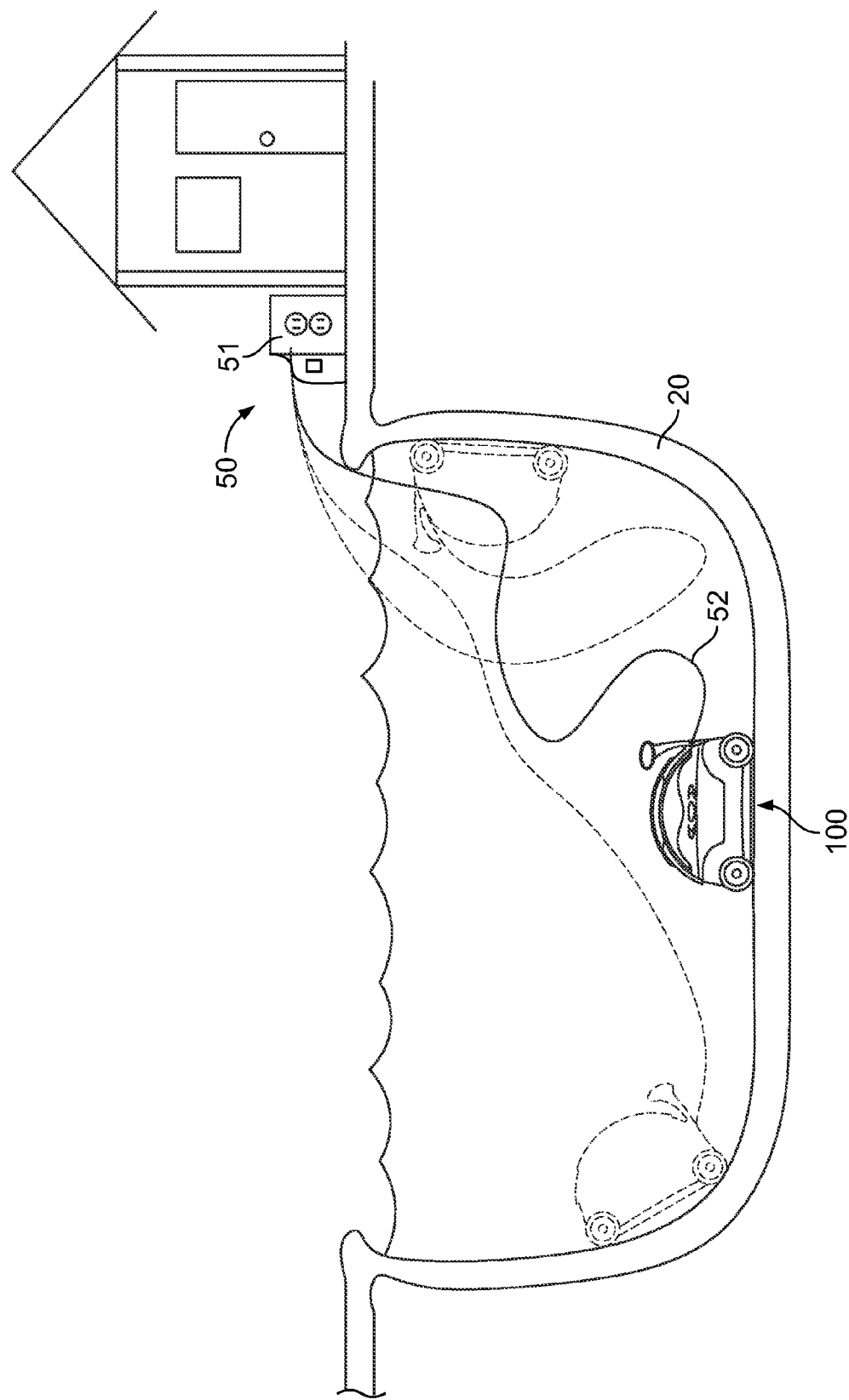
FIG. 19 depicts the exemplary cleaner assembly of FIGS. 1-2 in operation cleaning a pool.

Referring now to FIG. 19, the cleaner 100 of FIGS. 1-8 is depicted cleaning a pool 20. The cleaner 100 is advantageously able to clean both the bottom and side walls of the pool 20 (collectively referred to as the "walls" of the pool 20). The cleaner 100 is depicted as having an external power supply including a transformer/control box 51 and a power cable 52.

Figure 20:
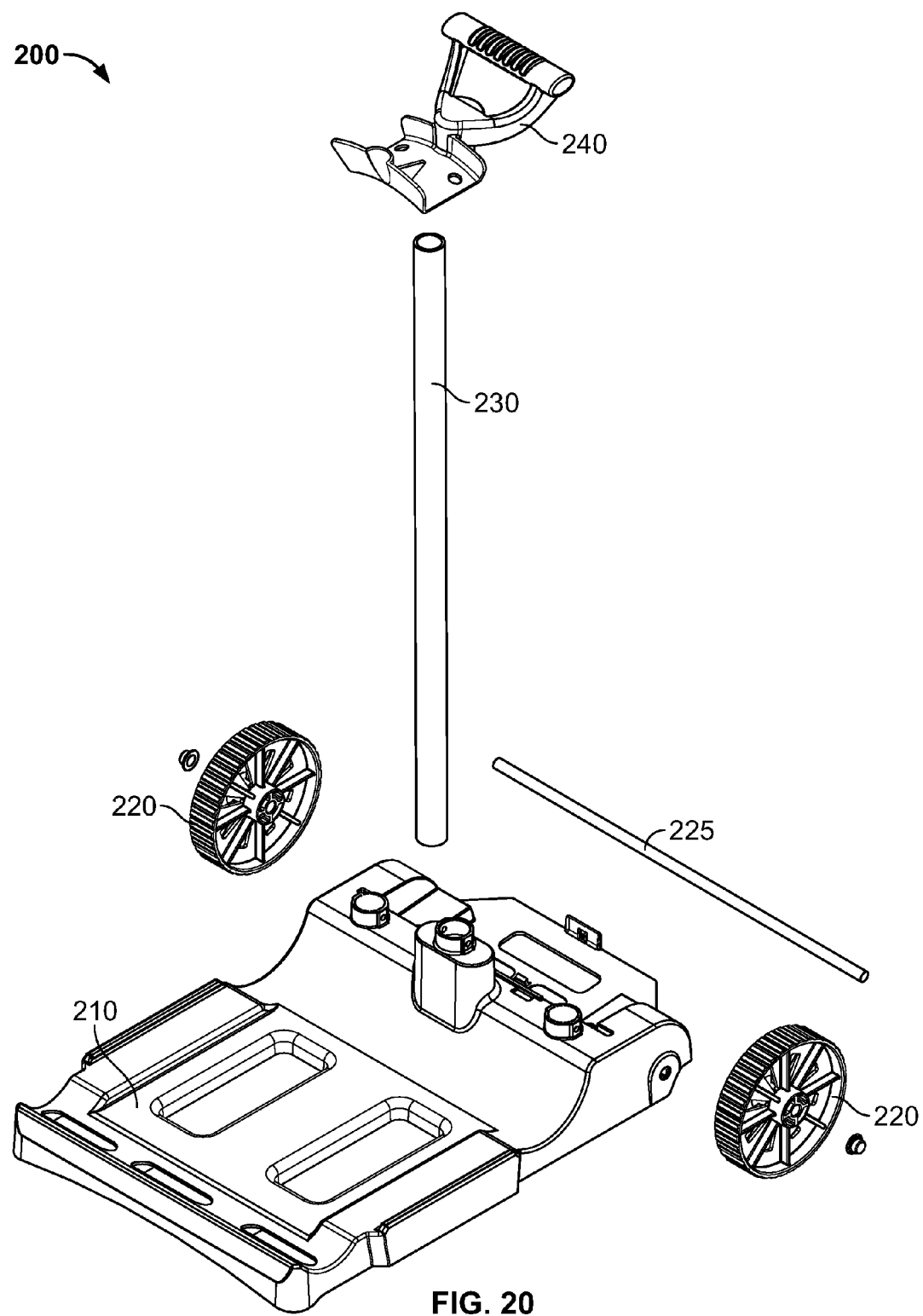
FIG. 20 depicts a perspective view of an exemplary caddy for the cleaner of FIGS. 1-8.
Figure 21:
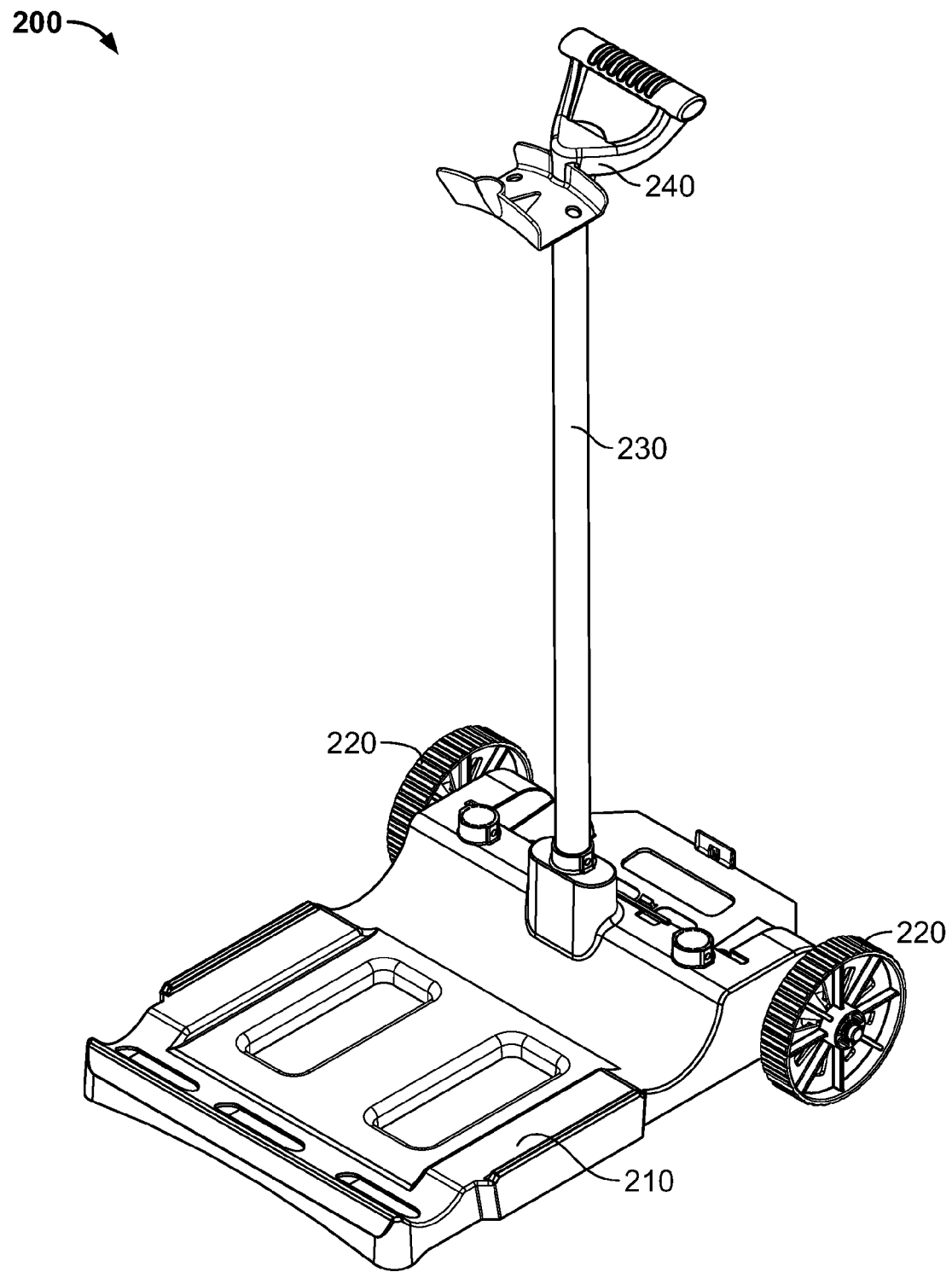
FIG. 21 depicts an exploded perspective view of the caddy of FIG. 20.
Figure 22:
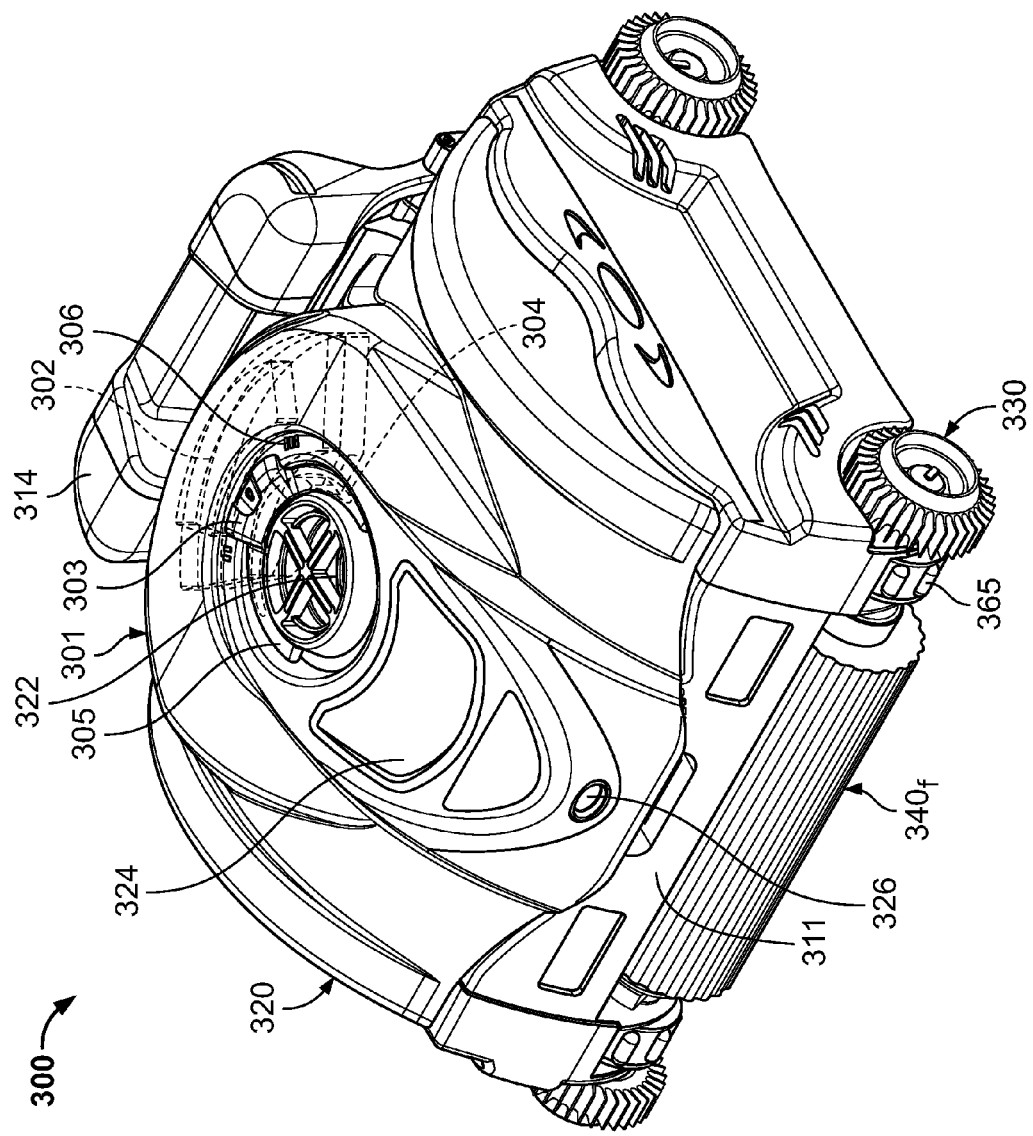
FIG. 22 depicts a perspective view of a cleaner in accordance with another embodiment of the present disclosure.

Referring now to FIGS. 20-21, an exemplary caddy 200 for the cleaner 100 of FIG. 1-8 is depicted. The caddy 200 can includes a support shelf 210 (configured and dimensioned to correspond with the bottom of the cleaner 100), wheel assemblies 220 (rotationally associated with the support shelf 210 by means of an axle 225), an extension 230, and a handle 240. In general the caddy 200 is used to facilitate transporting the cleaner, e.g., from a pool to a storage shed.

Referring now to FIGS. 1-21, an exemplary method for using the cleaner assembly 10 is presented according to the present disclosure. The power supply 50 of the cleaner assembly 10 is plugged in and the cleaner 100 of the cleaner assembly 10 is carried to the pool 20 and gently dropped there-into, e.g., using the cleaner handle 114 and or caddy 200. Note that the power cable 52 of the power supply 50 trails behind the cleaner 100. After the cleaner 100 has come to a rest on the bottom of the pool 20, the cleaner assembly 10 is switched on using the transformer/control box 51. The transformer/control box 51 transforms a 120VAC or 240VAC (alternating current) input into a 24VDC (direct current) output, respectively. The 24VDC is communicated to the motor drive assembly 160 via the power cable 52, wherein it powers a gear motor associated with the one or more drive shafts 166 and a pump motor associated with the impeller 162C. Note that in exemplary embodiments, the motor drive assembly 160 may include a water detect switch for automatically switching the gear motor and pump motor off when the cleaner 100 is not in the water. The motor drive assembly can include hardwired (or other) logic for guiding the path of the cleaner 100.

The gear motor drives the wheel assemblies 130 and the roller assemblies 140. More particularly, the gear motor powers one or more drive shafts 166, which drive the drive belts 165. The drive belts 165 drive the bushing assemblies 135. The bushing assemblies 135 turn axles 143B, and the axles 143B rotate the wheel assemblies 130 and the rollers 141 of the roller assemblies 140. The cleaner 100 is propelled forward and backward while scrubbing the bottom of the pool 20 with the rollers 141.

The motor drive assembly 160 can include a tilt switch for automatically navigating the cleaner 100 around the pool 20, and U.S. Pat. No. 7,118,632, the contents of which are incorporated herein in their entirety by reference, discloses tilt features that can be advantageously incorporated.

The primary function of the pump motor is to power the impeller 162C and draw water through the filter assembly 150 for filtration. More particularly, unfiltered water and debris are drawn via the intake apertures 113 of the housing assembly 100 through the intake channels 153 of the filter assembly 150 and into the one or more bucket-shaped intake flow regions 157, wherein the debris and other particles are trapped. The water then filters into the one or more vent flow regions 158. With reference to FIG. 11, the flow path between the intake flow regions 157 and the vent flow regions 158 can be through the side filter panels 154 and/or through the top filter panels 155. The filtered water from the vent flow regions 158 is drawn through the intake openings defined by the apertured support 162A of the impeller 162C and discharged via the filtration vent shaft.

A user may from time-to-time look through the windows 124 of the lid assembly 120 to confirm that the filter assembly 150 is working and/or to check if the intake flow regions 157 are to be cleaned of debris. If it is determined that maintenance is required, the filter assembly 150 is easily accessed via the top of the cleaner 100 by moving the lid assembly 120 to the open position. The filter assembly 150 (including the body 151, frame 156, and filter elements) may be removed from the base 111 of the cleaner 100 using the filter handles 151(C). The user can use the facially accessible quick-release mechanism to remove the rollers 141 from the cleaner 100 by simple release of the radially-extending fastener 144. The roller 141 can be cleaned and/or replaced.

FIGS. 22-31 show an alternative embodiment of a cleaner 300 in accordance with the present disclosure having variations relative to the cleaner 100 disclosed above. More particularly, the lid assembly 320 has a raised portion 301 that accommodates a plastic housing 369 containing an adjustable float 302 (shown in dotted lines). The adjustability of the float 302 may be accomplished by positioning the housing 369. The adjustable float 302 may be made from a polymeric foam, e.g., a closed cell polyethylene foam and may or may not be contained within a housing 369. A float position selector 303 passes through a selector aperture 304 (shown in dotted lines) extending through the lid assembly 320 proximate the vent aperture 322 and connects to the housing 369 that encloses the adjustable float 302 beneath the lid assembly 320. The position selector 303 has arcuate plates 305 extending from either side for occluding aperture 304 when the position selector occupies the optional positions available. The position selector 303 may be made from a polymer, such as polyoxymethylene (acetal). In the embodiment depicted, e.g., in FIG. 22, there are three alternative positions that the float 302 and selector 303 may occupy and these three positions are labeled with indicia 306 on the lid 320 proximate the position selector 303. Any number of alternative positions could be provided. The arcuate plates 305 may also have one or more teeth extending from a bottom surface thereof (not shown) which engage mating notches formed in an opposed surface of the lid assembly 320, the acuate plates 305 being resiliently deformable and the teeth and notches acting as a detent mechanism to retain the position selector 303 in a given position. As would be known to one of normal skill in the art, alternative position holding mechanisms could be employed, such as a spring urged detent ball in the lid assembly 320 and mating depressions formed in the position selector 303 or in the arcuate plates 305. As can be appreciated from FIGS. 22-28, the cleaner 300 has many components in common with the cleaner 100 described above. For example, the base 311, the motive/drive elements, such as wheel assemblies 330, drive belts 365 and rear roller/scrubber 340r, the cleaning/filtering apparatus and function including the impeller motor 360, intake apertures 313, intake channels 353, filter assembly 350 impeller assembly 362, vent channel 352 are all substantially the same and operate the in the same manner as in cleaner 100. As in cleaner 100, the cover 320 is hinged at hinge 315 to provide access to the interior of the cleaner 300. Other than the lid assembly 320, handle 314 configuration, front roller $340_f$, transparent window 324 shape and other particular features and functions described below, cleaner 300 is constructed and operates in the same manner as cleaner 100 described above.

Figure 23:
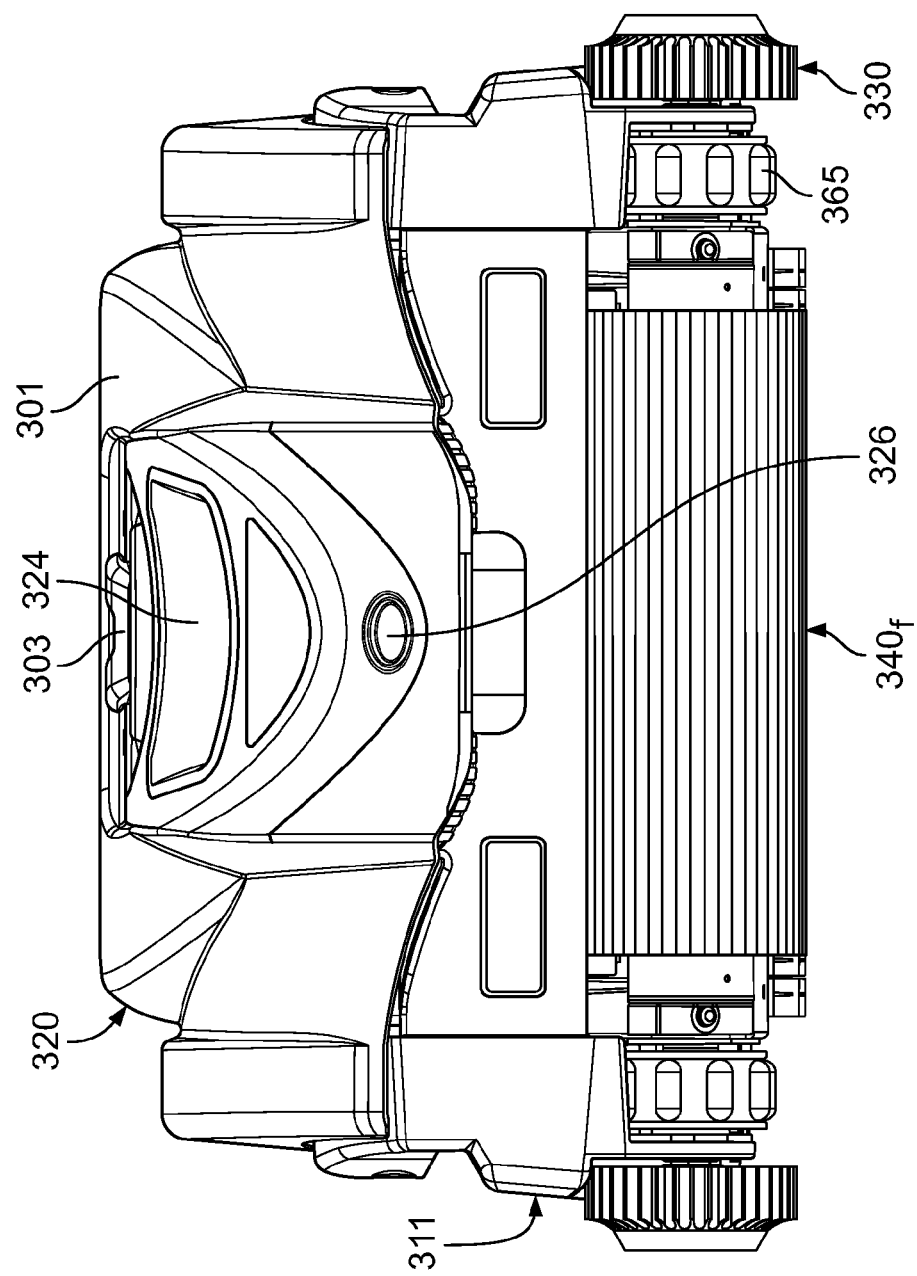
FIG. 23 depicts a front elevational view of the cleaner of FIG. 22.
Figure 24:
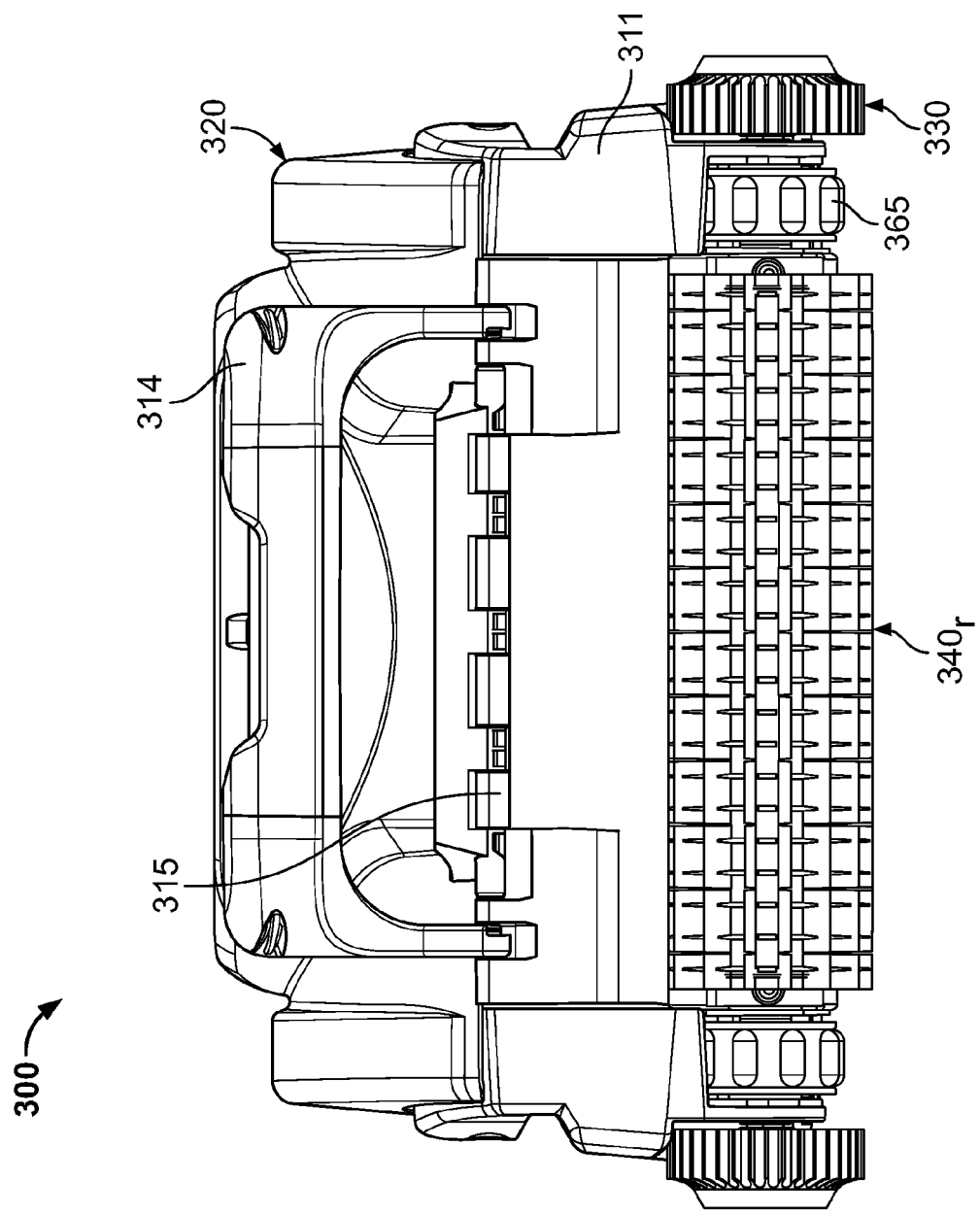
FIG. 24 depicts a rear elevational view of the cleaner of FIGS. 22 and 23.
Figure 25:
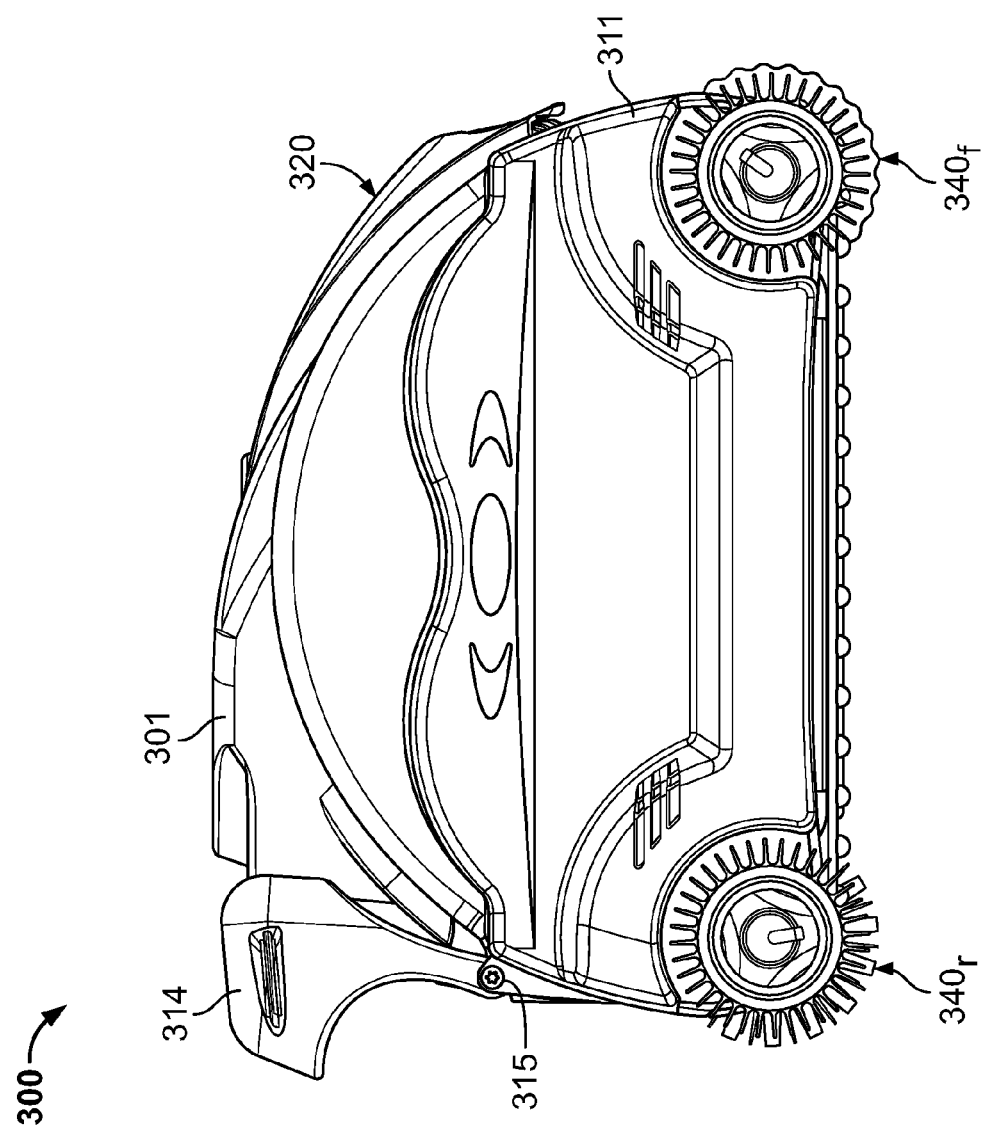
FIG. 25 depicts a side elevational view of the cleaner of FIGS. 22-24.
Figure 26:
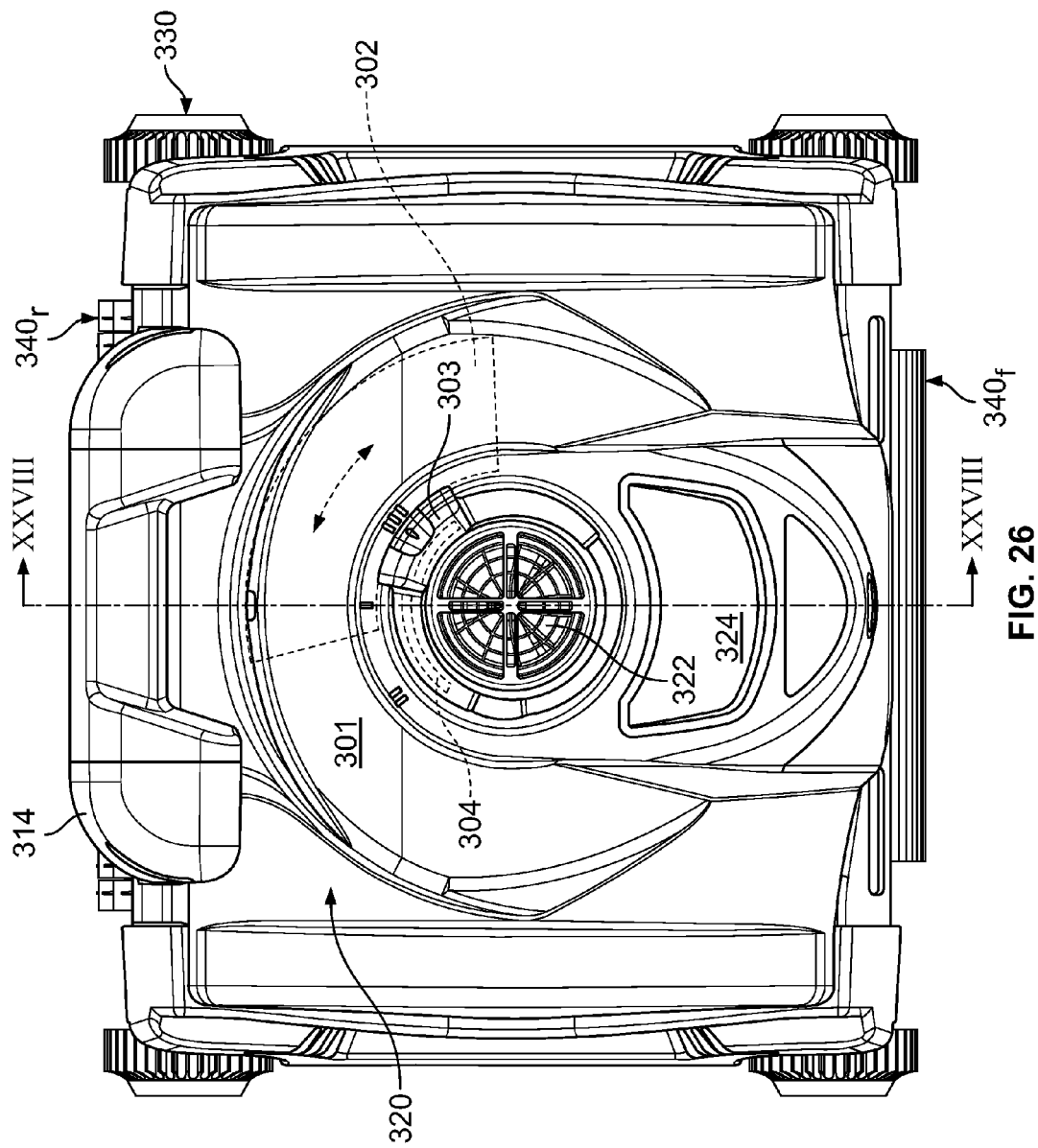
FIG. 26 depicts a top plan view of the cleaner of FIGS. 22-25.
Figure 27:
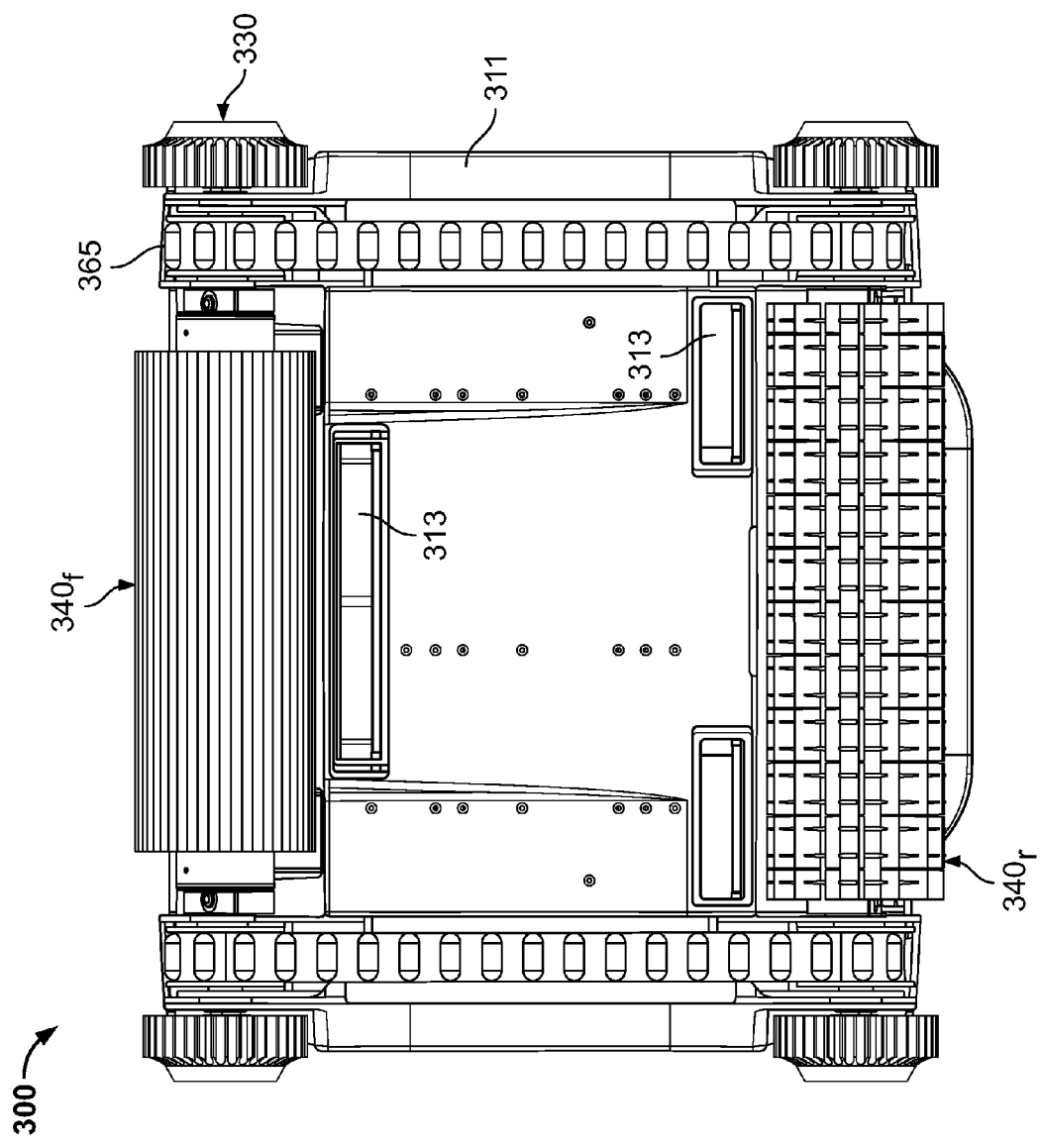
FIG. 27 depicts a bottom plan view of the cleaner of FIGS. 22-26.
Figure 28:
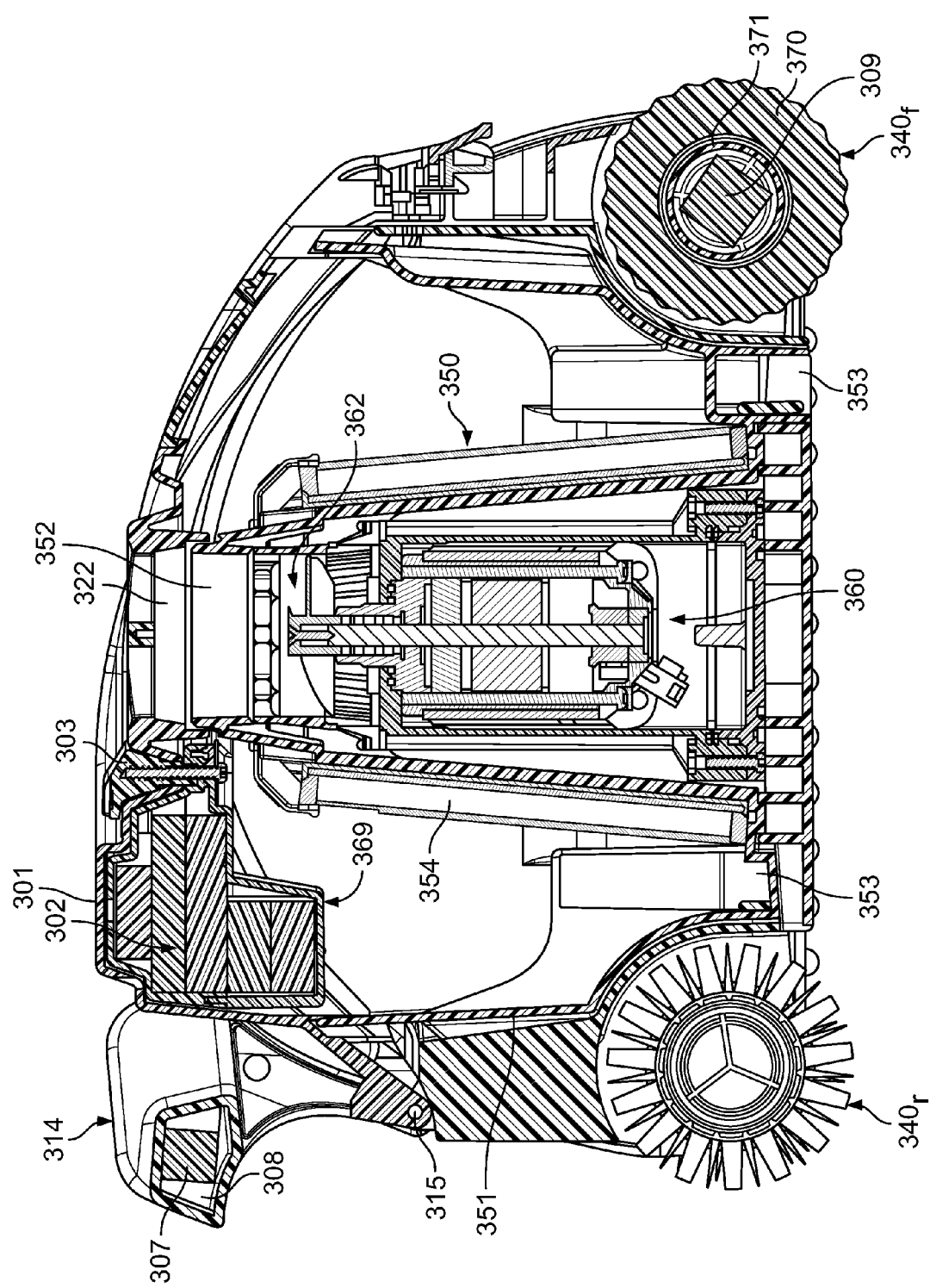
FIG. 28 depicts a cross-sectional view of the cleaner of FIG. 26 taken along section line XXVIII-XXVIII and looking in the direction of the arrows.

The front roller/scrubber $340_f$ has a different configuration than in cleaner 100, in that it is shown as having a foam outer layer 370, e.g., made from PVA foam, over a PVC core tube 371, the interior of which contains an internal float 309, e.g., made from polyethylene foam, to provide enhanced buoyancy (see FIG. 28). The handle 314 of cleaner 300 is shorter than cleaner 100 for the purpose of realizing different buoyancy characteristics, as shall be explained further below, and may have a hollow 308, which may accommodate a float 307, e.g., made from polyethylene foam or other suitable materials, such as polyurethane foam or the like. Alternatively, the hollow 308 may be sealed and filled with air to provide a floatation function. The same may be said of any buoyant elements mentioned herein, i.e., they may be formed as a contiguous pocket of air or other gas, as in the motor box 361 (see FIG. 31-shown in phantom), a material containing a plurality of gas pockets, such as closed cell foam, or any material having a density less than water. As shown in FIG. 23, the window element 324 is smaller due to the raised area 301 and adjustable float 302. As can be appreciated, placing the adjustable float 302 beneath the lid 320 may permit a reduction in floatation function otherwise provided by other elements of the cleaner 300. For example, if the handle 314 has a floatation function and/or is utilized to apply twisting positioning forces on the cleaner 300, any reduction in handle 314 size or profile (e.g., making the handle shorter relative to the overall height of the cleaner 300) may have a beneficial effect on cleaner 300 performance. For example, a cleaner 300 with a shorter handle 314 will be more aerodynamic and will have a decreased tendency for the handle 314 to catch on pool features, such as ladders.

Figure 29:
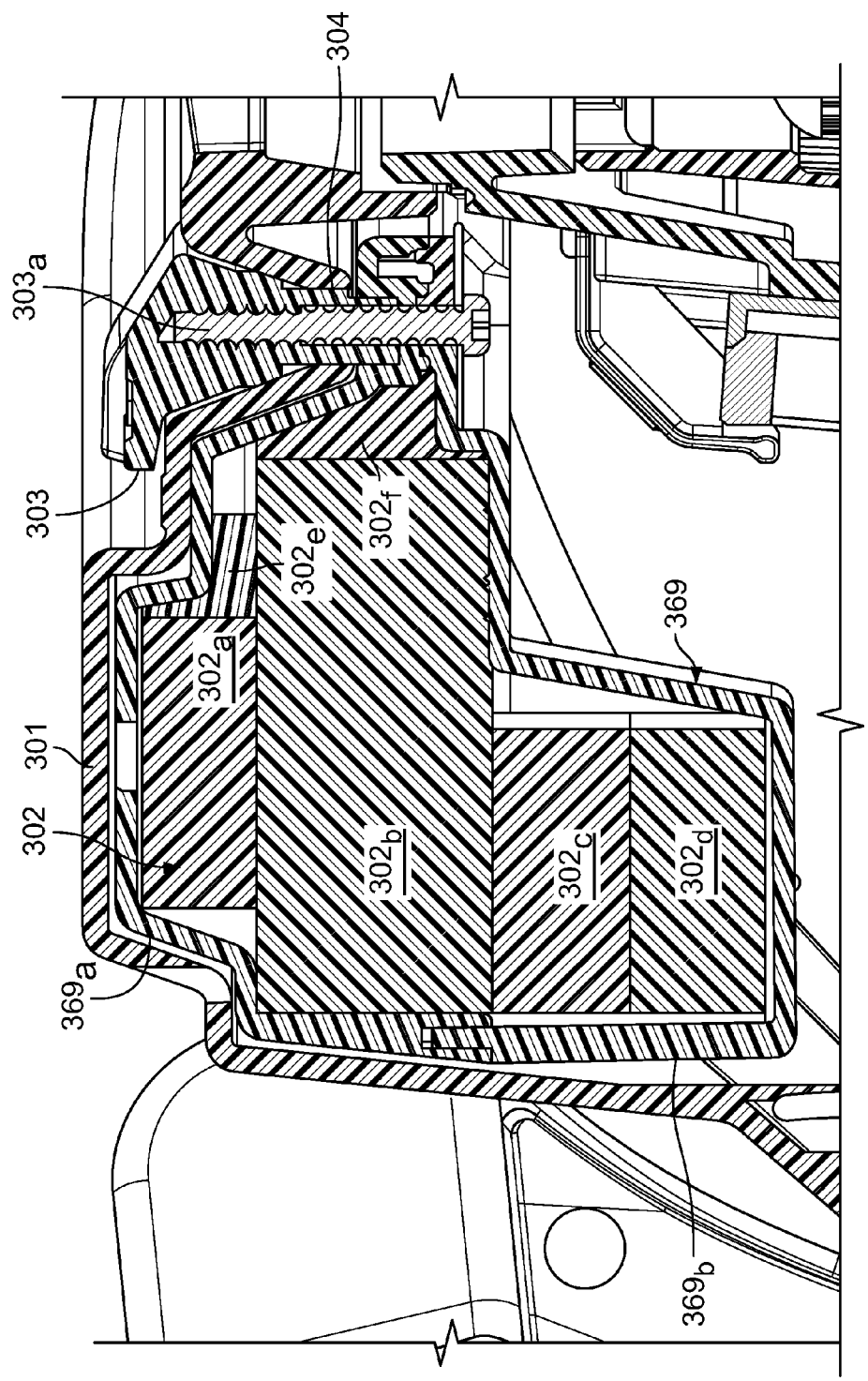
FIG. 29 depicts an enlarged portion of the cleaner of FIG. 28.

FIG. 29 shows that the adjustable float 302 may be formed from a plurality of subsections $302_a$-$302_f$ of floatation material, such as plastic foam. which may be glued together to approximate the internal shape of the adjustable float 302. Alternatively, the subsections $302_a$-$302_f$ may all be conjoined in a single molded float element. The adjustable float 302 may be contained within a housing 369 having an upper housing portion $369_a$ and a lower housing portion $369_b$, e.g., fowled from ABS plastic (not buoyant) which clip together to contain the float subsections $302_a$-$302_f$. The upper housing portion $369_a$ and/or the lower housing $369_b$, may be provided with drain holes/slits 369c (FIG. 30) to allow water to flow in and out. Drain holes may also be provided in the handle 314 and in the front roller $340_f$ to allow water to drain out of these elements. A fastener $303_a$ may be utilized to connect the position selector 303 to the adjustable float 302 and/or float housing 369 (as shown) and may also aid in retaining the upper housing $369_a$ and the lower housing $369_b$ in an assembled state.

Figure 30:
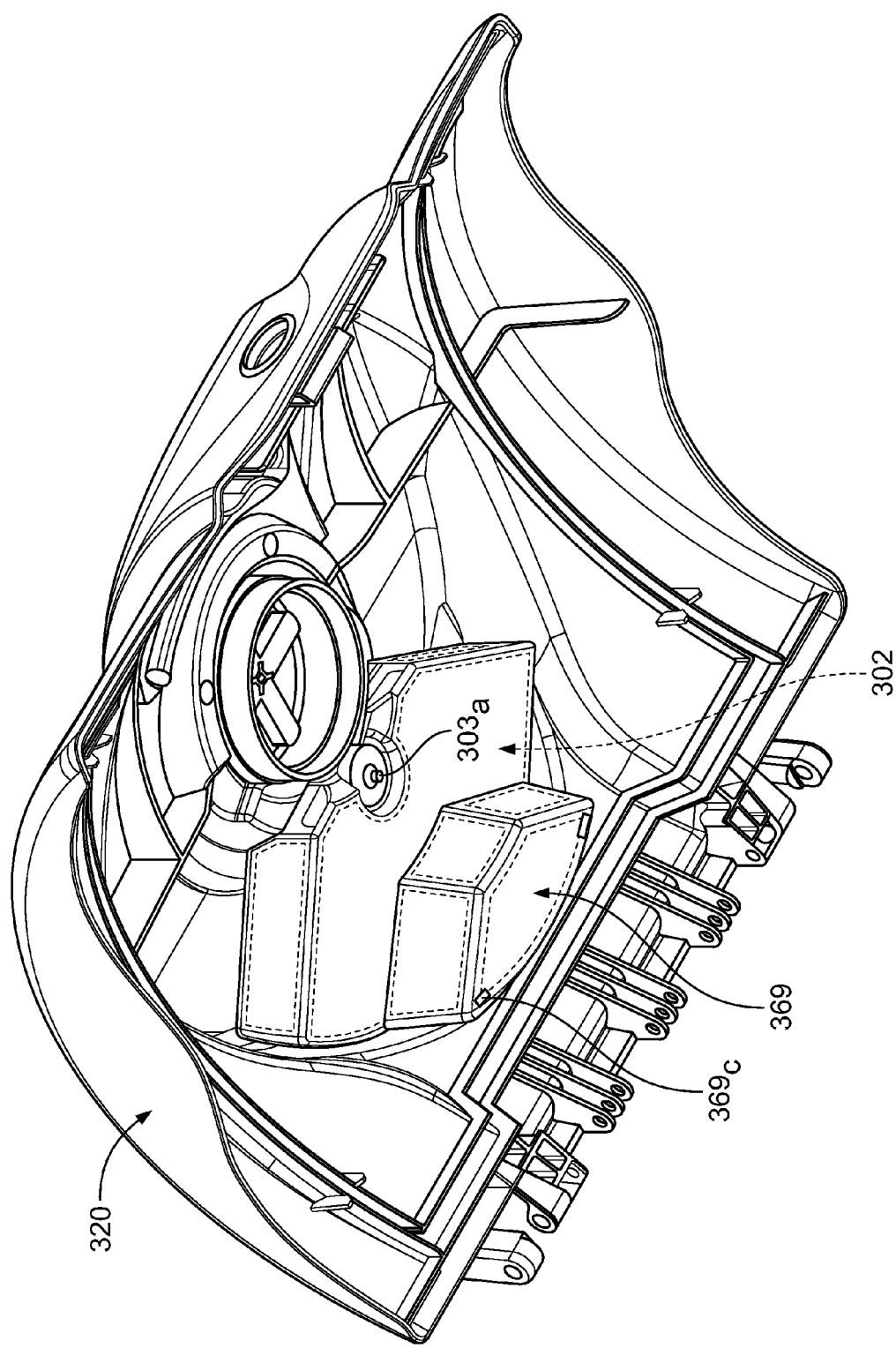
FIG. 30 depicts a bottom perspective view of the lid assembly of the cleaner of FIGS. 22-29.

FIG. 30 shows that the housing 369 may have a compound shape to fit and move within the internal confines of the cleaner 300 and lid assembly 320, in particular, within the raised portion 301, to establish a desired distribution of buoyancy.

Figure 31:
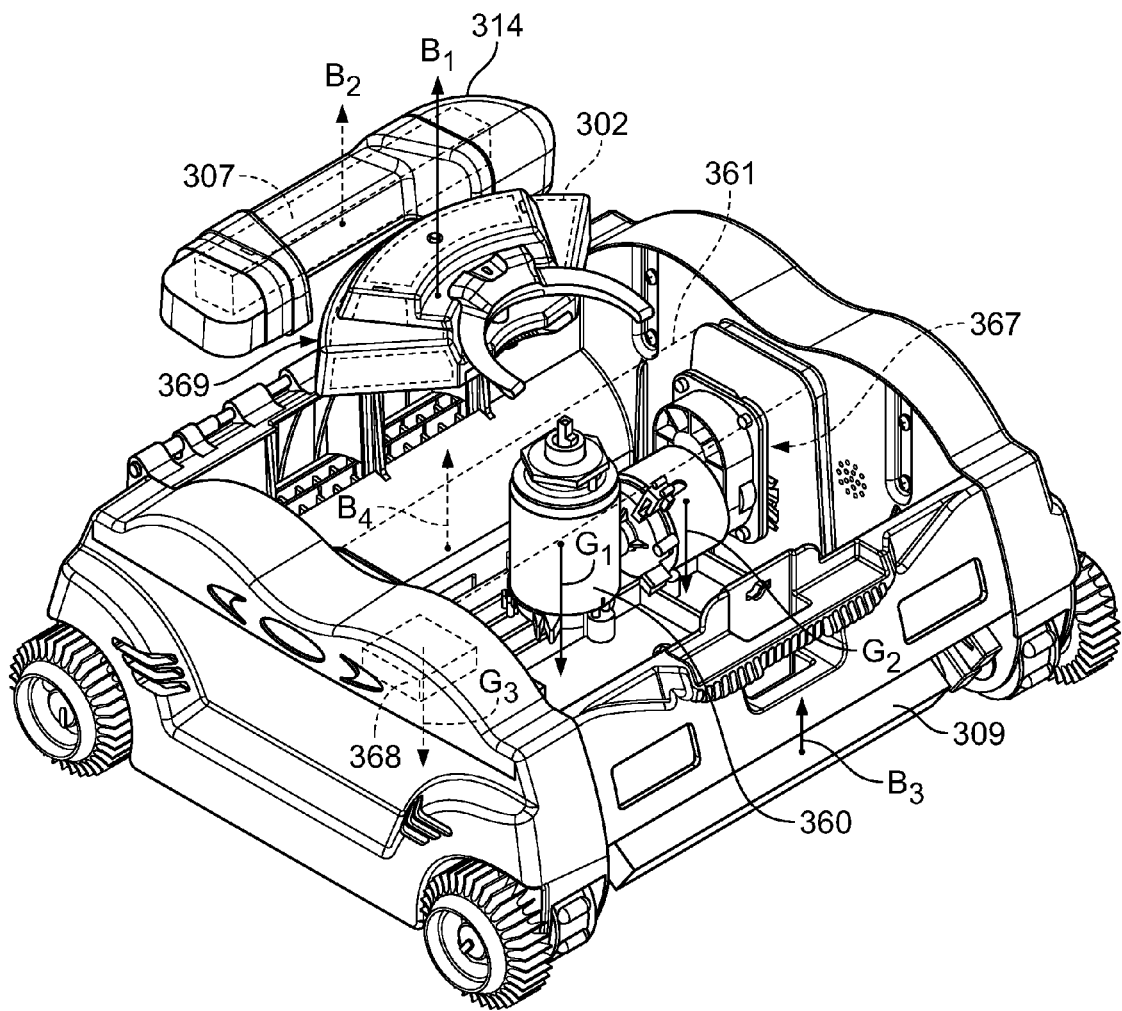
FIG. 31 depicts a perspective, partially phantom view of portions of the cleaner of FIGS. 22-30.

FIG. 31 shows selected parts which contribute to mass/weight and to buoyancy, i.e., those elements that have a density lower than water. More specifically, the adjustable float 302, handle float 307, float 309 in front roller 340$_f$ and motor box/casing 361, a total of four structures, are depicted as exhibiting buoyancy in water, as shown by the upwardly pointing arrows, $B_1$, $B_2$, $B_3$, and $B_4$, respectively. The impeller motor 360, drive motor and gear assembly 367 and balancing weight 368, all have a density greater than water, as indicated by downwardly pointing arrows $G_1$, $G_2$ and $G_3$, respectively. Since all parts of the cleaner 300 have a specific density, all components have an associated buoyancy or weight when in water. As a result, FIG. 31 is a simplified drawing which shows only selected downwardly directed weights and upwardly directed buoyant forces. The combination of motor box 361 and contained impeller motor 360, drive motor and gear assembly 367 and balancing weight 368 may exhibit an asymmetric weight/buoyancy or, by selecting an appropriate balancing weight 368, the weight/buoyancy can be symmetrically disposed from one or more perspectives, e.g., when the cleaner 300 is viewed from above, from the front and/or from the side. This balanced configuration is explained more fully below in reference to cleaner 400 of FIGS. 38-43.

Figure 32:
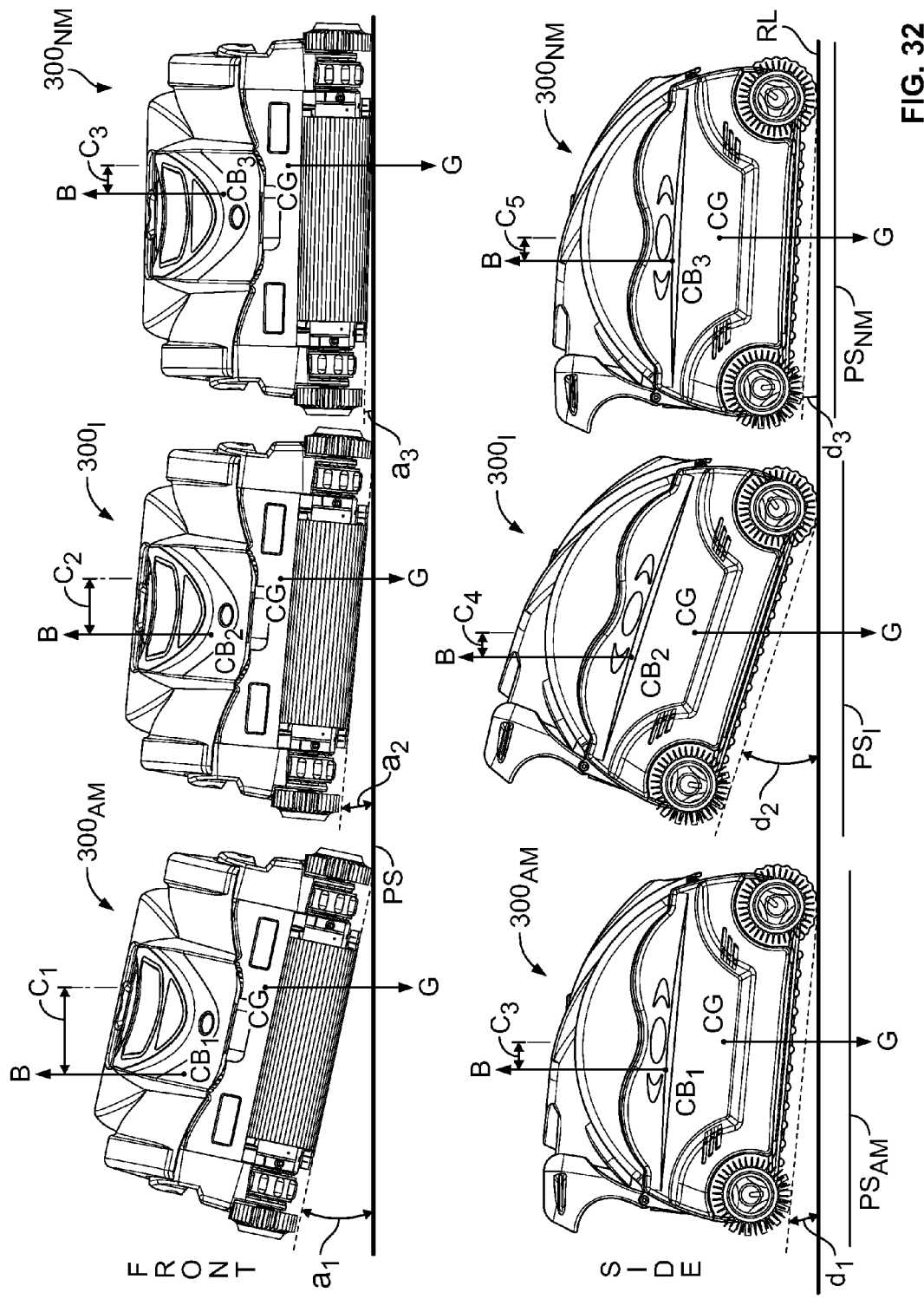
FIG. 32, depicts diagrammatic views of the cleaner of FIGS. 22-31 on a pool floor surface in various states of buoyancy and weight distribution.

FIG. 32 shows the cleaner 300 described in FIGS. 22-31 in various orientations relative to a pool surface PS, such as a pool floor, when submerged in water. The cleaner reference numbers 300 have been given subscripts, e.g., "AM" to indicate the position of the adjustable float associated with the specific orientation of the cleaner shown. More particularly, at the top of FIG. 32 a front view of three cleaners is shown and labeled "FRONT." Cleaner $300_{AM}$ is shown lifted up on one side defining an angle $a_1$ relative to surface PS. Cleaner $300_{AM}$ depicts an orientation associated with moving the adjustable float 302 away from the drive motor and gear assembly 367 and towards the buoyant air pocket contained within the motor box 361. The various buoyant forces attributable to the various components of the cleaner which are lighter than water could be resolved into and expressed as a single buoyant force vector B which emanates from a center of buoyancy CB. Similarly, all components of the cleaner heavier than water can be resolved into a single downward force modeled by vector G emanating from a center of gravity CG. It is understood that the elements of the cleaner 30 having a positive buoyancy contribute to the center of gravity when above water, but not below water, and that the effective center of gravity will shift somewhat when the cleaner is placed in the water. This dynamic is understood and is incorporated into the term "center of gravity" as used herein when referring to the cleaner when in the water. The adjustable float 302 of the present disclosure permits the redistribution of buoyancy and weight and allows the center of buoyancy to be moved relative to the center of gravity (both when above and below water) in a controlled manner, thereby effecting the static orientation of the cleaner and the dynamics of the cleaner when it is operating/traveling over the surfaces (walls and floor) of a pool.

As shown in FIG. 32 at the top, when the adjustable float 302 is placed in a position away from the drive motor and gear assembly 367, as shown by cleaner $300_{AM}$, the distance $C_1$ between the gravity vector G and the buoyancy vector B is large, resulting in a large tilt angle $a_1$. $C_1$ representing a torque arm over which buoyancy vector B may act to twist the cleaner about the center of gravity CG and on the pivot point established by the wheels 330 of the cleaner in contact with the pool surface PS (such as a pool floor). When the adjustable float 302 is moved to an intermediate position, the cleaner $300_I$ exhibits a decreased tilt angle $a_2$ because the center of buoyancy $CB_2$ acts through a smaller torque arm $C_2$ and because the cleaner has an overall negative buoyancy (depicted by gravity vector G being greater than buoyancy vector B, so the cleaner 300 sinks in all positions of the adjustable float 302). When the adjustable float 302 is positioned near the drive motor and gear assembly 367 and away from the buoyant air pocket captured in the motorbox 361, as shown in cleaner $300_{NM}$, the lift angle $a_3$ and the distance $C_3$ are diminished further. All of the foregoing and following illustrations of force locations and magnitudes pertaining to buoyancy and weight are illustrative only and are not meant to express actual experimental values. FIG. 32 at the bottom, labeled, "SIDE," depicts the orientation of the cleaner 300 as viewed from the side in various positions of the adjustable float 302. A reference line RL parallel to the pool surfaces shown in conjunction with each of the orientations, viz., $PS_{AM}$, $PS_I$ and $PS_{NM}$, allows side-by side comparison of the respective, rear-to-front lift angles. More particularly, the cleaner $300_{AM}$ exhibits a higher tilt angle $a_1$ from the pool surface PS than either $300_I$ or $300_{NM}$, but the lift angle $d_1$ of $300_{AM}$ is less than the lift angle $d_2$ of $300_I$ where the adjustable float is positioned at an intermediate side-to-side position but extends rearward further than either $300_{AM}$ or $300_{NM}$. From the side, the distance $C_4$ is greater than either $C_3$ in $300_{AM}$ or $C_5$ in $300_{NM}$, a greater torque arm being consistent with a greater lift angle $d_2$.

Figure 33:
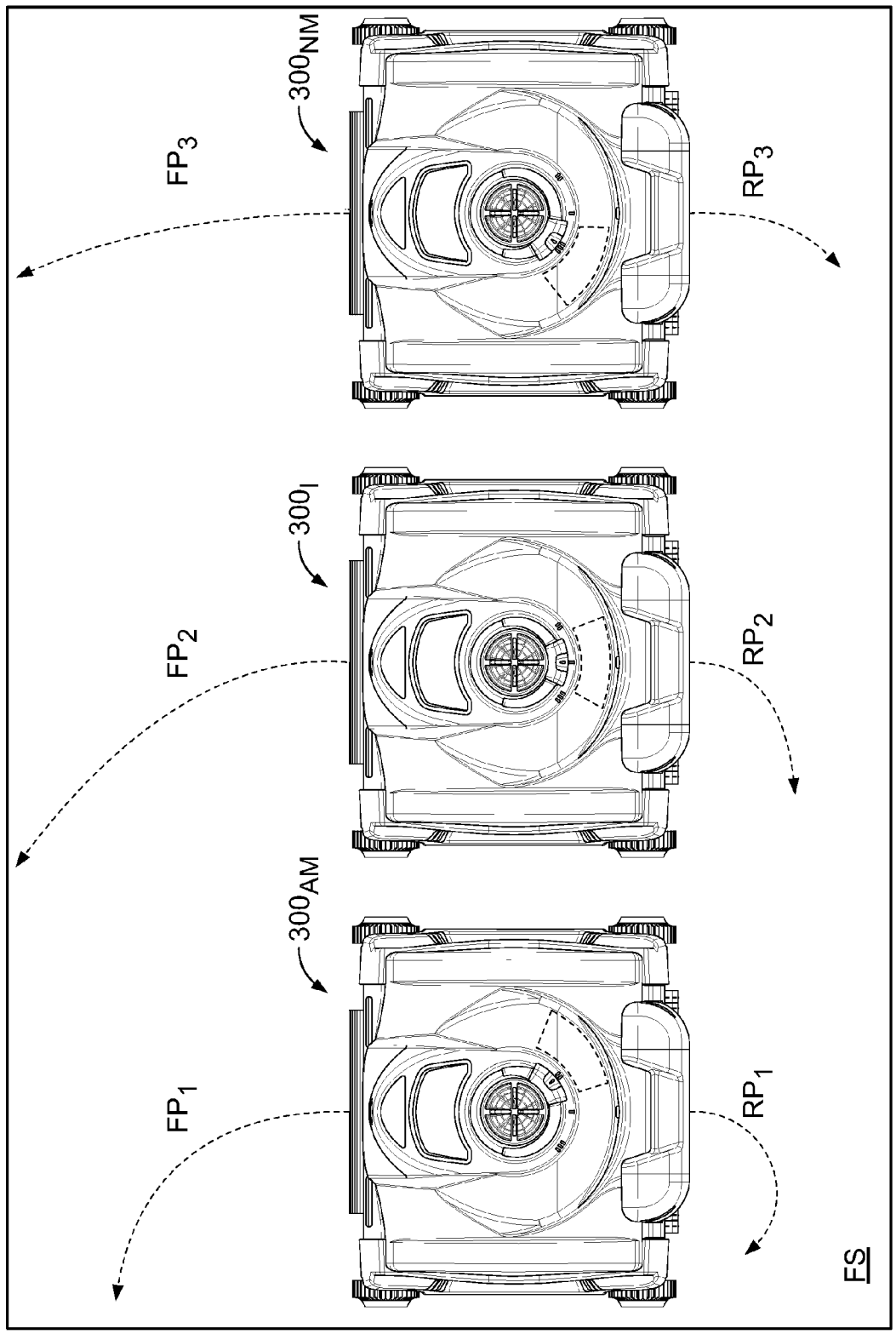
FIG. 33 depicts diagrammatic view of exemplary motion paths of the cleaner of FIG. 32 in various states of buoyancy and weight distribution.

FIG. 33 depicts the impact of the position of the adjustable float on the turning motion of the cleaner on the floor surface FS of a pool. More particularly, when the adjustable float is positioned away from the drive motor and gear assembly 367, as shown by cleaner $300_{AM}$, the cleaner has a large side-to-side tilt angle $a_1$, as shown in FIG. 32. The minimal, one-sided contact of the motive elements, viz., the wheels 330, drive belt 365 and brushes 340$_f$ and 340$_r$, leads to accentuated turning through an arc of small radius when going forward, as depicted by forward path $FP_1$. The reverse path $RP_1$ has an even smaller radius of curvature due to the lifting effect caused by the back-to-front lift angle $d_1$, as shown in FIG. 32. The back-to-front lift angle of the cleaner $300_{AM}$ may be utilized to allow the cleaner to over-ride obstacles protruding up from the pool surface PS, such as drain fittings, which would otherwise impede the motion path of the cleaner $300_{AM}$. As the side-to-side tilt angle $a_1$ is reduced by moving the adjustable float 302 to the intermediate and near-the-motor positions, as depicted by cleaners $300_I$ and $300_{NM}$, the turn radius is increased, as shown by forward paths $FP_2$ and $FP_3$, respectively.

Figure 34:
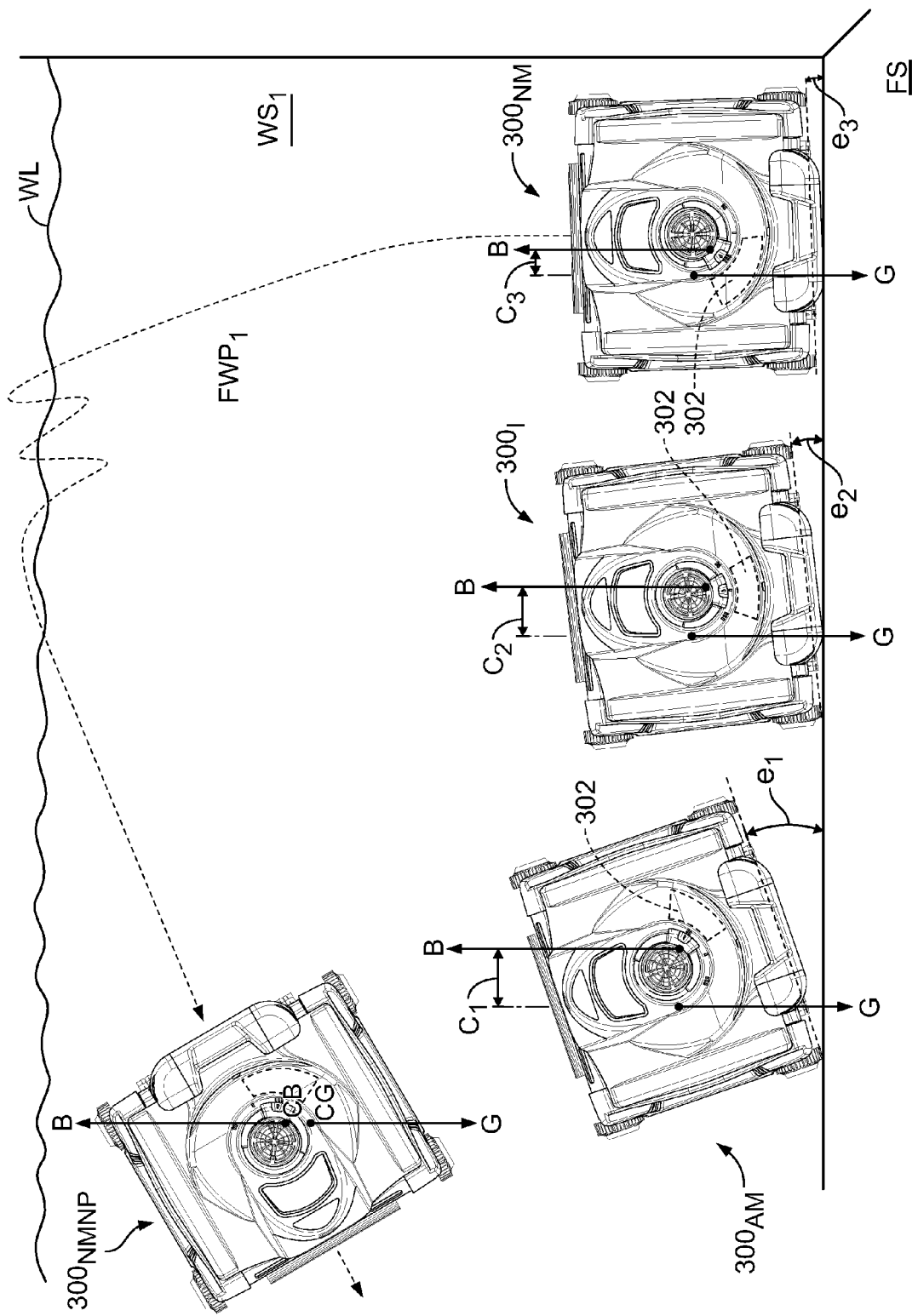
FIGS. 34 and 35, depict diagrammatic views of the cleaner of FIGS. 22-31 in wall-climbing position in various states of buoyancy and weight distribution, as well as an exemplary motion path in FIG. 34.

FIG. 34 shows three alternative orientations for cleaners $300_{AM}$, $300_I$ and $300_{NM}$ as they mount a wall surface $WS_1$ of a pool as influenced by the position of the adjustable float 302, viz., in the positions away from the drive motor and gear train 367, at an intermediate position, and near the drive motor and gear train 367, respectively. These positions for the adjustable float have corresponding distances $C_1$, $C_2$ and $C_3$ between the buoyancy vector and the gravitation vector G (these distances are measured as the perpendicular distance between the two vectors). The three orientations of cleaners $300_{AM}$, $300_I$ and $300_{NM}$ show large, medium and small lift angles $e_1$, $e_2$ and $e_3$, respectively, associated with large, medium and small distances $C_1$, $C_2$ and $C_3$ (torque arms) and are intended to illustrate the increased probability of the cleaners $300_{AM}$, $300_I$ and $300_{NM}$ achieving those orientations as the cleaners transition from traveling on the floor surface FS to the wall surface $WS_1$. The actual orientation of a particular cleaner in operation would also be effected by the frictional interaction between the motive elements of the cleaner and the pool surfaces FS and $WS_1$ and by the surface-directed counterforce exerted in reaction to the impeller flow out the vent aperture 322. That is, the impeller induced flow presses the cleaner 300 down against the surfaces FS and $WS_1$ on which it rolls. This "down force" is what allows the motive elements of the cleaner 300 (drive belts 365, wheels 330, rollers/brushes $340_f$ and $340_r$) to frictionally engage the surfaces FS and $WS_1$ to traverse those surfaces and to climb the wall surface $WS_1$ against the force of gravity. Besides the effect of the impeller downforce, variations in the frictional interaction between the pool surfaces and the motive elements can be expected. For example, a gunite pool could be expected to have a surface roughness that enhances the frictional interaction with the motive elements of the cleaner as compared to a pool with a smoother surface, such as a fiberglass or tiled pool. Similarly, different types of coatings applied to the pool surfaces, such as paints, the presence of pool water treatment chemicals in the water and algae growth on the pool surfaces will impact frictional interaction between the pool surfaces and the cleaner. In addition, the composition of the motive elements of the cleaner will impact frictional interaction with the pool surfaces. In light of all the factors which can impact cleaner motion, it is therefore appropriate to describe influences on motion attributable to movement of an adjustable buoyant element, like float 302 in terms of increased or decreased probabilities of the cleaner to behave in a certain way.

In FIG. 34 cleaner $300_{NM}$ is shown near the floor surface FS with a small tilt angle $e_3$ due to a relatively small distance $C_3$ between the buoyancy vector B and the gravity vector G. In this state, there is an increased probability that the cleaner will have sufficient frictional interaction with the wall surface $WS_1$ to allow the cleaner to better resist the twisting torque exerted by the couple formed by the buoyancy B and gravity G vectors and track a substantially straight path $FWP_1$ in the forward direction on wall surface $WS_1$. As explained in greater detail below, in the event that the cleaner is executing a navigation algorithm which directs straight forward motion for the entire time that the cleaner $300_{NM}$ needs to reach the position of $300_{NMNP}$, then the cleaner $300_{NM}$ may travel up to the water line WL, extend above the water line WL and fall back into the water under the influence of a diminished buoyancy due to rising out of the water. The up and down motion could also be induced by a loss of down-force due to the entrainment of air into the intake apertures. Further, the sensing of an out-of-water condition due to diminished electrical loading of the impeller motor or a signal generated by an out of water sensor, such as due to a variation in conductance between two conductor elements could be used as a signal to temporarily turn the impeller motor OFF to diminish down-force and cause the cleaner to slip back into the water. The cleaner can therefore be induced to oscillate about the water line for a period until either the navigation algorithm dictates a change in motion or the buoyancy characteristics of the cleaner overcome its bobbing motion. As shown in the position of cleaner $300_{NMNP}$, the cleaner has an on-the-wall orientation where the buoyancy vector is directly opposed to the gravity vector and the center of buoyancy CB is directly above the center of gravity CG, such that there is no twisting torque exerted by the opposed vectors B and G. Since cleaner $300_{NMNP}$ has directly opposed vectors B and G, the buoyancy characteristics of the cleaner tend to twist it to this orientation. The probability of the cleaner executing a turn after reaching this position is therefore reduced (during the period that the navigation algorithm directs straight, forward or reverse motion).

Figure 35:
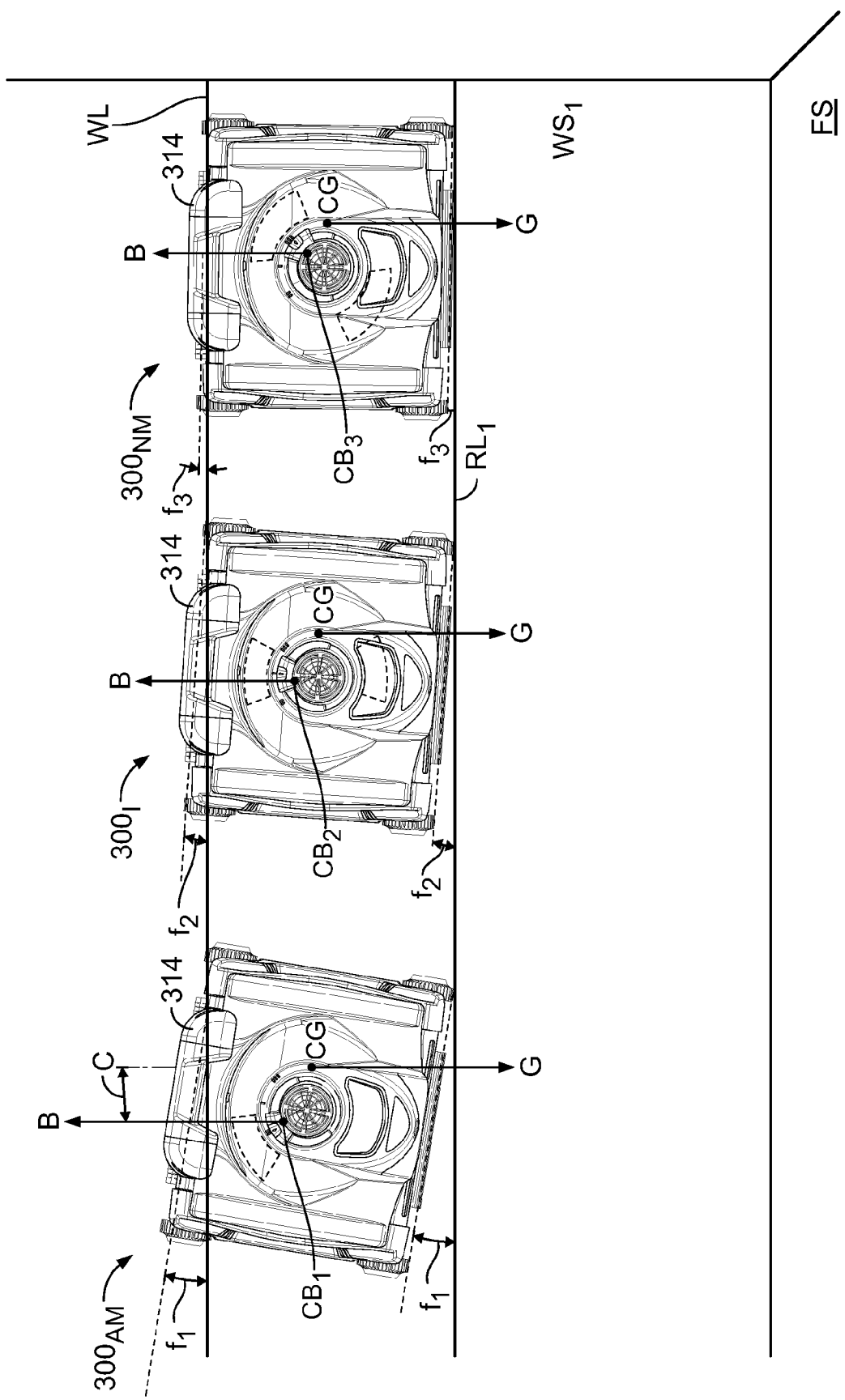

FIG. 35 shows the cleaner 300 in three different orientations $300_{AM}$, $300_I$ and $300_{NM}$ attributable to associated different positions of the adjustable float 302 (either away from the drive motor gear assembly 367, intermediate, or near the drive motor gear assembly 367, respectively) as it ascends a wall surface $WS_1$ in reverse (with the handle 314 pointing up) and proximate to the water line WL (which is depicted as a solid straight line to illustrate the angular orientation of the cleaner 300 relative thereto). Reference line $RL_1$ is substantially parallel to the line at the intersection of surfaces $WS_1$ and FS (assuming a flat floor surface FS). Since the center of buoyancy in each of these three positions is above the center of gravity, the cleaner does not have to invert to achieve a position of opposing buoyancy and gravity vectors (like $300_{NMNP}$ of FIG. 34). The probability of turning for a given path length is therefore reduced over that of the corresponding adjustable float position when the cleaner ascends the wall surface $WS_1$ in a forward (handle 314 down) orientation, like in FIG. 34. The probability of straight line motion and for the cleaner to reach the water line WL is increased by the handle-up orientation over that of the handle-down orientation (assuming a sufficiently large, buoyant handle 314/float 307). This is especially true of the orientation of cleaner $300_{NM}$. The above-described cleaner dynamics are given by way of example only and could be changed by modifying the cleaner to have a different center of gravity and/or center of buoyancy in the water.

Figure 36:
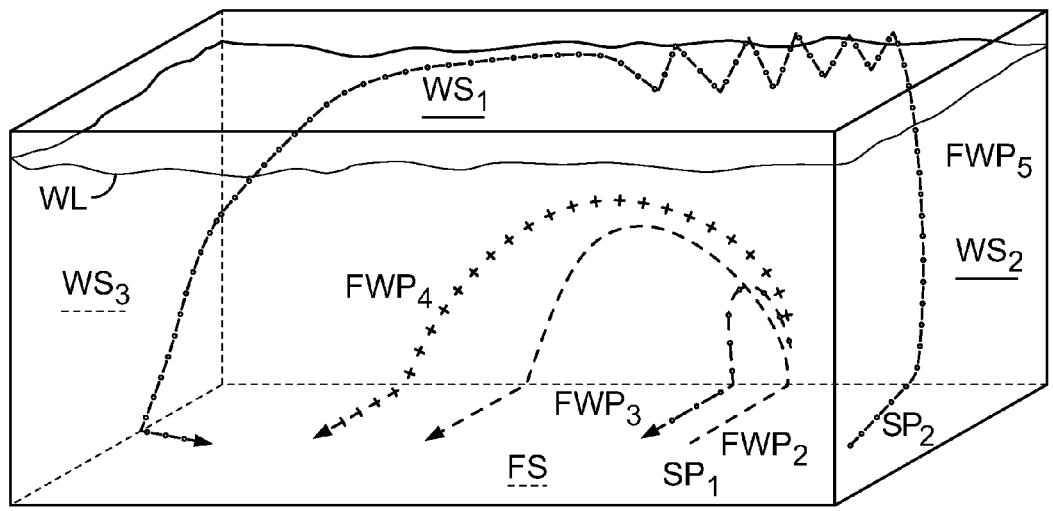
FIGS. 36 and 37 depict diagrammatic views of a variety of motion paths of the cleaner of FIGS. 22-31 in various states of buoyancy and weight distribution.

FIG. 36 shows a sample of paths that the cleaners $300_{AM}$, $300_I$ and $300_{NM}$ could take if operated in the forward direction. Cleaner $300_{AM}$ would have a greater probability of traversing paths with more severe turns, such as paths $FWP_2$ or $FWP_3$, but, depending upon the frictional interaction of the cleaner $300_{AM}$ and the pool surfaces FS, $WS_2$ and $WS_3$, the other paths $FWP_4$ and $FWP_5$ shown are possible. Cleaner $300_{NM}$ would have a greater probability of executing $FWP_4$ and $FWP_5$ than $FWP_2$ and $FWP_3$, but depending upon frictional interaction, could execute those paths, as well. Cleaner $300_I$ would likely execute paths $FWP_2$ and $FWP_4$, but the alternative paths shown are possible, as well, depending upon frictional interaction between the cleaner 300 and the pool surfaces. Note that $FWP_5$ executes a sawtooth pattern near the water line followed by an extended path approximately parallel to the waterline WL. The extended path parallel to the water line WL can continue all the way around the pool or be terminated due to buoyancy or frictional interaction factors or under algorithmic control, e.g., by turning the impeller motor OFF, to allow the cleaner to slide to the bottom of the pool.

Figure 37:
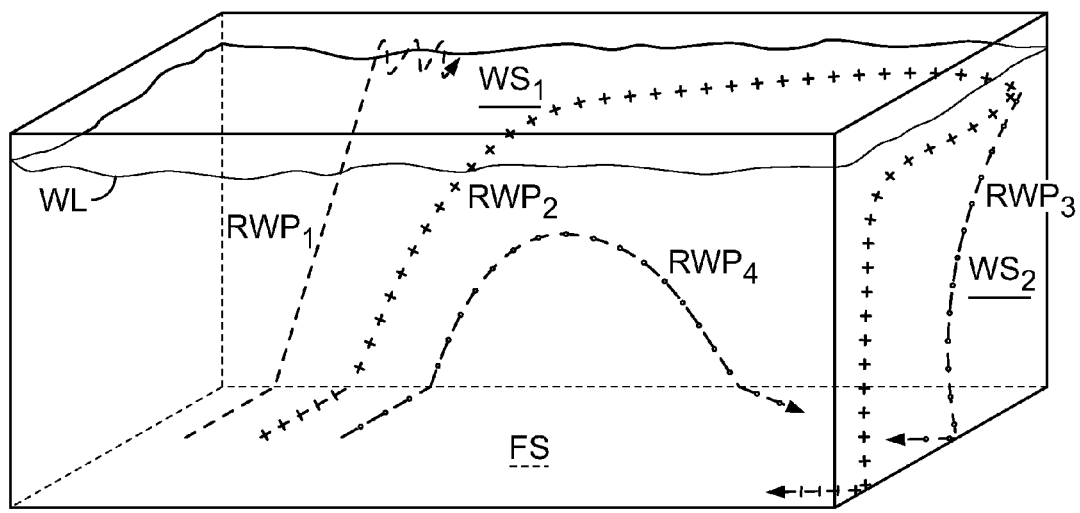

FIG. 37 shows a sample of paths that the cleaners $300_{AM}$, $300_I$ and $300_{NM}$ could take if operated in the reverse (handle up) direction, as shown in FIG. 35. Cleaner $300_{AM}$ would have a greater probability of traversing paths with more severe turns, such as path $RWP_4$, but the other paths illustrated could be taken, depending upon the frictional interaction of the cleaner $300_{AM}$ and the pool surfaces FS, $WS_2$ and $WS_3$. Cleaner $300_{NM}$ would have a greater probability of executing $RWP_1$ and $RWP_2$ than $RWP_3$ and $RWP_4$, but depending upon frictional interaction, could execute those paths, as well. Cleaner $300_I$ would likely execute paths $RWP_1$ and $RWP_2$, but the alternative paths shown are possible, as well, depending upon frictional interaction between the cleaner $300_1$ and the pool surfaces. The paths shown in FIGS. 36 and 37 are examples only and an infinite number of possible paths are possible.

Figure 38:
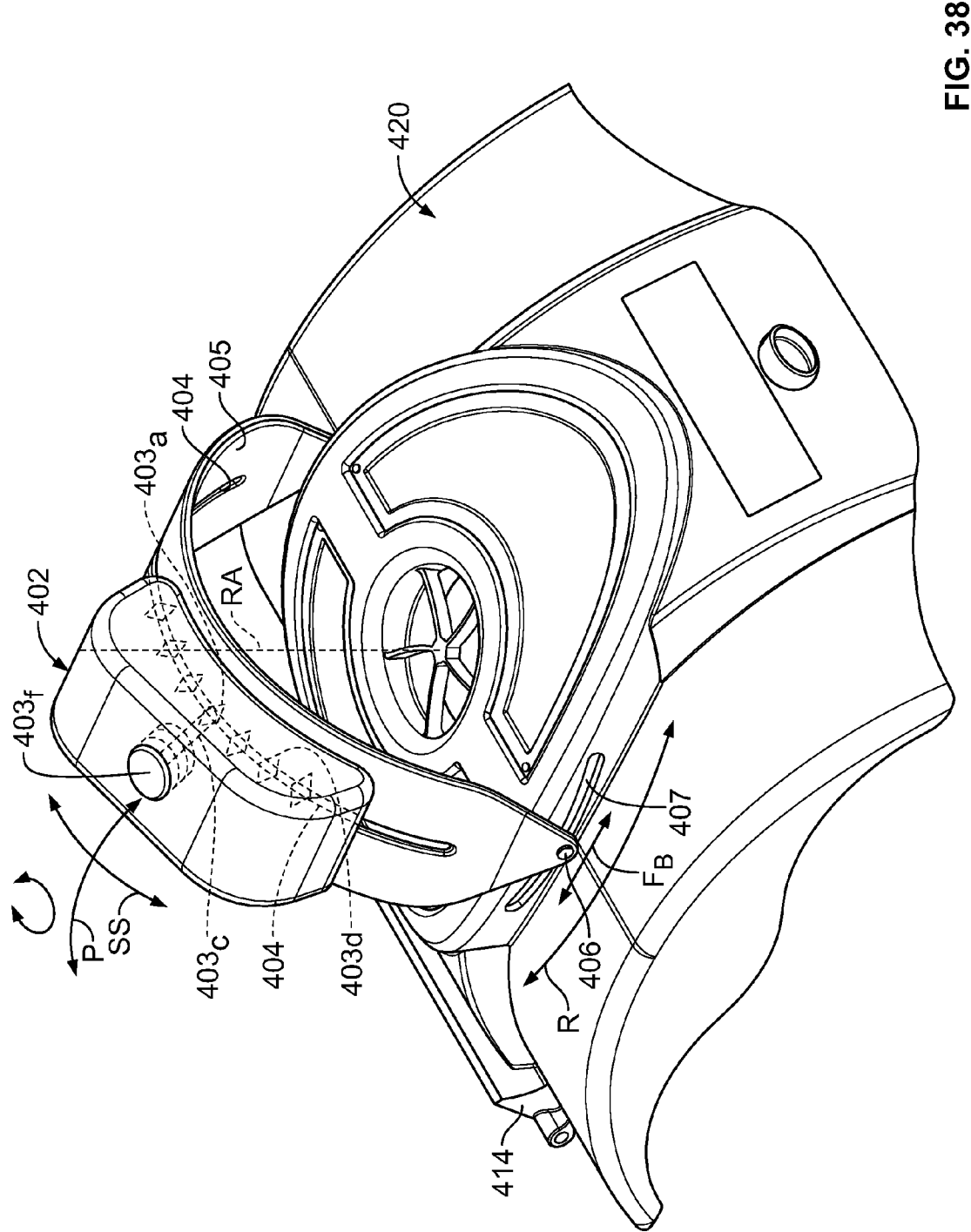
FIG. 38 depicts a perspective view of a cleaner in accordance with yet another embodiment of the present disclosure.

FIG. 38 shows an alternative embodiment of the present disclosure similar in all respects to cleaners 100, 300 except as illustrated and/or pointed out below. Cleaner 400 features an adjustable float 402 adjustably positioned along a float slide 405, e.g. by interaction of a tang 403a and toothed aperture 404. More particularly, a spring-loaded position selector button 403b connects to a shaft 403c the end of which has a laterally extending tang 403a. The tang 403a is receivable in one of a plurality of mating slots 403d in toothed aperture 404 to secure the adjustable float 402 in a selected position relative to the float slide 405. The adjustable float 402 may be made from a buoyant material, such as plastic foam. The adjustable float may optionally be inserted within a protective outer shell (not shown). Another alternative would be to encapsulate a pocket of air within a water-tight plastic shell. As indicated by the arrow SS, the adjustable float 402 may be moved to a selected position on the float slide 405 in a side-to-side movement. As indicated by arrow P, the float slide may be pivoted front-to-back at pivot attachment point 406 in slot 407, which pivotal attachment may be implemented by a wing nut or other conventional fastener. The underside of the float slide 405 and the outer surface of the lid assembly 420 may be dimpled or roughened in the area where these elements contact to enhance their frictional interaction to allow the float slide 405 to maintain a particular angular setting relative to the lid assembly 420 at the pivot point 406. The slot 407, which is preferably duplicated on the other side of the lid assembly 420, permits the float slide to be translated front-to-back as indicated by double-ended arrow FB and rotated about an axis RA as indicated by double-ended arrow R. While a separate handle 414 and float slide 405 are shown in FIG. 38, these two functions could be incorporated into a single element, e.g., a float slide 405 having a substantial thickness and sturdy attachment to the cleaner 400 to allow the cleaner 400 to be lifted by the float slide 405.

Figure 39:
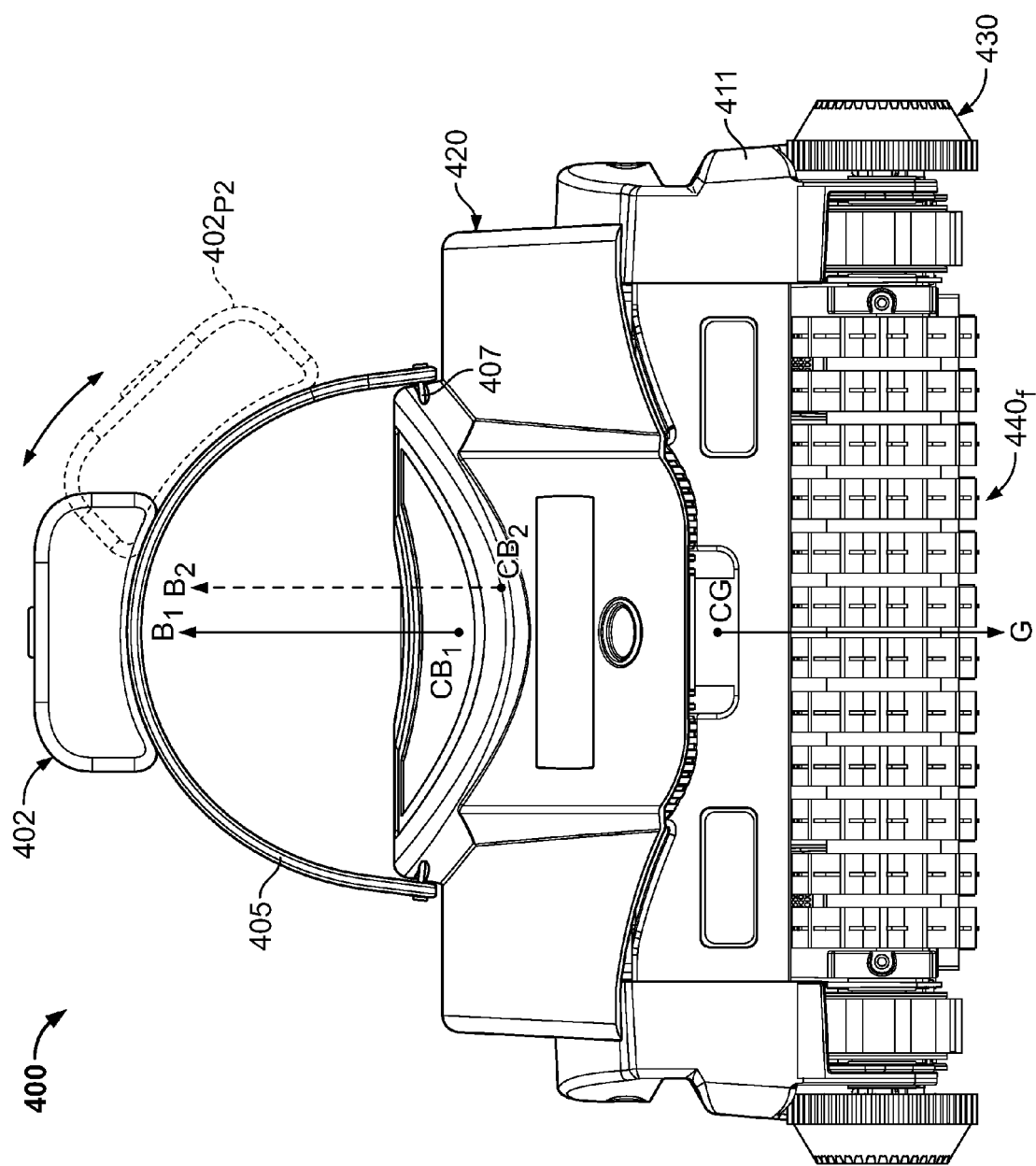
FIG. 39 depicts a front elevational view of the cleaner of FIG. 38.
Figure 40:
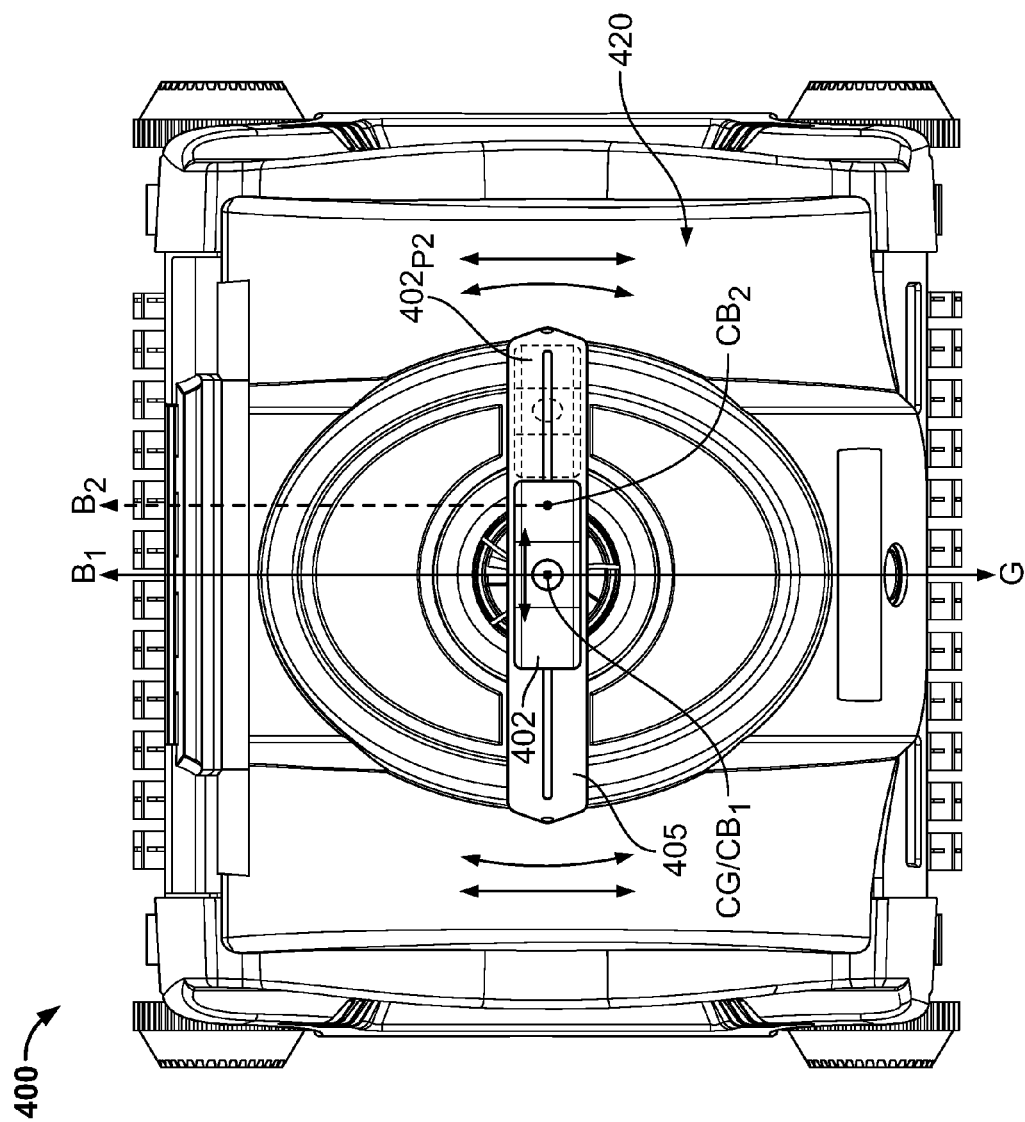
FIG. 40 depicts a top plan view of the cleaner of FIGS. 38 and 39.

FIGS. 39 and 40 show how the center of buoyancy $CB_1$ associated with a first position of the adjustable float 402 is shifted to $CB_2$ associated with another position of the adjustable float $402_{P2}$. FIGS. 39 and 40 illustrate a cleaner 400 having the lid assembly 420 and adjustable float 402 of the embodiment of FIG. 38, but utilizing a base 411, motive elements 430, $440_f$, etc. corresponding to those of either of the above-disclosed cleaners 100 or 300. Cleaner 400 may have a geometrically centralized center of gravity, which can be readily achieved by distributing weight so that the cleaner is balanced at a central position. In the case of a cleaner 400 having a drive motor and drive gear assembly 367 that is disposed towards one side of the cleaner, like that shown in FIG. 31, the center of gravity may be shifted to the geometric center by selecting a suitable balance weight 368, such that the weight and position of the balance weight balances against the weight and position of the drive motor and gear assembly 367. Alternatively, additional floatation can be added over the assembly 367. In general, it is known that an object may be balanced in water by distributing weight and buoyancy to achieve balance at any point and that would include the geometric center in any and/or all planes of reference. Assuming a cleaner 400 having a geometrically centralized center of gravity, the adjustable float 402 can be placed in positions resulting in a buoyancy vector $B_1$ in direct opposition to the force of gravity considered as being exerted on the center of gravity CG, such that the cleaner 400 will tend to travel in a straight path either on a pool floor or on a pool wall. Moving the adjustable float to position $402_{P2}$ shifts the buoyancy vector $B_2$ to one side or another (and/or to the front/back) such that the cleaner 400 will be induced to turn on the floor and the wall by offset buoyancy/weight as described above with respect to the cleaners 100 and 300.

Figure 41:
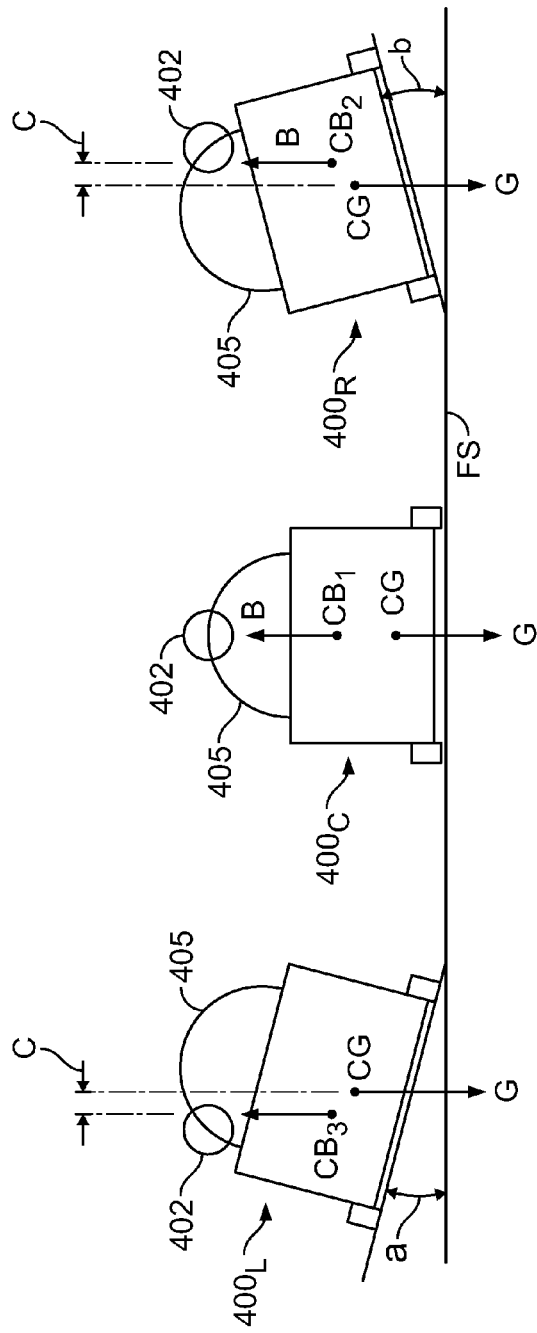
FIGS. 41 and 42 depict diagrammatic views of the cleaner of FIGS. 38-40 on a pool floor surface in various states of buoyancy and weight distribution.
Figure 42:
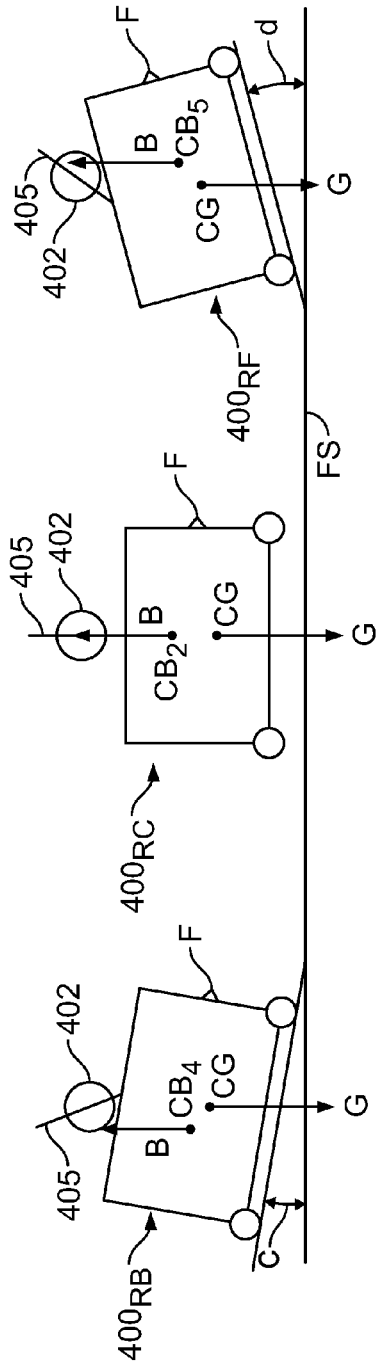

FIGS. 41 and 42 show examples of the effect of different positions of the adjustable float 402 on a pool cleaner 400 with a centralized center of gravity when on a floor surface FS and with the impeller motor OFF. Cleaner $400_C$ illustrates a cleaner 400 where the float is positioned centrally causing the center of buoyancy $CB_1$ to be positioned directly above the center of gravity CG. Assuming the cleaner $400_C$ has an overall negative buoyancy, the cleaner $400_C$ will sit flat on the floor surface FS and will tend to move in a straight line unless induced to turn by other forces. Moving the float 402 to the right as shown by cleaner $400_R$ or to the left, as shown by cleaner $400_L$ will give rise to tilt angles b and a, respectively. The presence and magnitude of a tilt angle, such as angle a, is dependent upon the magnitude of the buoyancy force. Cleaner $400_{RC}$ illustrates the effect of moving the float to the right as with $400_R$, but viewed from the side and with the float slide 405 in the vertical and central position. Cleaner $400_{RB}$ is viewed from the side and has the float 402 moved to the right and the float slide 405 is tilted back. Cleaner $400_{RF}$ shows the float 402 to the right and the float slide 405 tilted forward. In each of the side views, the point F indicates the front of the cleaner.

Figure 43:
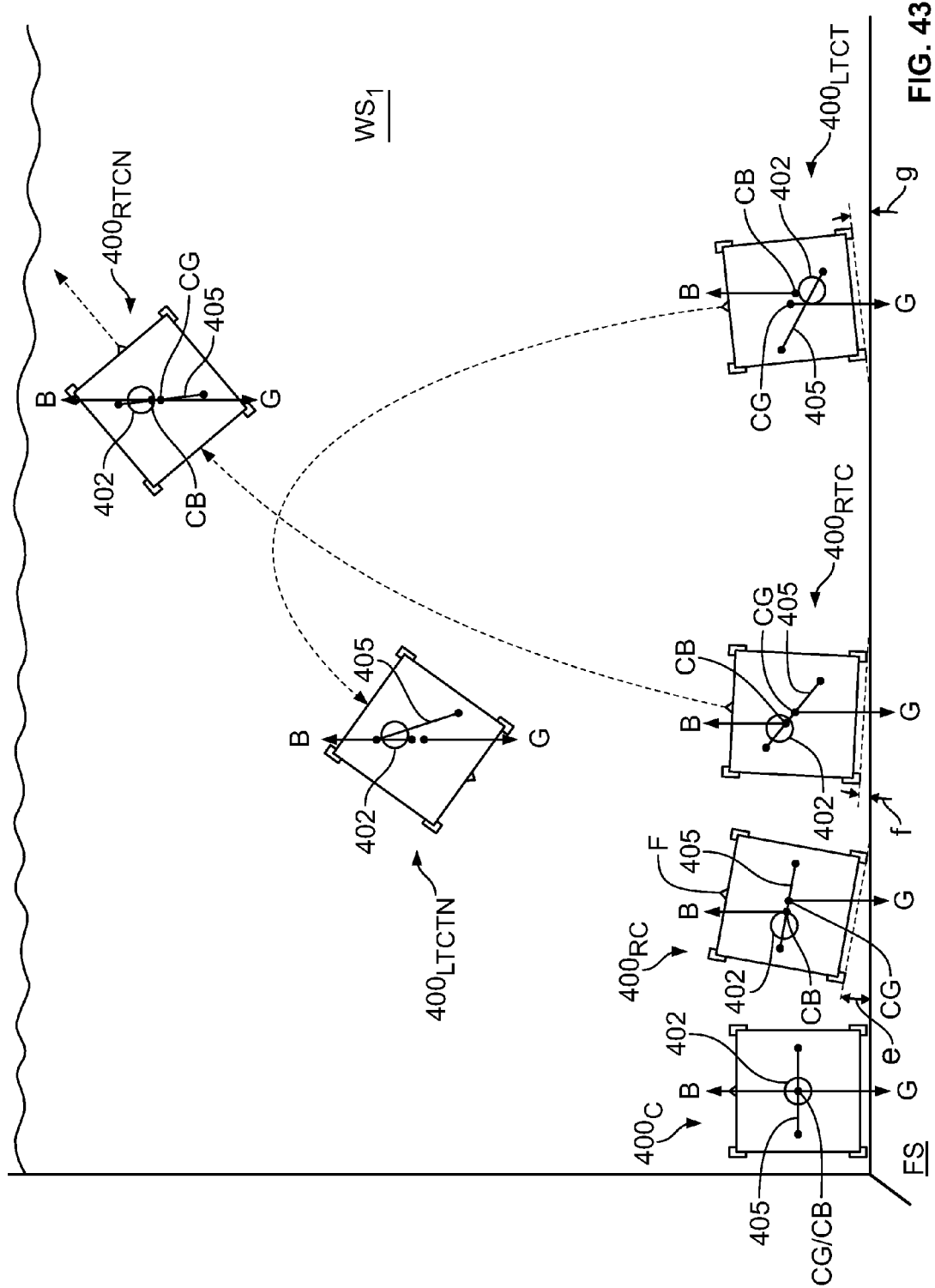
FIG. 43 depicts diagrammatic views of the cleaner of FIGS. 38-40 in wall-climbing position in various states of buoyancy and weight distribution, as well as exemplary motion paths.
Figure 44:
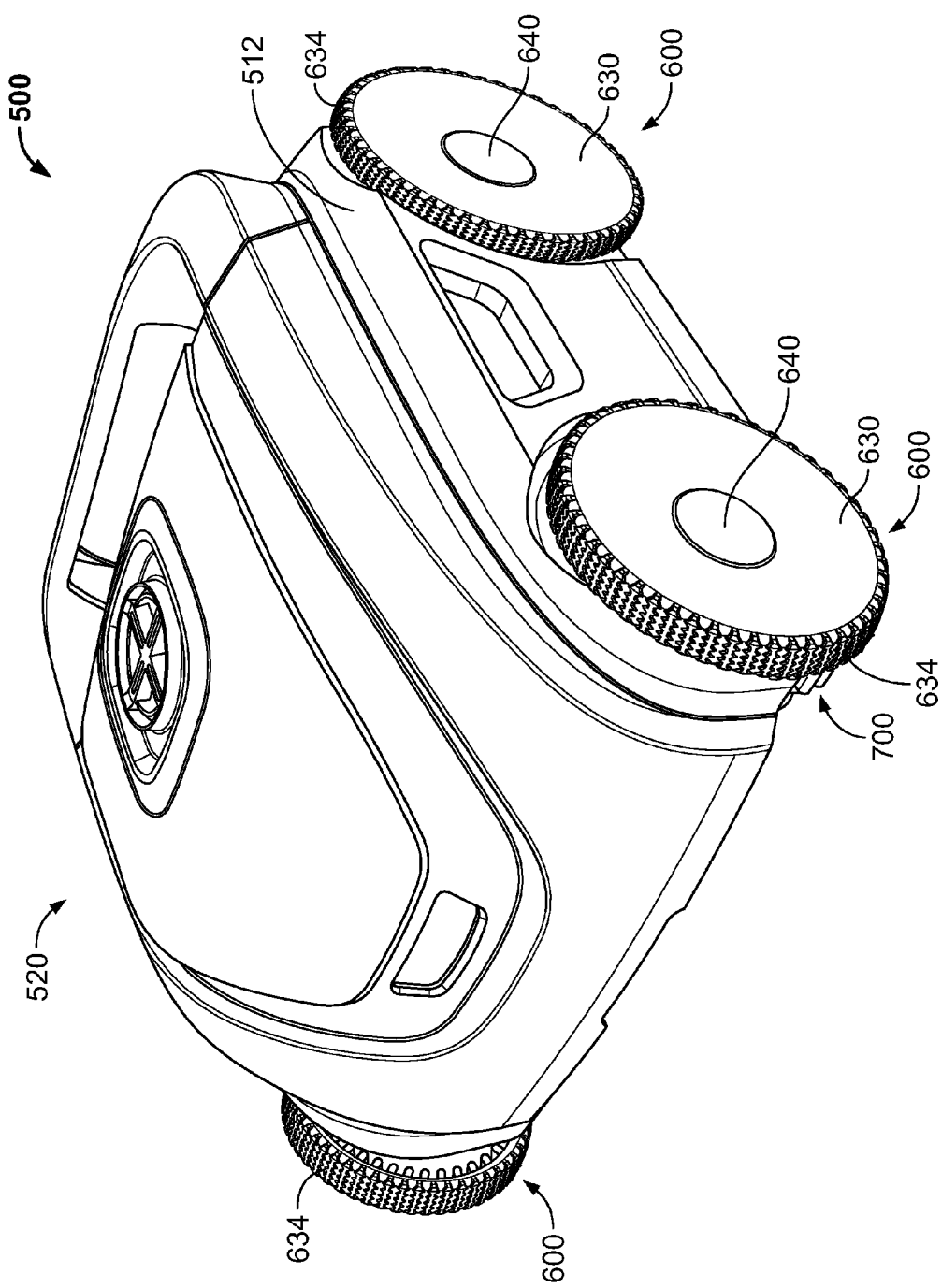
FIG. 44 depicts a front perspective view of an exemplary cleaner in accordance with another embodiment of the present disclosure, the exemplary cleaner including, inter alia, a wheel assembly having a wheel, wheel hub, wheel bushing and wheel hub cap, and a wheel drive assembly.

FIG. 43 illustrates cleaner orientation probabilities associated with different positions of the adjustable float 402 on a cleaner 400 having a geometrically centralized center of gravity. More particularly, cleaner $400_C$ shows a symmetrically placed float 402 which will increase the probability of the cleaner moving on the wall in a straight line as determined by the tread direction. Cleaner $400_{RC}$ has the float positioned to the right (when viewed from the front) of the center of gravity inducing a tilt angle e and a producing a twisting torque that tends to turn the cleaner $400_{RC}$. Cleaner $400_{RTC}$ shows the float 402 positioned to the right and with the float slide 405 twisted clockwise, moving the center of buoyancy to the right and in front of the center of gravity CG. This position induces a twisting torque on the cleaner $400_{RTC}$ which will act on the cleaner $400_{RTC}$ until the buoyancy force acts directly in line with and opposite to the gravity force as shown by cleaner $400_{RTCN}$. As noted below, the turning reaction of the cleaner in response to twisting torque will depend upon the frictional interaction between the motive elements of the cleaner 400RTC and the wall surface $WS_1$, e.g., due to impeller reaction force and the frictional coefficient of the wall surface and the motive elements of the cleaner. In the event that the frictional interaction is strong enough, the cleaner may resist the twisting torque and travel in a straight path, e.g., straight up the wall. Cleaner $400_{LTCT}$ has a float which is positioned to the left and with a float slide 405 that is twisted clockwise and translated rearward. As can be appreciated by $400_{LTCT}$, the neutral position of cleaner $400_{LTCT}$ (when the buoyancy and gravity forces are directly opposed along the same vertical line) differs significantly from that of $400_{RTCN}$ in that they are positioned in approximately opposite directions. As can be appreciated from FIG. 38-43 and the above description, cleaner 400 has the capacity to mimic the balance and motion characteristics of the cleaners 100 and 300, whether moving in forward or reverse directions on a floor or on a wall surface. Accordingly, depending upon the size and density of the adjustable float 402 relative to the overall weight of the cleaner 400 in the water, the float 402 can be set to increase the likelihood of traversing any of the paths shown in FIGS. 36 and 37. Note that cleaner 400 has a modified handle 414, which does not contain a buoyant element. As would be known to one of normal skill in the art, weight and buoyancy may distributed as needed to provide a balanced cleaner such that the center of buoyancy approximates any given position, including a central position, such that the adjustable float 402 can be utilized as the predominant element to control the position and direction of buoyancy.

As mentioned above and in U.S. Pat. No. 7,118,632, the cleaner 100, 300, 400 of the present disclosure can be turned on a floor surface of swimming pool by virtue of controlling the side-to-side tilt angle, the impeller motor ON/OFF state and the drive motor ON/OFF state. The cleaner 100, 300, 400 can therefore be programmed to execute a sequence of movements forward, backward and turning for selected and/or random lengths of time/distance to clean the floor surface of a swimming pool. One cleaning algorithm in accordance with the present disclosure executes a floor cleaning procedure which concentrates the cleaner motion to the floor area by utilizing a tilt sensor to signal when the cleaner attempts to mounts a wall surface. On receipt of a tilt indication, the algorithm can keep the cleaner on the floor by directing the cleaner to reverse direction and optionally to execute a turn after having returned to the floor followed by straight line travel either forward or backward. The navigation algorithm can include any number and combination of forward, backward and turning movements of any length (or angle, if appropriate). In certain circumstances, it may be desirable to clean the floor of a pool first, given that many types of debris sink to the floor rather than adhere to the walls and because the floor is a surface that is highly visible to an observer standing poolside.

Because the side walls of the pool are visible and can also become dirty, e.g., by deposits that cling to the walls, such as algae growth, it is desirable for the pool cleaner 100, 300, 400 to have a wall cleaning routine as part of the navigation algorithm. The wall cleaning function may be performed by the cleaner either in conjunction with the floor cleaning function or sequentially, either before or after floor cleaning. In the case of conjunctive floor and wall cleaning, the algorithm may direct the cleaner 100, 300, 400 to advance forward or backward for a given time/distance regardless whether the cleaner mounts a wall during that leg of travel. For example, if the cleaner is directed to execute a forward motion for one minute, depending upon its start position at the beginning of the execution of that leg, it may travel on the floor for any given number of seconds, e.g., five seconds, and then mount the wall for the remaining fifty-five seconds. Depending upon the buoyancy/weight distribution and the frictional interaction between the cleaner 100, 300, 400 and the wall surface WS, (attributable to the reactive force generated by the impeller and the coefficient of friction of the wall and motive elements of the cleaner), the cleaner will take any number of an infinite variety of possible courses on the wall, examples of which are illustrated in FIGS. 36 and 37. If the cleaner 100, 300, 400 has a strong twisting torque applied by a widely separated buoyancy and gravitation force couple and the cleaner is on a slippery wall or has a reduced impeller reactive force, e.g., due to a reduced flow attributable to a filter bucket full of debris, then the cleaner has a greater probability of executing any turn needed to put the cleaner into a orientation where the buoyancy force and the gravitational force are, directly opposing on a straight vertical line. The chemistry of the pool water and water temperature effect water density and can therefore also effect the interaction between the gravitational and buoyant forces. As shown by cleaner 300NMNP in FIG. 34, if this "neutral" orientation points the cleaner down towards the pool floor, then the cleaner (if it is moving in the forward direction) will likely return to the pool floor (if it is operated in the forward direction long enough). This could give rise to paths such as are illustrated in FIG. 36 as $FWP_2$, $FWP_3$, $FWP_4$ or $RWP_4$ in FIG. 37. In the event that the cleaner has a strong frictional interaction with the pool wall that resists twisting and it mounts the wall in a straight-up orientation, then it is possible that the cleaner will execute paths like $FWP_5$ of FIG. 36 or $RWP_1$ or $RWP_2$ of FIG. 37. Optionally, mounting the wall (as sensed by a tilt switch) may trigger an algorithm specifically intended for wall cleaning.

Cleaners like $300_{NM}$ of FIGS. 34 and 35 and $400_C$ and $400_{RTC}$ with a floatation/weight distribution that promotes straight line motion on the pool wall have a greater probability to execute straight line motion paths up the pool wall as are illustrated by paths $FWP_5$ of FIG. 36 and $RWP_1$ of FIG. 37. As noted above, a sawtooth motion path (see $RWP_1$ of FIG. 37), which crosses the water line WL may be accomplished by an algorithm that continues to direct a cleaner biased to go straight in a forward motion path. When the cleaner 300, 400 breaches the surface, the portion of the cleaner supported by the water progressively diminishes and at the point where the weight exceeds the capacity of the cleaner to resist downward motion via frictional interaction between the cleaner and the wall surface, the cleaner will slip back into the water, such that the cleaner bobs up and down proximate the water line. Because the cleaner falls off the wall temporarily, there is a good probability, especially in a cleaner that has asymmetric weighting/buoyancy, for the cleaner to reengage the wall surface at a new location and orientation, such that the cleaner travels along the length of the wall surface as it bobs up and down. The buoyant elements of the cleaner 300, 400 can be distributed, e.g., in the handle 314, front roller $340_f$, etc., such that the cleaner maintains an orientation relative to the wall that permits reengagement and prevents the cleaner from falling to the bottom of the pool or rolling into a position with the motive elements pointed up (out of contact with the pool surfaces). This type of sawtooth motion can be effective for removing dirt which concentrates on the wall at the water line, e.g., dirt or oils that float. As noted below, this bobbing action can also be induced via sensing on diminished electrical loading of the impeller motor or by sensing an out-of-water condition by an out-of-water sensor. In this later approach, the controller may shut down the impeller motor temporarily so that the cleaner loses its grip on the wall surface or alternatively, the controller may reverse the direction of the drive motor gear assembly 367 to cause the cleaner to move back down the wall before climbing again.

The adjustable buoyancy/weight features of the present disclosure may be used to set the cleaner 300, 400 into different configurations which are suitable for different frictional interactions between the pool wall and the cleaner 300, 400. For example, a slippery wall may call for a more gradually sloping path in order to allow the cleaner 300, 400 to reach the water line. Since it is an objective for the cleaner to access and clean all surfaces of the pool, it is desirable for the cleaner to be adapted to climb a pool wall to the water line. As disclosed above, the adjustable float 302, 402 can be placed in different settings that induce the cleaner to travel straight up a pool wall or, alternatively, at an angle relative to the floor (assuming a floor parallel to the water line) and water line/horizon. The more gradually the cleaner attains height on the wall (moves toward the water line), the longer it will take to reach the water line and the longer the distance it must travel, but the less likely that it will slip on the wall for any given set of conditions pertaining to frictional interaction between the cleaner and the pool wall. Stated otherwise, the greater the rate of ascent (as determined by the angle relative to the floor surface/water line, the rate of tread movement being constant), the greater the likelihood that the cleaner will lose its grip on the wall surface. Similarly, an automobile climbing an icy, upwardly inclined road will have a greater tendency to spin its wheels as the rate of climb (the slope) increases. The adjustable float 302, 402 therefore allows the cleaner 300, 400 to be adapted to different wall conditions and types to enable the cleaner to reach the water line.

Since the cleaner 100, 300, 400 has the capacity to climb walls and because there are certain pool shapes, such as a pool with a gradual "lagoon style" ramp that leads to a deeper portion of the pool, the cleaner 100, 300, 400 may have the capacity to exit the pool. It is undesirable for the cleaner to continue to operate while out of the water because the cleaner could potentially overheat due to a lack of cooling water, destroy seals on the impeller motor 360, overload the drive motor gear assembly 367 and would waste electrical power and pool cleaning time. The present cleaner 100, 300, 400 has an algorithm that may include an out-of-water routine that is directed to addressing out-of-water conditions which occur while the cleaner 100, 300, 400 is conducting the cleaning function and on start-up. More particularly, the cleaner 100, 300, 400 includes circuitry that monitors the electrical current through (load on) the impeller motor 360. This circuitry may be utilized to prevent the cleaner from running unless it is placed in the water before or soon after start-up. More particularly, if the cleaner 100, 300, 400 is first powered-up when the cleaner is not in the water, the current load on the impeller motor 360 will be less than a minimum level which would indicate an out-of-water condition to the controller. If there is an out-of-the water condition on start-up, the controller will allow the impeller motor 360 to run for a predetermined period before it shuts down the cleaner and requires user intervention to re-power it. It is understood that proper operation of the cleaner requires an operator to place the cleaner in the water before turning it ON, but if the cleaner 100, 300, 400 is powered-up inadvertently, e.g., by resetting a breaker that controls a plug into which a cleaner is plugged, the cleaner having been left ON, then the short predetermined period of out-of-water running on start-up, described above should be less than that which would damage the cleaner.

After power-up and after the cleaner is operating in the water, the load on the impeller motor 360 is constantly monitored to determine whether the cleaner remains in or has traveled out of the water, an out-of-water condition being indicated by a reduction in current/load from the impeller motor 360. On sensing an out-of-water condition after the cleaner 100, 300, 400 has been operating in the water, an algorithm in accordance with the present disclosure may, upon first receiving an out-of-water indication, continue operating in the then-current mode of operation for a predetermined short period. The purpose of this delay would be to allow continued operation is to avoid triggering an out-of-water recovery routine in response to a transient condition, such as the cleaner sucking air at the waterline while executing a sawtooth motion or any other condition which creates a low current draw by the impeller motor 360. If a transient air bubble e.g., due to sawtooth action, is the source of out-of-water sensing, the delay allows the cleaner 100, 300, 400 an opportunity to clear the air bubble by continued operation, e.g., slipping back below the surface due to a decreased buoyancy, in accordance with normal operation. The current load on the impeller motor 360 is checked periodically to see if the out-of-water condition has been remedied by continued operation and, if so, an out-of-water status and time of occurrence is cleared and the cleaner 100, 300, 400 resumes the normal navigation algorithm.

If the foregoing delay period does not remedy the out-of-water condition, then this is an indication that the cleaner 100, 300, 400 has either exited the water, e.g., climbed a wall and is substantially out of the water or has otherwise assumed an orientation/position where it is sucking air, e.g. is in a position exposing at least one intake to air or a mixture of air and water. In either case, in response, the controller triggers an out-of-water recovery routine in which the impeller motor is shut OFF for a predetermined period, e.g., 10 seconds. In the event that the cleaner 100, 300, 400 is on the wall sucking a mixture of air and water, then turning the impeller motor 360 OFF will terminate all down-force attributable to the impeller 162 and the cleaner will slide off the wall and back into the water. In sliding off the wall, the cleaner 100, 300, 400 will travel through the water in a substantially random path as determined by the setting of the adjustable float 302, 402, the shape of the cleaner, the orientation of the cleaner when it looses down-force, the currents in the pool, etc., and land on the bottom of the pool in a random orientation, noting that the cleaner may be provided with a buoyancy/weight distribution that induces the cleaner to land with motive elements 330. 366, 340 down.

In the event that the cleaner 100, 300, 400 has "beached itself" by climbing a sloping floor or pool steps leading out of the pool, continued impeller 162 rotation will have no effect on the motion of the cleaner since there will be no down-force exerted by the impeller action when it is out of the water. As a result, the cleaner does not have the capability of turning via an uneven buoyancy, as when the cleaner is in the water. Accordingly, turning the impeller motor 360 OFF in this circumstance is an aid in preventing overheating of the impeller motor/ruining the seals, etc.

At about the same time that the impeller is shut OFF, the drive motor gear assembly 367 is stopped and then started in the opposite direction to cause the cleaner 100, 300, 400 to travel in a direction opposite to the direction in which it was traveling when it experienced the out-of-water condition. More particularly, if the cleaner 100, 300, 400 was traveling with the front of the cleaner advancing, then its travel direction will be reversed, i.e., so the rear side advances and vice versa. This travel in the opposite direction may be conducted for a length of time exceeding the delay time after first sensing an out-of water condition (before the out-of-water recovery routine is triggered). For example, if the delay time was six seconds (as in the above example) the reverse/opposite travel time could be set to seven seconds.

In the event that the cleaner 100, 300, 400 was on the wall when the recovery routine began, and subsequently slipped to the floor when the impeller motor 360 was shut OFF, the reverse travel time is not likely to be executed in the same direction as the direction that led to the cleaner exiting the pool and will likely be of a shorter duration than that which would be needed to climb the pool wall to the surface again, even if it were heading in the direction of exiting the pool. In the event that the cleaner had exited the water, e.g., by moving up a sloped entrance/exit to the pool (a lagoon-style feature), then the seven seconds of reverse direction travel will likely cause the cleaner to return to the water, since it is opposite to the direction that took it out of the water and is conducted for a longer time/greater distance. Once positioned back in the water at a lower level, the likelihood of the cleaner replicating an upward path out of the water is also decreased by the increased probability that the cleaner will experience some degree of slipping on the pool wall during ascents up the wall against the force of gravity.

After traveling in the opposite direction as stated in the preceding step, the cleaner has either re-entered the water or not. In either case, the recovery routine continues, eventually turning the impeller ON for a period, to push the cleaner towards a pool surface (wall or floor-depending upon the cleaner position at that time). The impeller is then turned OFF and the cleaner executes one or more reversals in drive direction. This ON and OFF cycling of the impeller motor 360 in conjunction with ON and OFF cycling and reversing of the drive motor gear assembly 367 may be conducted a number of times. In the event that the cleaner is in the water, (either at the bottom of the pool or partially submerged on a lagoon-style ramp, these motions reorient the cleaner and reduce the probability that the cleaner will be in the same orientation that led it out of the pool, when it resumes normal operation. In the event that the cleaner is completely beached, then the impeller motor 360 state will have no effect and the one or more reversals in drive direction with the impeller motor 360 OFF will translate into one or more straight line motions (assuming no other obstacle is encountered or that there is no other factor that impacts the straight line path of the cleaner). The one or more reversals in drive direction may have varying duration, and may be interspersed with periods of having the impeller motor 360ON for straight line motion, all of the foregoing alternatively being randomized by a random number generator. The out-of-water recovery routine may be timed to be completed within a maximum out-of-water duration, e.g., sixty seconds, and the impeller motor load checked at the end of the completion of the recovery routine. If that final check indicates an out-of-water condition, then the cleaner is powered down and requires overt operator intervention to re-power it. Otherwise, normal operation is resumed. As an alternative, the out-of-water condition may be periodically checked during the recovery routine and the routine exited if impeller motor load indicates that the cleaner has returned to the water. After returning to normal operation, the impeller motor 360 load is continuously monitored and will trigger the foregoing recovery routine if a low load is sensed.

The period over which the out-of-water recovery routine is executed may be longer, e.g., sixty seconds, than the period that the cleaner 100, 300, 400 remains powered after an out-of-water condition is detected on start-up (fifteen seconds), in order to permit the cleaner a reasonable opportunity to return to the water. This period is warranted by the fact that it is more probable that an operator will be present on start-up than during cleaning, which may take place when the pool is unattended. In the event that the out-of-water condition is not remedied within the allowed period in either case, the cleaner will be de-powered and require overt user intervention to re-power it. This step of de-powering requiring intervention is avoided until it is reasonably certain that the out-of-water condition can not be remedied, because once the cleaner is de-powered it stops cleaning. If the cleaner were to immediately de-power upon first sensing an out-of-water condition and immediately require intervention, in the case of an unattended pool, the cleaner would waste time sitting out of the water in an OFF state when it could find its way back into the water to continue cleaning by executing repositioning movements according to the present disclosure.

In the case of a pool system that has a tendency to allow a pool cleaner to exit the water, such as those that exhibit a high frictional interaction between the cleaner and the pool and those with gently sloping walls, the cleaner 100, 300, 400 may, in accordance with the present disclosure, be equipped with a flow restrictor, such as a constrictor nozzle and/or plate that connects to the cleaner near the outlet and/or inlet apertures to reduce the impeller flow, thereby lessening the reactive force of the impeller flow, which presses the cleaner into contact with the pool surface. The reduction in impeller flow and down-force reduces the likelihood that the cleaner will have sufficient frictional interaction with the pool surfaces to allow it to escape the water and/or to go above the water line and trap air.

The cleaner 100, 300, 400 may also respond to greater than expected loading of the impeller motor 360 which could indicate jamming, by turning the power to the cleaner 100, 300, 400 OFF after a suitable short period, e.g., six seconds, and requiring operator intervention to re-power the cleaner 100, 300, 400.

Given the foregoing disclosure, the cleaners 300, 400 disclosed herein can be adjusted via the adjustable floats thereof 302, 402 to execute different motion paths—even when using the same navigation algorithm. Further, the motion paths associated with different float adjustment configurations can be associated with probabilities of different motion paths on the walls of the pool. Further, given the adjustable buoyancy characteristics of the cleaner 300, 400, the cleaner can be adjusted to accomplish motion paths based on the present needs for cleaning different parts of the pool (walls vs. floor) and may be adjusted to more suitably accommodate pools that have different surface properties, such as different coefficients of friction. Further, the cleaner of the present application can be adjusted sequentially to obtain cleaning in a sequential manner based upon observed behavior of the cleaner and observed coverage of the cleaner of the desired area to be cleaned. More particularly, given a particular pool with specific conditions, the cleaner can be adjusted to a first buoyancy adjustment state and then allowed to operate for a given time to ascertain effectiveness and cleaner behavior. In the event that additional cleaner motion paths appear to be desirable, the cleaner can be readjusted to accomplish the desired motion paths to achieve cleaning along those motion paths.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims. For example, it should be appreciated that the relative locations of the centers of buoyancy and gravity can be moved by moveable weights, as well as by moveable buoyant elements, either in conjunction with moveable or fixed buoyant elements. Any number, type, shape and spatial location of weight and buoyant elements may be utilized to control the relative positions of the center of buoyancy and the center of gravity. As one example, the adjustable buoyant member 302, 402 could be replaced with one or more moveable weights and one or more stationary buoyant elements (or balance weight(s) could be eliminated, repositioned or reduced in size).

The buoyant and weight elements attached to the cleaner could be removable in whole or part to adapt the cleaner to specific pool cleaning conditions. While the cleaner described above has a buoyant element with a limited range of arcuate motion about the central axis of the impeller aperture, the arcuate range could be increased to 360 degrees or decreased as desired or extended into other planes (Z axis).

While a manually moved adjustable buoyant element is disclosed above, one could readily supply a mechanical movement using gears, chains, belts or wheels and driven by a small motor provided for that purpose under control of the controller of the cleaner, e.g., to move a rotatable adjustable buoyant element or to pull or push such an element along a slide path to a selected position. In this manner, the capacity to control the movement of the cleaner provided by the adjustable buoyant or weight elements can be automatically and programmatically moved in accordance with a navigation algorithm. As an alternative, the navigation algorithm can receive and process empirical data, such as location and orientation data, such that the weight/buoyancy distribution/positioning can be automatically adjusted in light of feedback concerning the path of actual cleaner traversal as compared to the path of traversal needed to clean the entirety of the pool.

The pool cleaner may be equipped with direction and orientation sensing apparatus, such as a compass, GPS and/or a multi-axis motion sensor to aid in identifying the position and orientation of the cleaner to the controller such that the controller can track the actual path of the cleaner and compare it to a map of the pool surfaces that require cleaning. Alternatively, the cleaner motion can be tracked and recorded via sensing on cleaner position relative to reference locations or landmarks, e.g., that are marked optically (pattern indicating location), acoustically or via electromagnetic radiation, such as light or radio wave emissions that are read by sensors provided on the cleaner. Comparison of actual path information to desired path information can be converted to instructions to the mechanism controlling the adjustable weight/buoyancy distribution and location to steer the cleaner along a desired path.

FIGS. 44-64 relate to an alternative embodiment of a cleaner 500. As can be appreciated from FIGS. 44-64 and the description which follows, the cleaner 500 has many components in common with the cleaners 100, 300 and 400 described above. For example, cleaner 500 includes various motive/drive elements, such as drive belts 565, bushing assemblies 535, drive axles 543f and 543r and front and/or rear roller/scrubbers 540f and 540r which are all substantially the same and operate in substantially the same manner as the drive belts 165, 365, drive belt bushings 135, 335, drive axles 143B and front and/or rear roller/scrubbers 140, 340f, 340r, 440f, in cleaners 100, 300 and 400. Moreover, apparatus and functions internal to a base 511 of the cleaner 500, including apparatus and functions relating to an impeller motor, intake apertures, intake channels and filter assembly, are all substantially the same and operate in substantially the same manner as the apparatus and functions internal to bases 111, 311 and 411 of cleaners 100, 300 and 400.

Cleaner 500 also differs in some respects relative to the cleaners 100, 300 and 400, disclosed above. In particular, cleaner 500 includes, inter alia, wheel assemblies 600 and wheel drive assemblies 700 which provide advantages relative to cleaners 100, 300 and 400. These wheel assemblies 600 and wheel drive assemblies 700 and the advantageous thereof are described in greater detail in the sections which follow.

Referring generally to FIGS. 44-52 and FIG. 45 in particular, the cleaner 500 may generally include a housing assembly characterized by a base 511, side panels 512, and a lid assembly 520. Similar to previous embodiments, the base 511, side panels 512, and a lid assembly 520 may cooperate to define internal cavity space for housing internal components of the cleaner 500. In exemplary embodiments, the base 511, side panels 512, and a lid assembly 520 may cooperate to define a plurality of internal cavity spaces for housing components of the cleaner 500. These internal cavity spaces may include a central cavity defined by the base 511 and side cavities defined by the side panels 512. Like in previous embodiments, the central cavity may house and receive a filter assembly and a motor drive assembly and the side cavities may be used to house drive transfer system components, such as the drive belts, for example. The lid assembly 520 may advantageously be hinged to allow access to internal components of the cleaner 500, e.g., internal to the base 510.

It is noted that, although not fully depicted, the internal components of the central cavity defined by the base 511 of cleaner 500 are substantially the same and operate in substantially the same manner as the internal components of the central cavity defined by the bases 111, 311 and 411 of cleaners 100, 300 and 400. These components include a filter assembly (see, e.g., the filter assembly 550 depicted in FIG. 50 which is substantially the same and operates in substantially the same manner as the filter assemblies 150 and 350 of cleaners 100 and 300) and a motor drive assembly (which is substantially the same and operates in substantially the same manner as the motor drive assemblies 160 and 360 of cleaner 100 and 300).

Many drive transfer system components of cleaner 500 are also similar to those of cleaners 100, 300 and 400. In general, drive transfer system is used to transfer power from the motor drive assembly to the wheel assemblies 600 and the roller assemblies 540f and 540r of the cleaner 500. Thus, similar to previous embodiments, one or more drive shafts (not depicted) may extend from the motor drive assembly, each drive shaft extending through a side wall of the base 511, and into a side cavity defined by a side panel 512 (see, drive shaft 166 of the cleaner 100 in FIG. 10, for reference). In the side cavity the one or more drive shafts may interact with the drive transfer system, e.g., by turning one or more drive belts 565. Each drive belts 565 generally extends around and acts to turn one or more bushing assemblies 535 each of which drives an axle 543f or 543r, which in turn drives an associated roller assembly 540f or 540r and/or an associated pair of wheel assemblies 600. In exemplary embodiments, the cleaner 500 includes a front pair of bushing assemblies 535 aligned along a front axis and a rear pair of bushing assemblies 535 aligned along a rear axis. Front and rear bushing assemblies on the same side may be driven by a shared belt 565. In exemplary embodiments, The front pair of bushing assemblies may cooperate to drive a front axle 543f and the rear pair of bushing assemblies may cooperate to drive a rear axle 543r.

Figure 45:
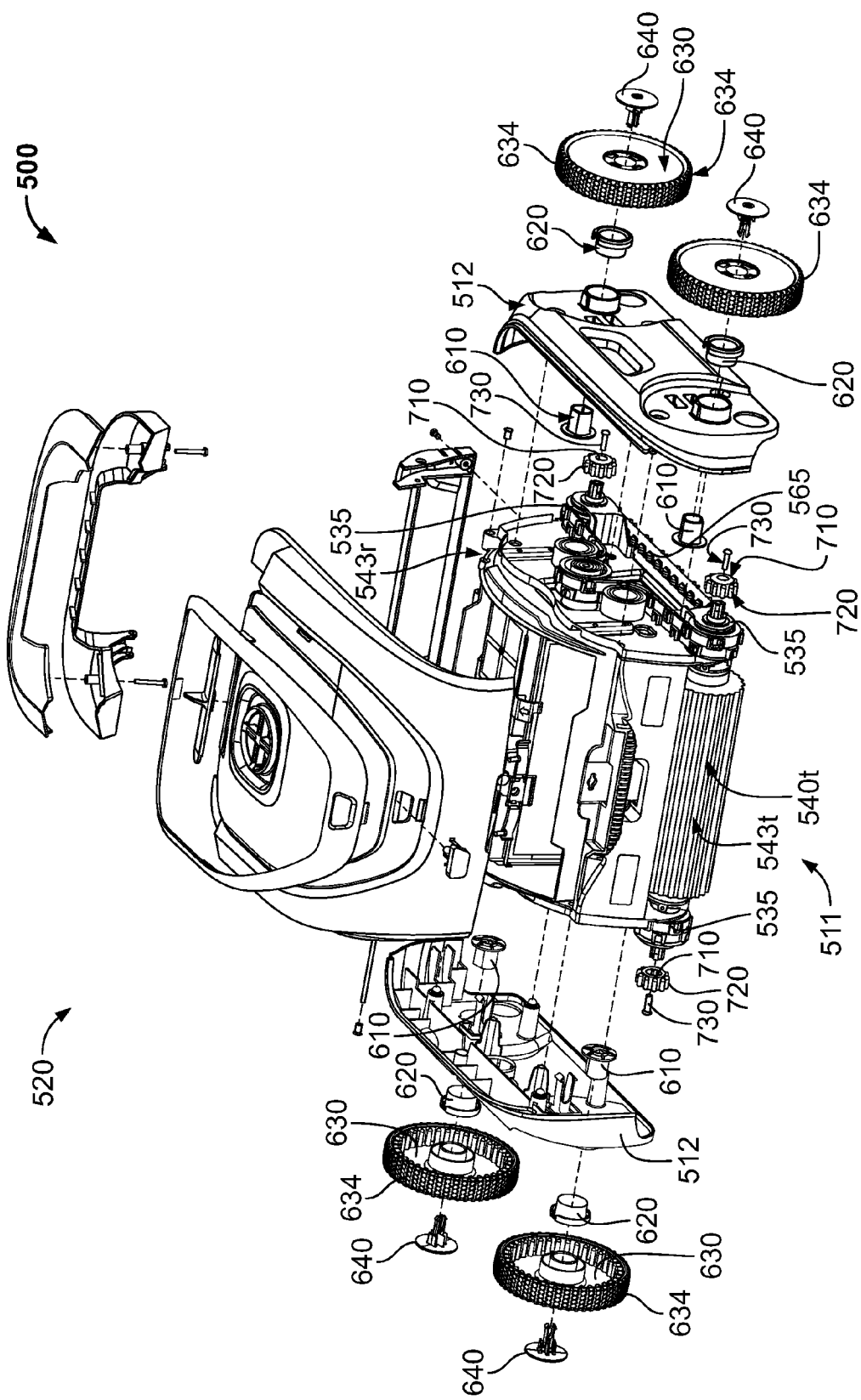
FIG. 45 depicts an exploded perspective view of the cleaner assembly of FIG. 44.
Figure 61:
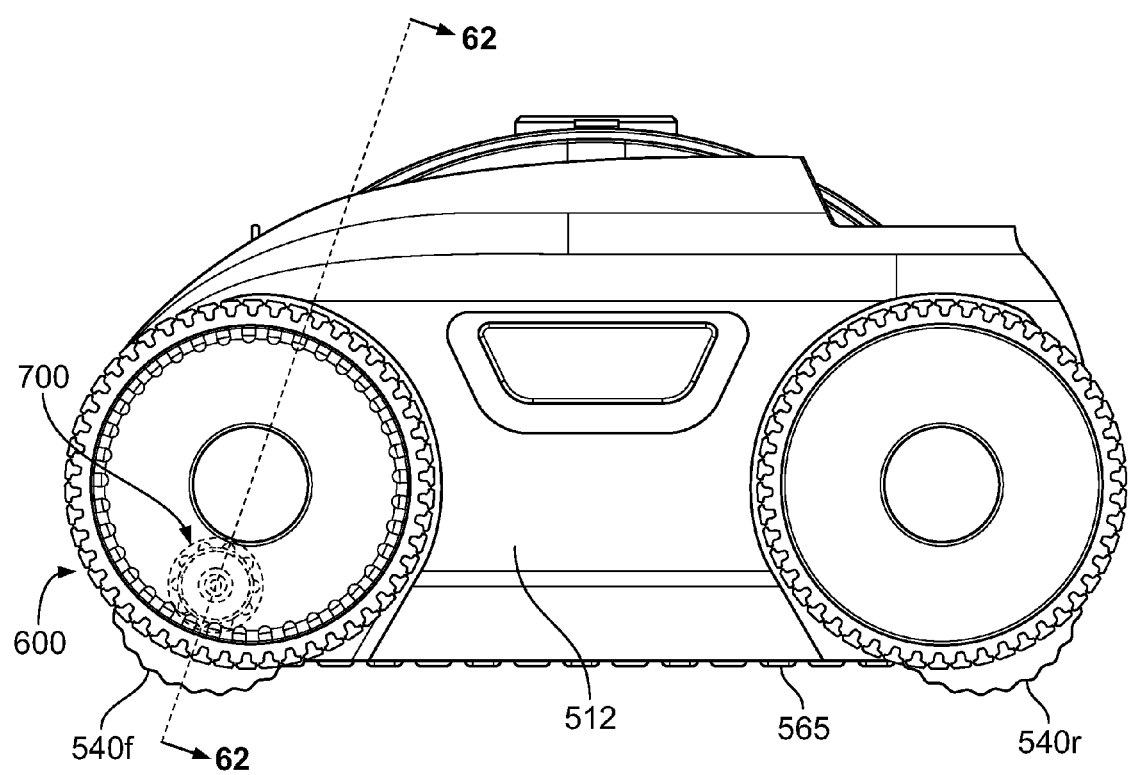
FIG. 61 depicts a left side elevational schematic of the cleaner of FIGS. 44-52 illustrating internal components of the drive assembly and wheel assembly.
Figure 62:
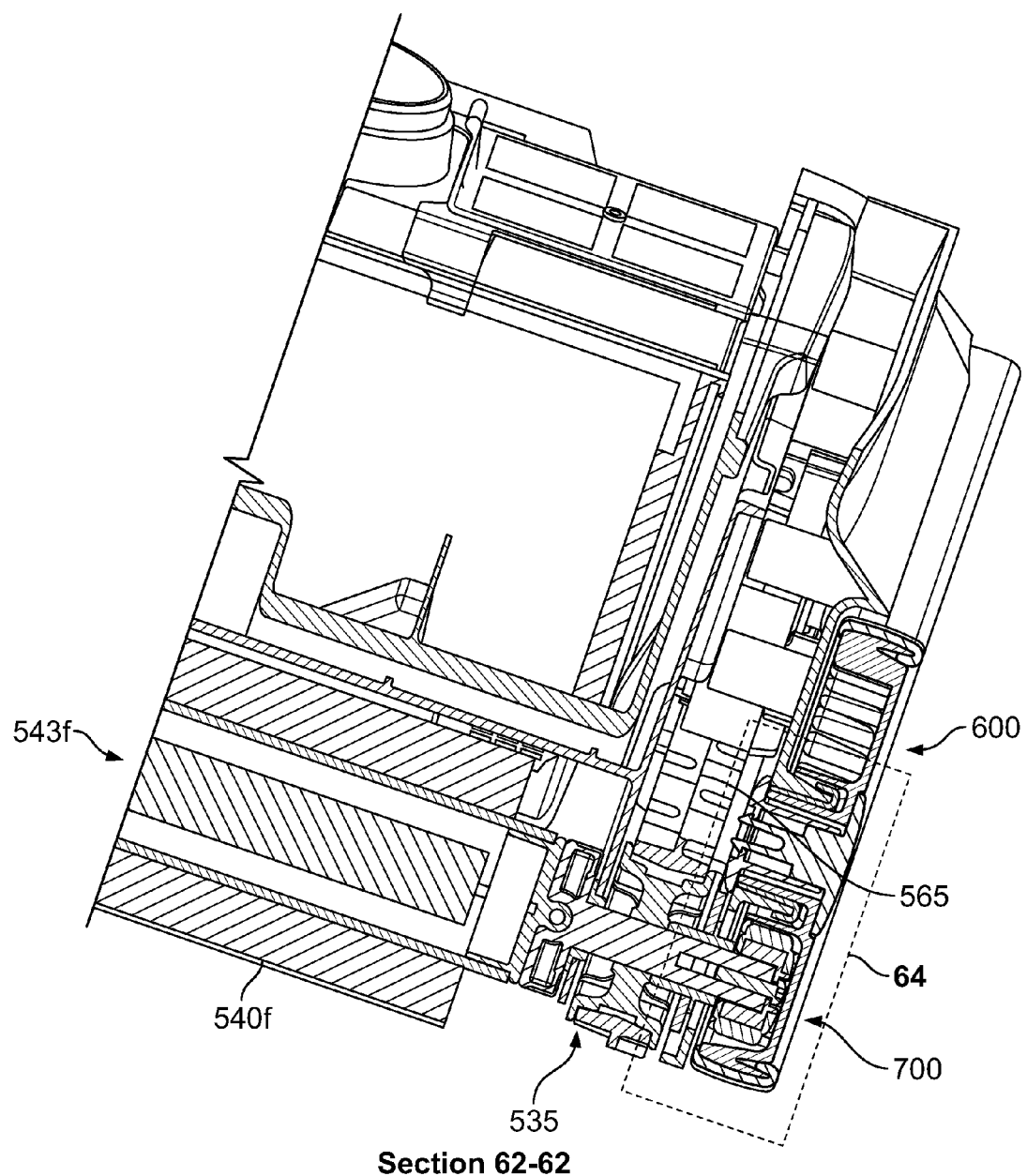
FIG. 62 depicts a partial cross-sectional view of the cleaner of FIGS. 44-52 taken along section line 62-62 of FIG. 61 and looking in the direction of the arrows.
Figure 63:
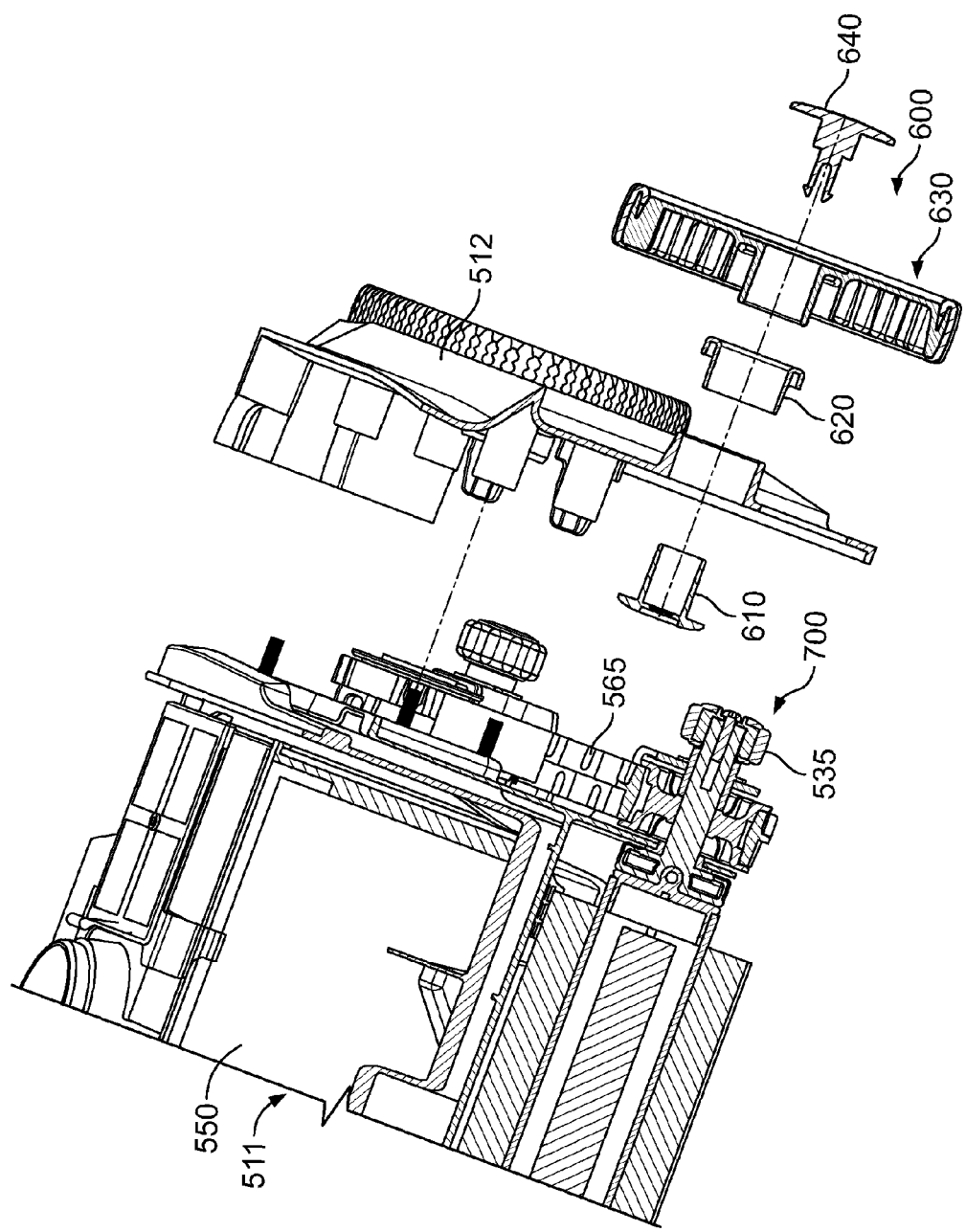
FIG. 63 depicts an exploded view of the partial cross-sectional view of FIG. 62.

The cleaner 500 is typically supported/propelled about a pool by a plurality of wheel assemblies 600 located relative to the bottom of the cleaner 500. The wheel assemblies 600 are usually powered by the motor drive assembly in conjunction with the drive transfer system, as discussed herein. In exemplary embodiments, the cleaner 500 includes a front pair of wheel assemblies 600 aligned along a front axis and a rear pair of wheel assemblies 600 aligned along a rear axis. As best depicted in FIG. 45, each wheel assembly is operatively associated with a corresponding wheel drive assembly 700 which transfers power from a corresponding bushing assembly 535 to the wheel assembly. More particularly each wheel drive assembly 700 may include a drive gear 720 which includes a drive gear hub 710 which is secured, e.g., via screw 730, relative to the axle driven by the corresponding bushing assembly 535. Thus the drive gear 720 and bushing assembly 535 are aligned along a common axis of rotation. Advantageously, as best depicted in FIG. 61-63, the drive gear 720 of the drive assembly 700 interacts with an interior circumferential surface of the wheel 630 of the wheel assembly 600 in order to drive the wheel 630. Thus, in exemplary embodiments, the outer circumferential surface of the drive gear 720 may define a first plurality of gear teeth 722 (see, e.g., FIG. 53) which operatively interact with a second plurality of gear teeth 632C defined around the interior circumferential surface of the wheel 630 (see, e.g., FIG. 56). Notably, as best depicted in FIGS. 61-63, the wheel assemblies 600 and wheel drive assemblies 700 of cleaner 500 do not share a common axis of rotation.

Figure 46:
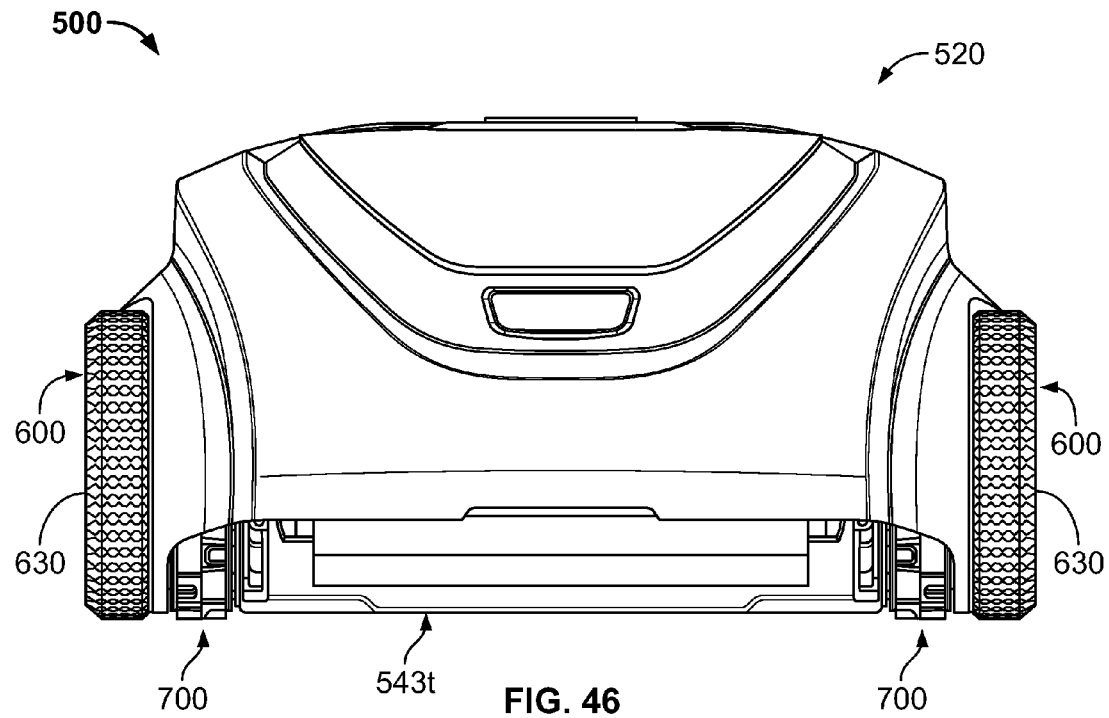
FIG. 46 depicts a front elevational view of the cleaner of FIGS. 44-45.
Figure 47:
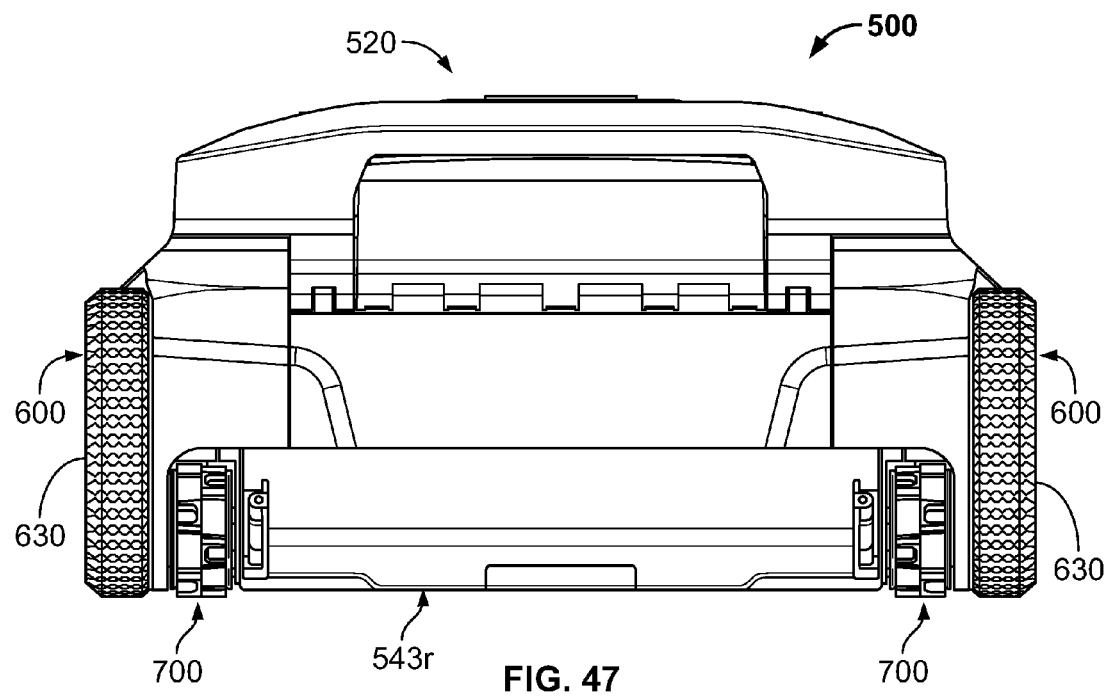
FIG. 47 depicts a rear elevational view of the cleaner of FIGS. 44-46.
Figure 48:
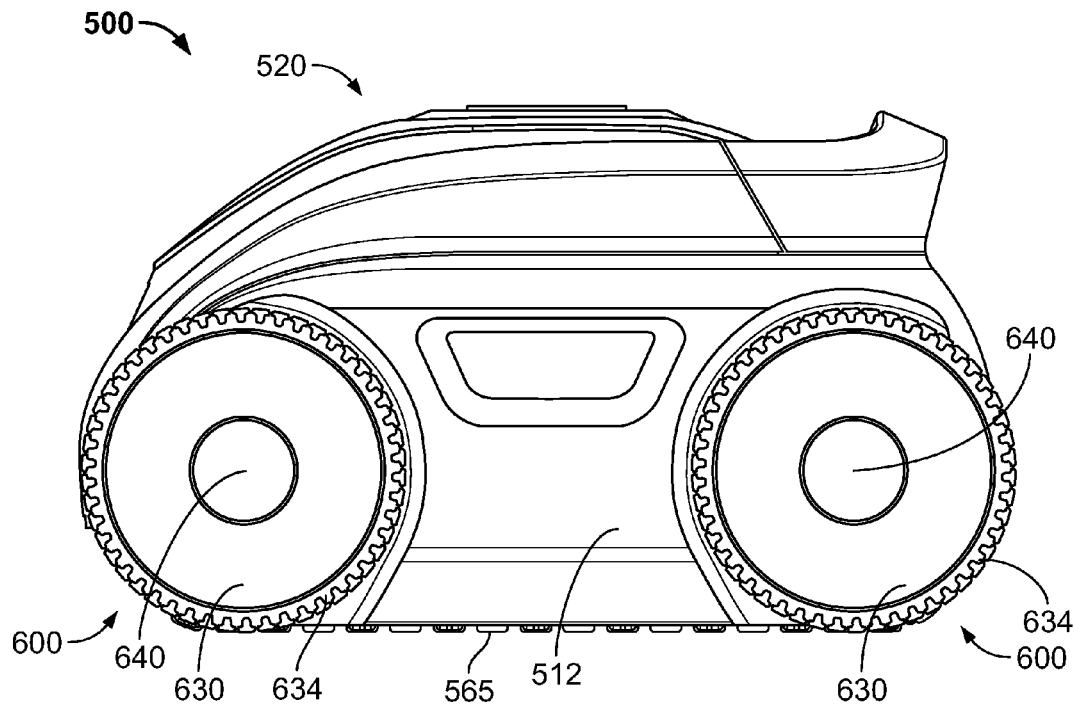
FIG. 48 depicts a right side elevational view of the cleaner of FIGS. 44-47.
Figure 49:
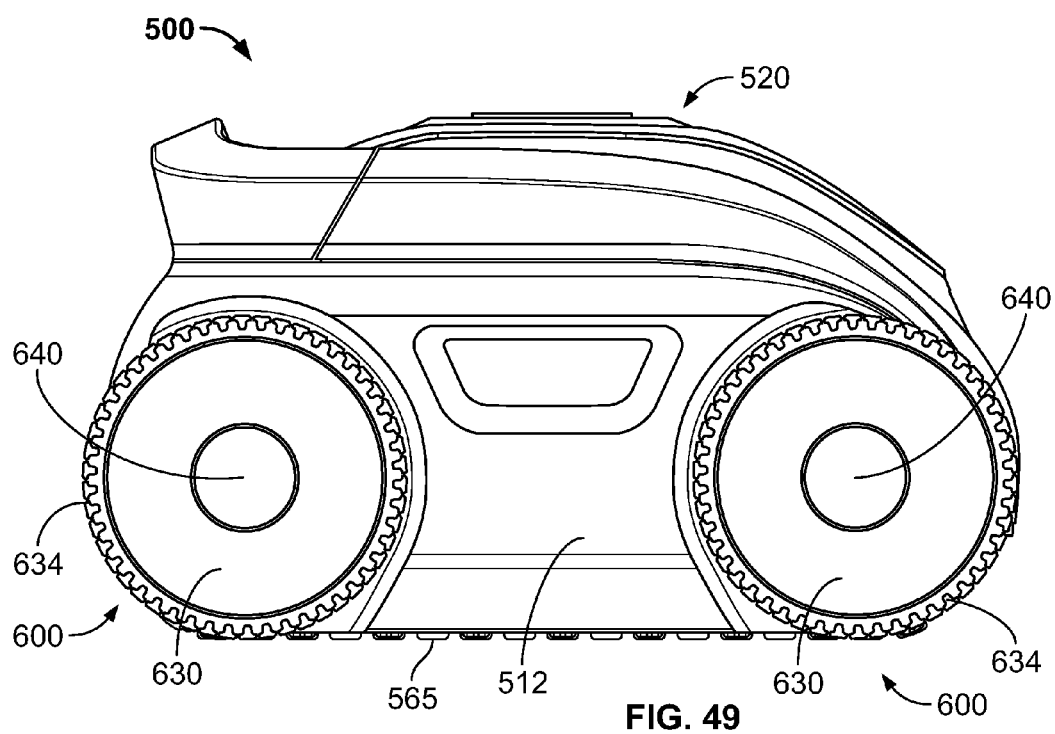
FIG. 49 depicts a left side elevational view of the cleaner of FIGS. 44-48.
Figure 50:
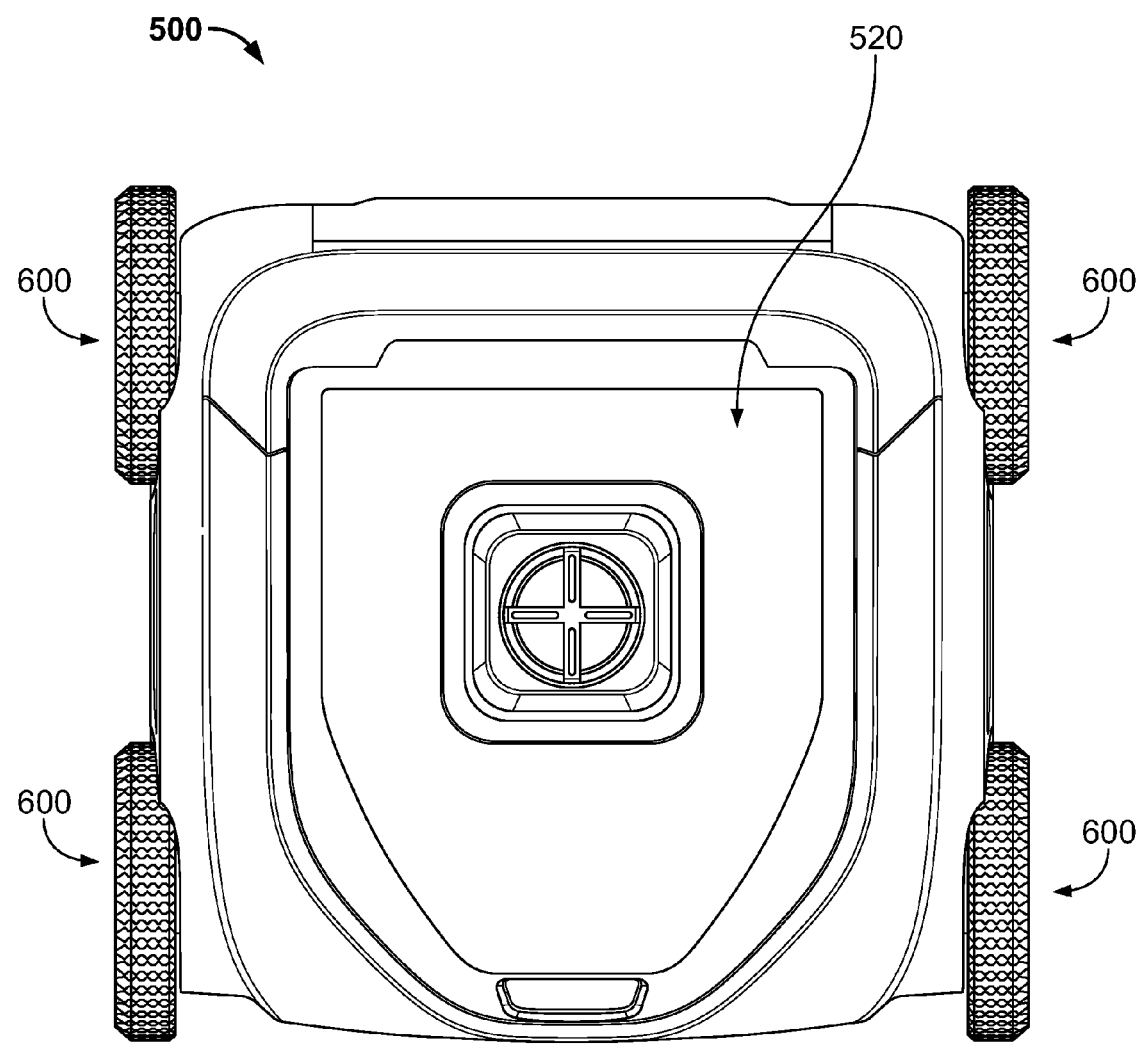
FIG. 50 depicts a top plan view of the cleaner of FIGS. 44-49.
Figure 51:
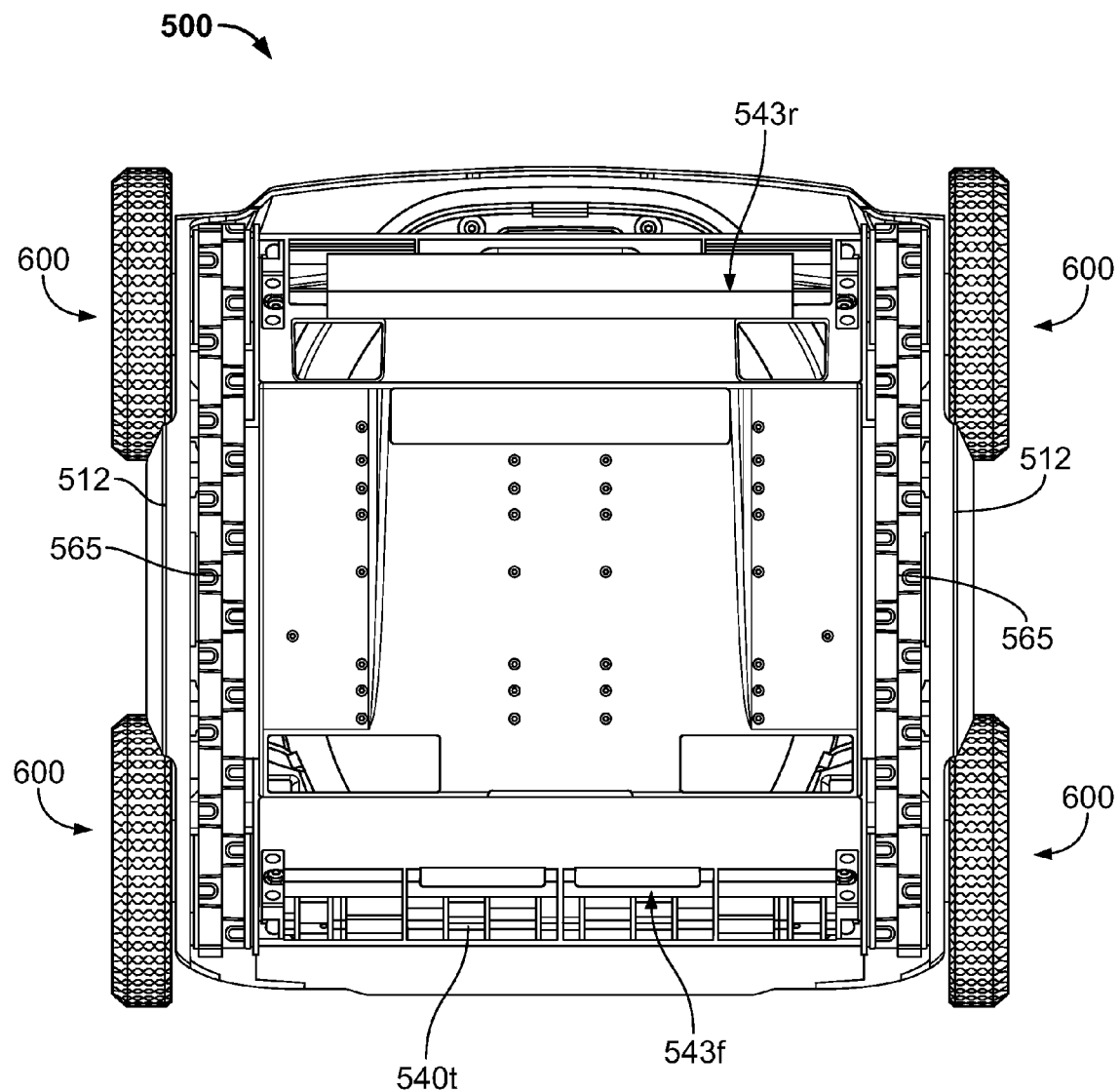
FIG. 51 depicts a bottom plan view of the cleaner of FIGS. 44-50.
Figure 52:
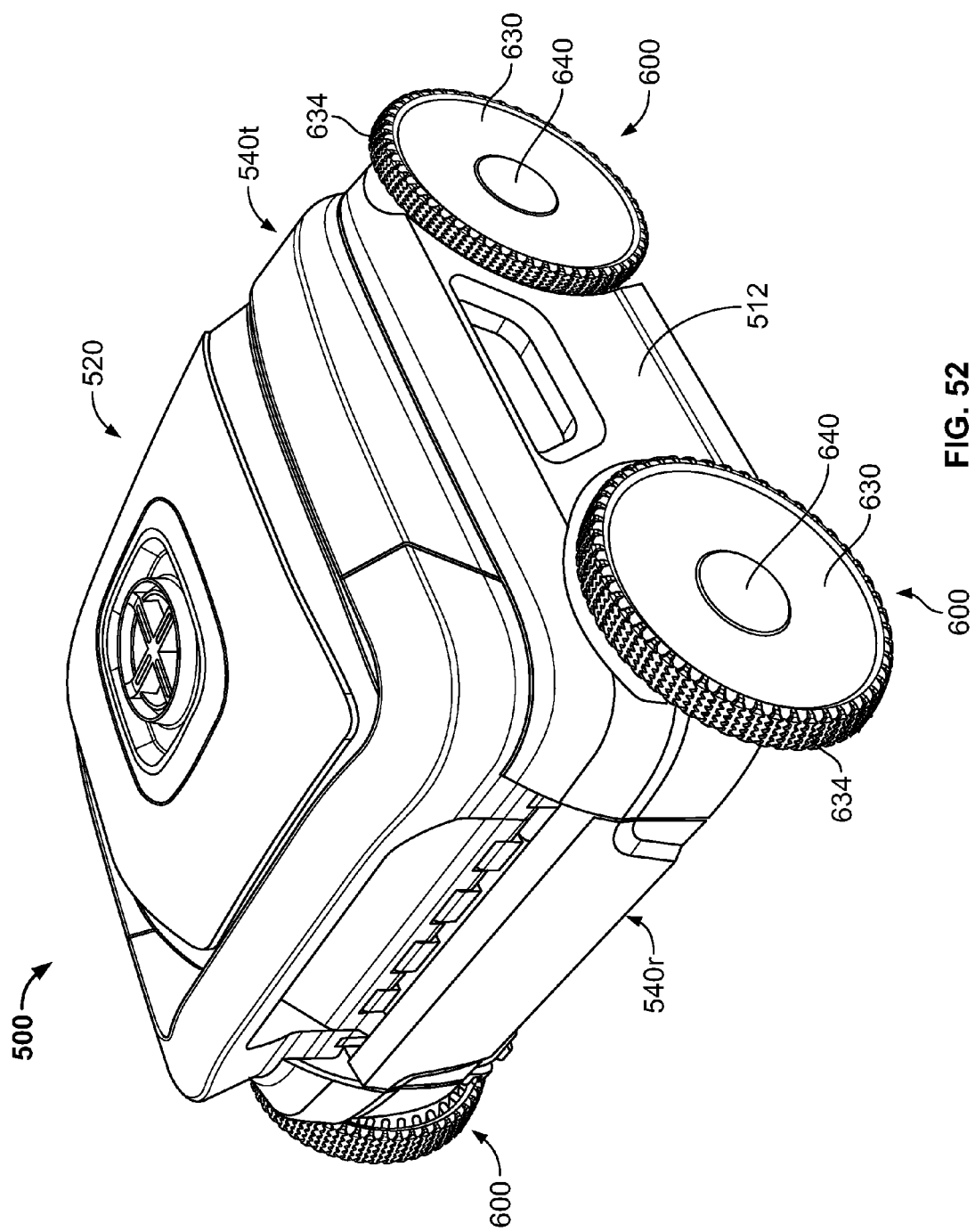
FIG. 52 depicts a rear perspective view of the cleaner of FIGS. 44-51.

As noted above, the cleaner 500 may also include one or more roller assemblies for scrubbing a target surface, e.g. the bottom or sides of the pool, during operation. Similar to previous embodiments, the cleaner 500 may include front and rear roller assemblies rotatably associated with said front and rear sets of bushings assemblies 535, respectively. As best depicted in FIGS. 45 46 and 51, the cleaner 500 may include a front roller assembly 540f rotatably associated a front sets of bushing assemblies 535. The front roller assembly 540f and front set of bushing assemblies 535 rotate in cooperation around a common axis and share a common axle 5430. Notably, as best depicted in FIGS. 45 and 62, the front roller assembly 540f does not share a common axis of rotation with the front pair of wheel assemblies. As later described in greater detail herein, this advantageously enables (i) use of wheels 630 which are substantially larger in diameter than the roller assemblies and (ii) proper alignment of the wheel assemblies 600 and roller assemblies relative to one another and/or relative to a target surface.

While the four-wheel, two-roller configuration discussed herein advantageously promotes device stability/drive efficiency, the current disclosure is not limited to such configuration. Indeed, three-wheel configurations (such as for a tricycle), two-tread configurations (such as for a tank), tri-axial configurations, etc., may be appropriate, e.g. to achieve a better turn radius, or increase traction.

FIG. 62 depicts a partial cross-sectional view of the cleaner 500 taken along section line 62-62 of FIG. 61 and looking in the direction of the arrows. FIG. 63 depicts an exploded view of the partial cross-sectional view of the cleaner 500 depicted in FIG. 62. FIGS. 62 and 63, are particularly useful to illustrate some of the additional components/features of the cleaner 500 relative to previous embodiments.

Similar to previous embodiments, cleaner 500 includes a base 511 and a side panel 512. Base 511 defines an internal cavity for including interior components such as a filter assembly 550 and a motor drive assembly (not depicted). As discussed above, the motor drive assembly may advantageously include a drive shaft extending through the side of the body into the side cavity space defined by side panel 512. In the side cavity the drive shafts interacts with the drive transfer system by turning drive belt 565 which extends around and acts to turn bushing assembly 535 which in turn drives the front drive axle 543f and front roller 540f. As noted above, the base 111, motor drive assembly, drive belt 565, bushing assembly 535 front drive axle 543f and front roller 540f are substantially the same and function in substantially the same way as in previous embodiments.

As described in this embodiment, cleaner 500 includes a wheel drive assembly 700 which advantageously interacts with an inner circumferential surface of wheel 630 of the wheel assembly 600, thereby driving the wheel. The wheel drive assembly is connected to the bushing assembly 535 via the front drive axle 543f. Thus, the axes of rotation for the drive assembly 700 is the same as the for the bushing assembly 535, front drive axle 543f and front roller 540f. As depicted, the wheel drive assembly 700 is concentric with respect to the bushing assembly 535. Also as depicted, the wheel drive assembly 700 has a smaller diameter than the bushing assembly 535 and the roller assembly 540f.

Figure 53:
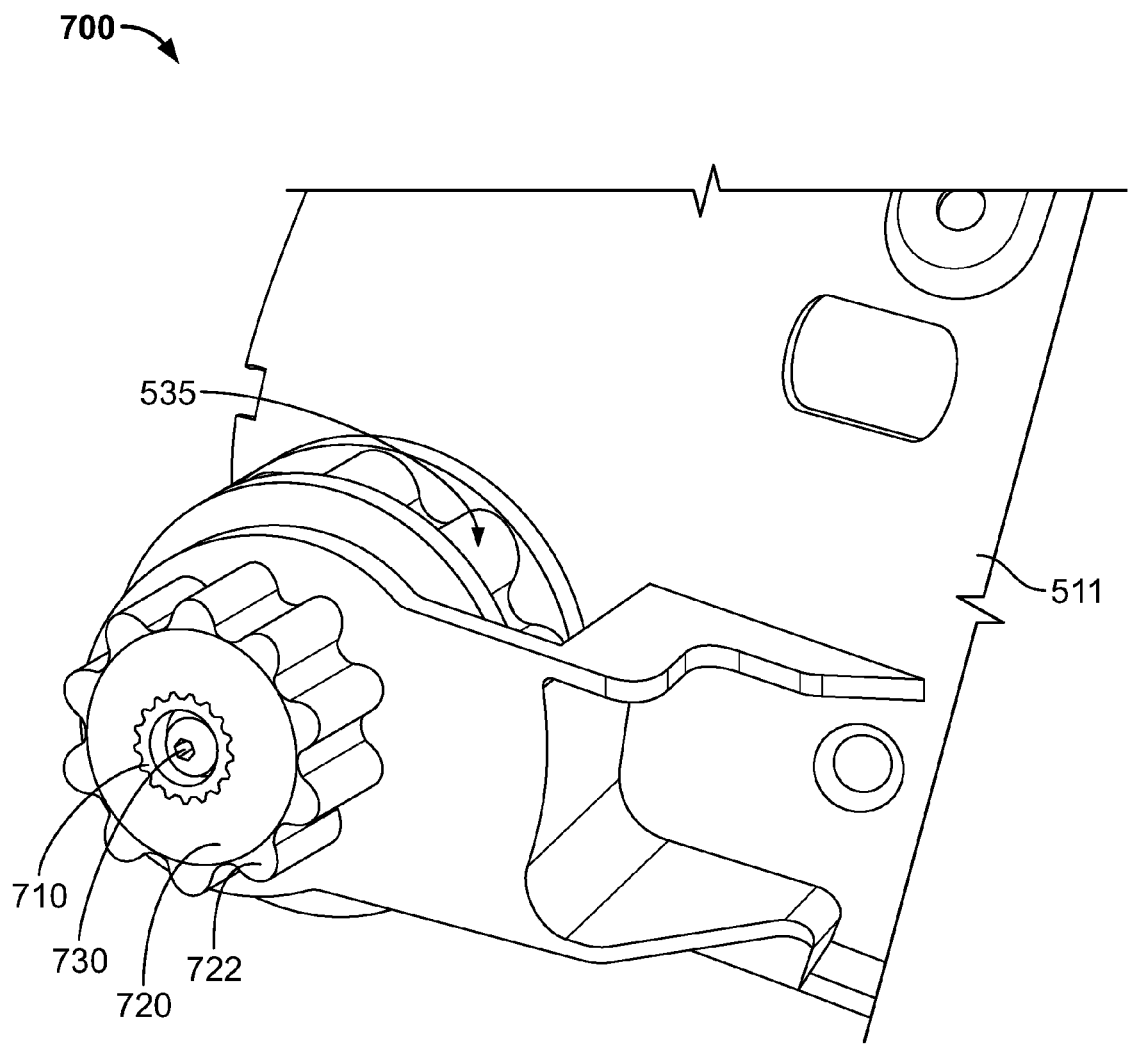
FIG. 53 depicts a front perspective view of the wheel drive assembly of the cleaner assembly of FIGS. 44-52.

The wheel drive assembly 700 is depicted in greater detail in FIG. 53. As previously noted, the drive assembly 700 may include drive gear 720 having a drive hub 710. A screw or pin 730 may be used to connect the drive hub 710 with respect the bushing assembly 535, e.g., via a drive axle. Thus a drive belt (not depicted in FIG. 53) may be used to drive the bushing assembly 535 which in turn drives the drive assembly 700. The drive assembly 700 is advantageously secured with respect an outer side surface of body 511 of the cleaner 500, e.g., using a bracket or a brace. As previously noted, the drive assembly 720 may be configured to interact with an inner circumferential surfaces of a wheel thereby driving the wheel. Thus, the outer circumferential surface of the drive gear 720 may define a first plurality of gear teeth 722 which may be configured to interact with a second plurality of gear teeth on an inner circumferential surface of a corresponding wheel.

Figure 59:
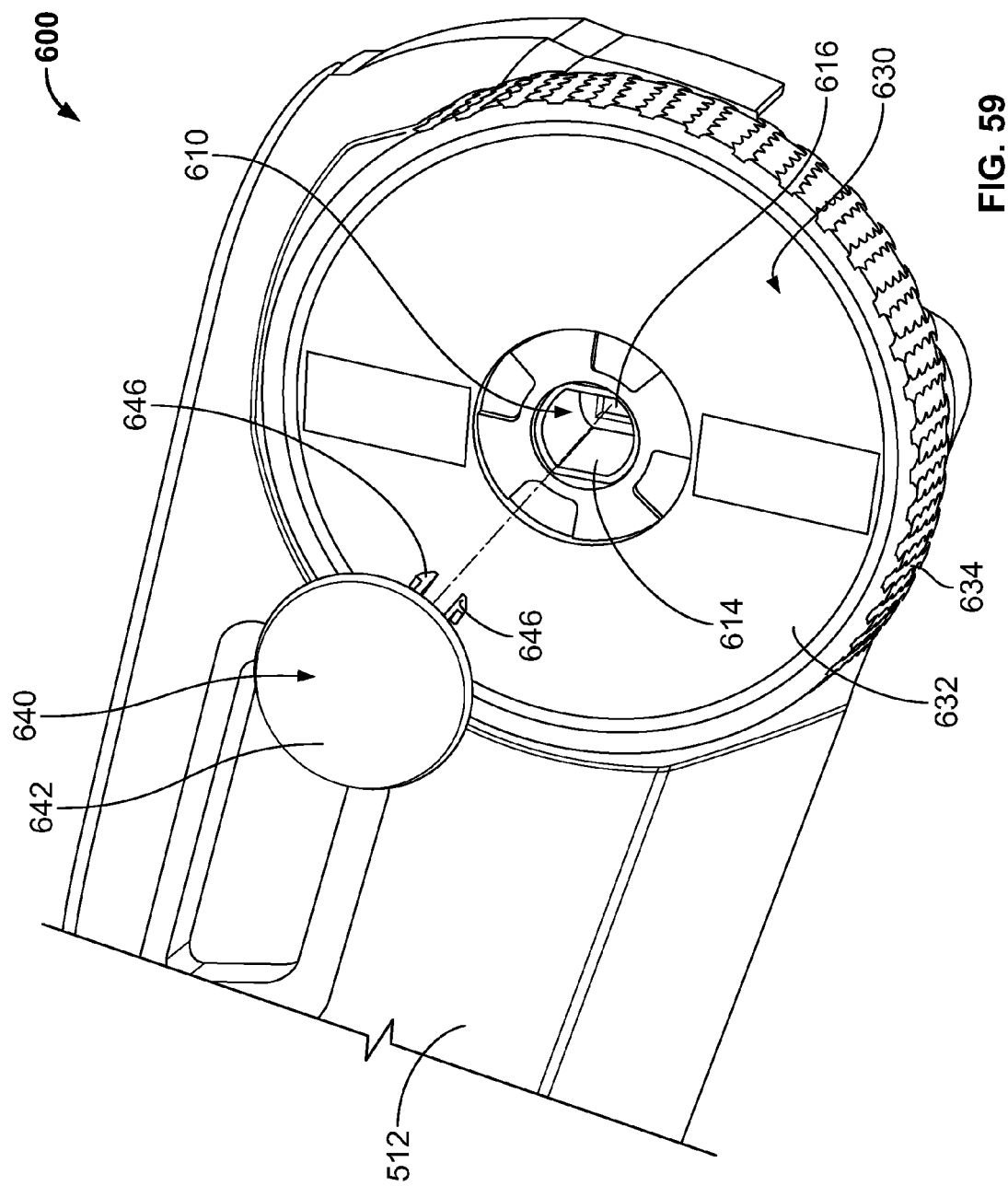
FIG. 59 depicts a front perspective view of the wheel assembly of the cleaner assembly of FIGS. 44-52.
Figure 60:
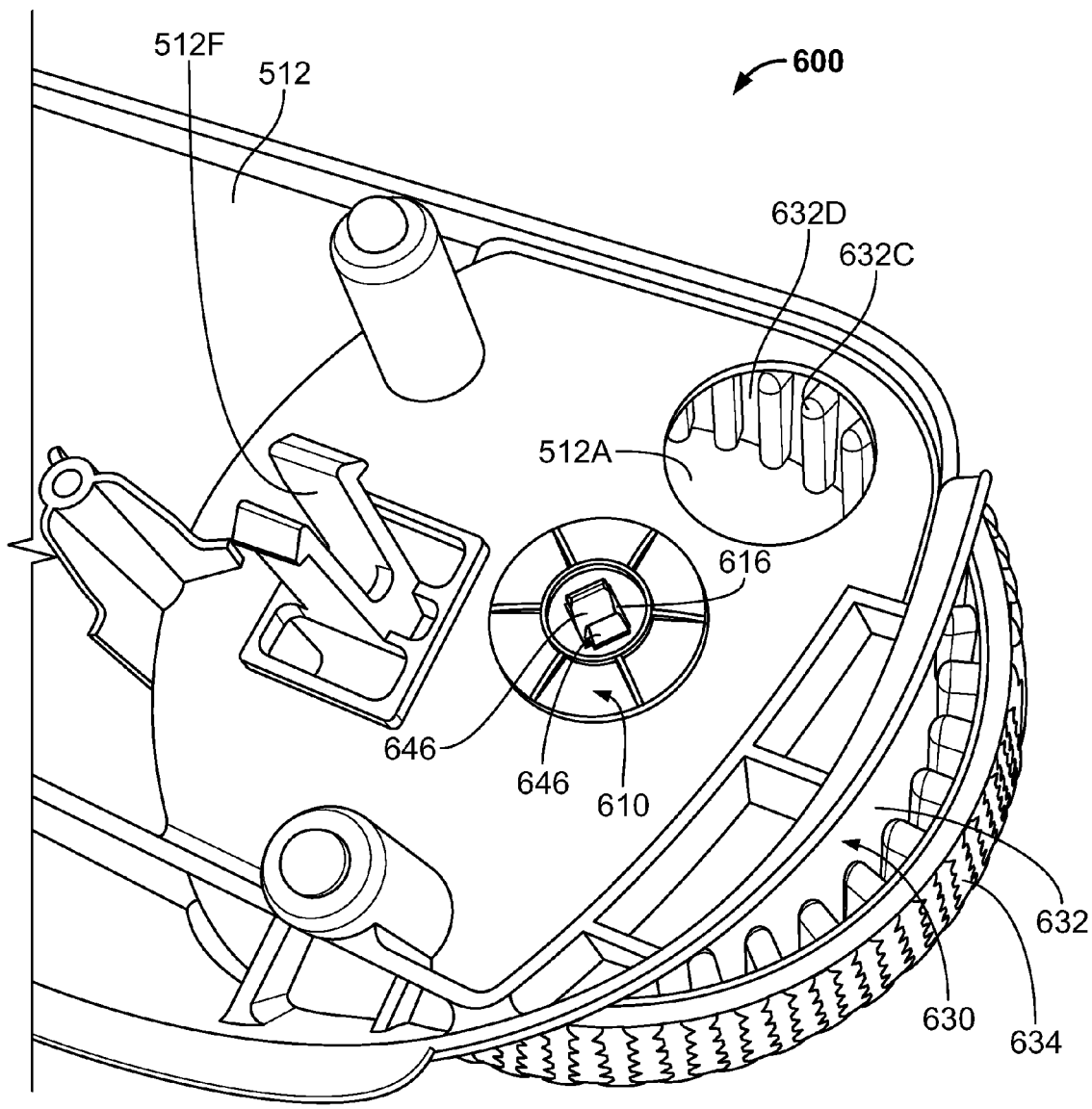
FIG. 60 depicts a rear perspective view of the wheel assembly of the cleaner assembly of FIGS. 44-52.
Figure 64:
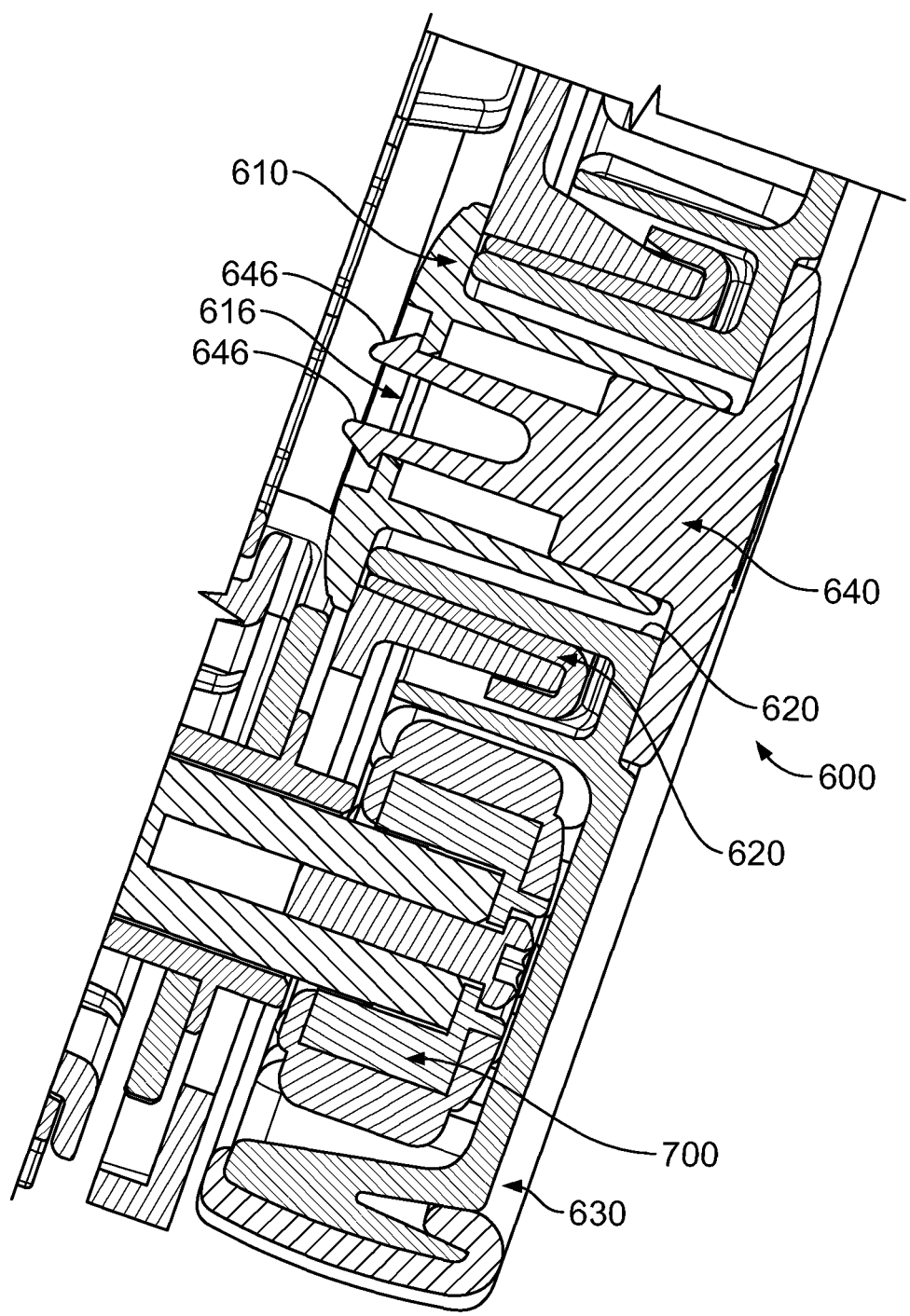
FIG. 64 depicts an enlarged view of section 64 of the partial cross-sectional view of FIG. 62.
Figure 65:
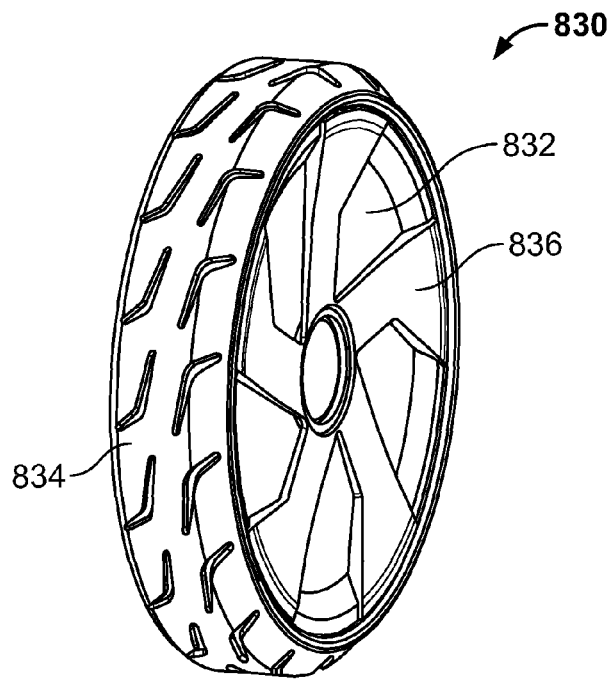
FIG. 65 depicts a perspective view of a wheel for a cleaner assembly, in accordance with another embodiment of the present disclosure.

Referring again to FIGS. 62 and 63, cleaner 500 includes an improved wheel assembly 600 which is both quick and easy to assemble (advantageously the wheel assembly 600 may be assembled without any special tools). Wheel assembly 600 generally includes a wheel bushing 610, a wheel hub 620, a wheel 630 and a wheel hub cap 640. As described herein the wheel bushing 610 and wheel hub 620 may cooperate to define a race for the wheel 630 with respect to an aperture defined in the side panel 512. In exemplary embodiments, the wheel assembly 600 may be assembled with respect to the side panel 512 by first inserting the wheel bushing 610 and wheel hub 620 through an aperture in the side panel 512. The wheel 630 may then mounted with respect to the wheel bushing 610 and wheel hub 620 and secured into place via the wheel hub cap 640. Next the side panel may be mounted and secured relative to the body 511 of the cleaner 500, thereby bringing the wheel drive assembly 700 into alignment and cooperation with the wheel assembly 600. FIG. 64 depicts an enlarged view of section 64 of the partial cross-sectional view of the cleaner 500 depicted in FIG. 62. FIG. 64 provides a better view of the interaction between the wheel bushing 610 and wheel hub 620, wheel 630 and wheel hub cap 640, after assembly. Individual components of the wheel assembly are depicted in FIGS. 55-58. Steps of assembling the wheel assembly, are depicted in FIGS. 54, 59 and 60.

Figure 57:
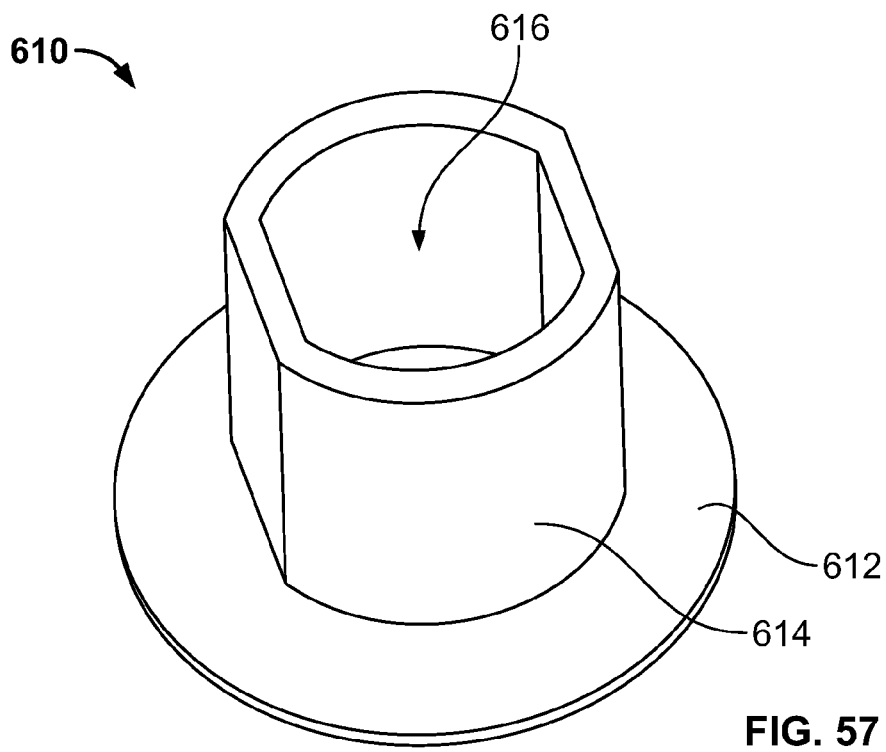
FIG. 57 depicts a perspective view of the wheel hub of the wheel assembly of the cleaner assembly of FIGS. 44-52.

The wheel bushing 610 is depicted in greater detail in FIG. 57. The wheel bushing 610 includes a base 612 and a cylindrical wall 614 extending from the base. As depicted, cylindrical wall 614 is cylindrical except for a pair of flat surfaces on opposite sides. The base 612 defines an aperture 616 (which, as later described with respect to FIGS. 59 and 60, may be used by the wheel hub cap 640 to secure the wheel 630 with respect to the side panel 512). As best depicted in FIGS. 54 and 63, cylindrical wall 614 of the wheel bushing 610 is configured for insertion through a first aperture 512C in the side panel. As depicted in FIG. 60 the base 612 of the wheel bushing 610 is larger than the aperture 512C to prevent the wheel bushing from extending all the way there though Referring again to FIG. 54 the cylindrical wall 614 of the wheel bushing 610 is extended through the aperture 512C in the side panel 512 from an inside surface of the side panel (i.e., so that the cylindrical wall 614 extends out from the side panel. Note that the wheel bushing 610 may be inserted through the aperture 512C before, after are at the same time as the wheel hub 620.

Figure 58:
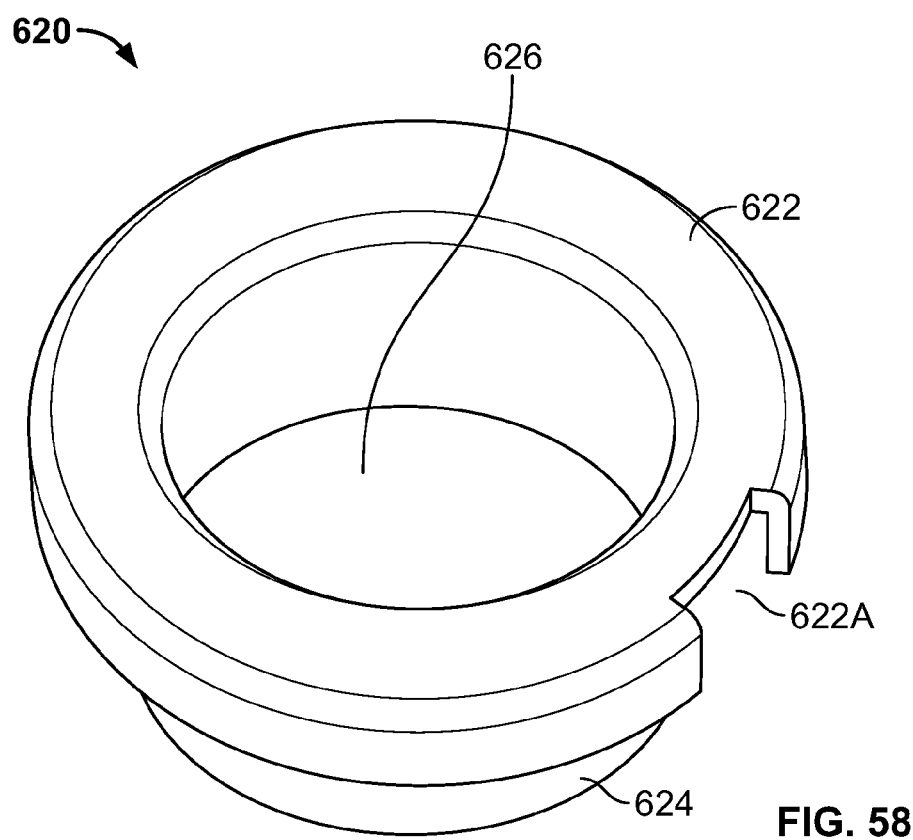
FIG. 58 depicts a perspective view of the wheel bushing of the wheel assembly of the cleaner assembly of FIGS. 44-52.

The wheel hub 620 is depicted in greater detail in FIG. 58. Like the wheel bushing 610, the wheel hub 620 includes a base 622 and a cylindrical wall 624 extending from the base. As depicted, cylindrical wall 614 is cylindrically shaped. Base 622 and cylindrical wall 624 cooperate to define a cylindrical aperture 626 through the wheel hub 620. Base 622 may also define a cylindrical lip extending in the same direction as cylindrical wall 624 so as to define a cylindrical slot in the base 22. As depicted, the cylindrical lip is substantially shorter than the flange and defines a notch 622A. As best depicted in FIGS. 54 and 63, the cylindrical wall 624 of wheel hub 620 may be configured for insertion through the aperture 512C in the side panel 512 opposite the wheel bushing 610 (from outside extending in). The base 622 of the wheel hub 620 may interact with the side panel to prevent the wheel hub 620 from extending all the way through the aperture 512C. In particular, as best depicted in FIGS. 54 and 62-64, aperture 512C may define a cylindrical lip 512D extending out from the side panel 512 for interacting with the cylindrical slot defined in base 622 of the wheel hub 620 (the cylindrical slot of the wheel hub 620 may receive the cylindrical lip 512D of the side panel 512). The cylindrical lip 512D may also define a stop 512E for interacting with the notch 622A of the cylindrical lip (the notch 622A may prevent rotation of the wheel hub 620 with respect to the side panel 512).

Figure 54:
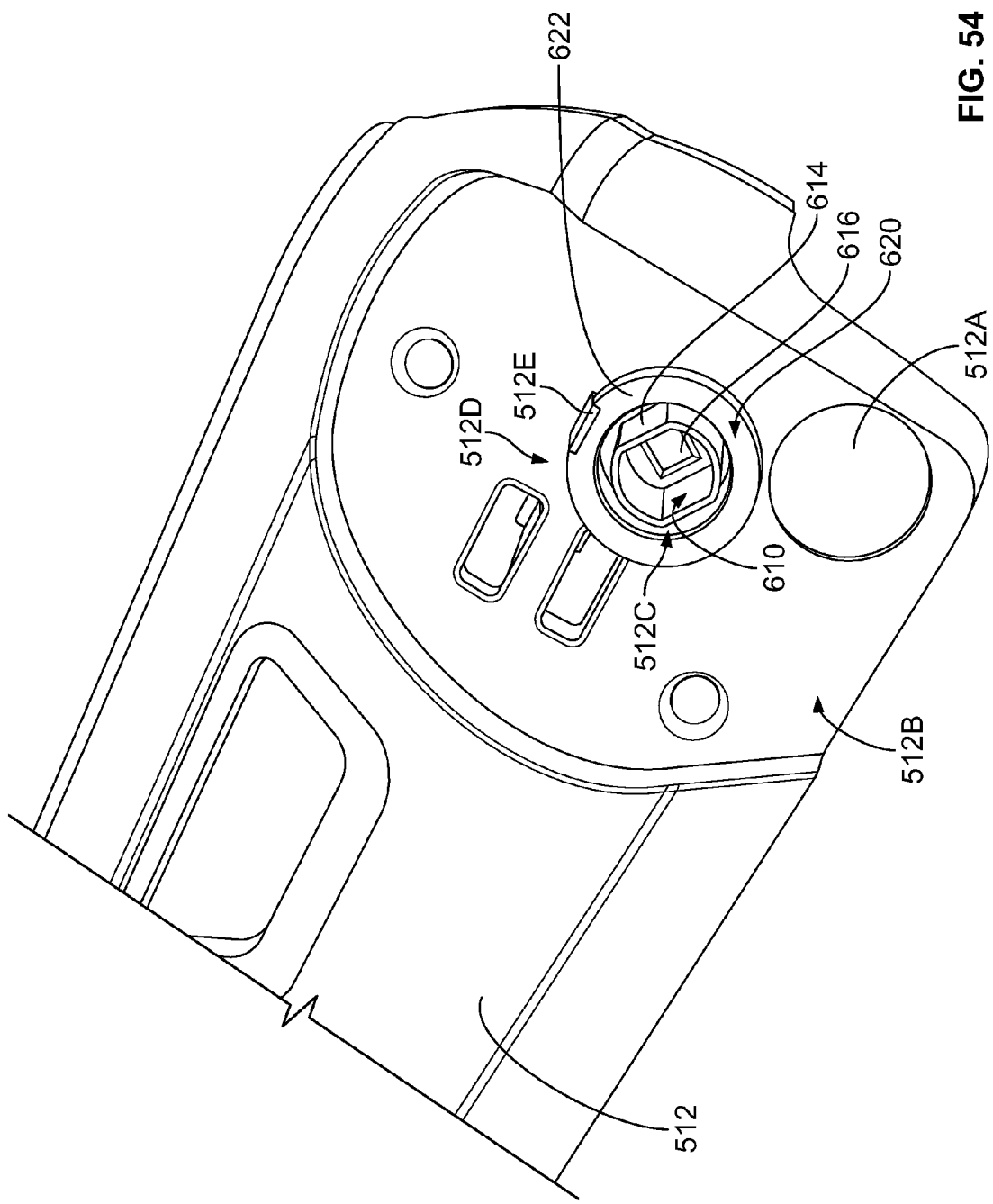
FIG. 54 depicts a perspective view the wheel hub and wheel bushing of the wheel assembly received in a side panel of the cleaner of FIGS. 44-52.

As best depicted in FIG. 54, once the wheel bushing 610 and wheel hub 620 are inserted through the aperture 512C in the side panel, they cooperate to define a race for receiving a wheel 630. In particular, the oppositely extending flanges of the wheel bushing 610 and wheel hub 620 cooperate to define a race there between (note that the outer diameter of the cylindrical wall 614 of the wheel bushing 610 is smaller than the inner diameter of the cylindrical wall 624 of the wheel hub). The race is substantially cylindrical and is configured to receive a first cylindrical flange 632A of the wheel 630 (see FIG. 56) thereby allowing for rotational movement of the wheel with respect to the side panel 512.

Figure 56:
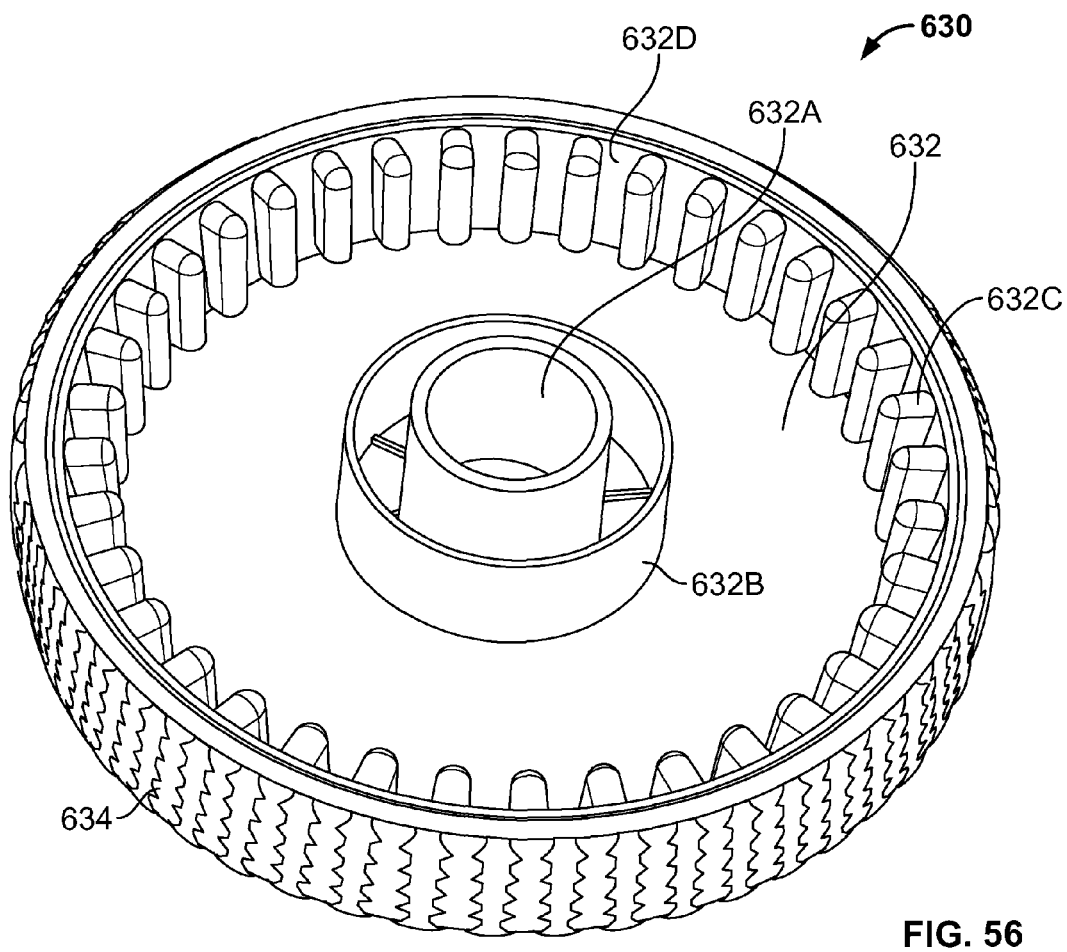
FIG. 56 depicts a perspective view of the wheel of the wheel assembly of the cleaner assembly of FIGS. 44-52.

With reference to FIG. 56, the wheel 630 is depicted in greater detail. As depicted, the wheel 630 includes a wheel base 632 and a tire/tread 634. Tire/tread 634 may be interchangeable. In exemplary embodiments, the wheel base 632 may define a channel for receiving the tire/tread 634. The wheel base 632 includes a first cylindrical flange 632A which also defines aperture. As noted above, the first cylindrical flange is configured for interacting with a race defined by the wheel bushing 610 and wheel hub 620. In particular, the first flange 632A is configured for insertion around a cylindrical wall 614 defined by the wheel bushing 610 and into the aperture 626 defined by the wheel hub 620. In exemplary embodiments, the wheel base 632 may also include a second cylindrical flange 632B, e.g., configured for insertion around the lip of the base 622 of the wheel hub 620 (See, e.g., FIGS. 62-64). As previously noted, a wheel drive assembly 700 may be configured to interact with an inner circumferential surfaces of the wheel 630 thereby driving the wheel. Thus, as depicted in FIG. 56, the wheel base 632 may define a plurality of gear teeth 632C on the inner circumferential surface thereof. The gear teeth 632C and/or root 632D of the gear teeth of FIGS. 67 and 68 may be advantageously sloped/angled in order to promote removal of debris from the wheel. Further detail on this type of sloping/angling is discussed below in connection with the wheel embodiment of FIGS. 67 and 68.

With reference again to FIG. 54, its is noted that the side panel 512 may define a recessed region 512B configured to receive the wheel 630 such that the wheel 630 may be at least partially set into the side panel 512. FIG. 59 depicts the wheel assembly 600 after the wheel 630 is mounted with respect to the side panel 512. Cylindrical wall 614 of the wheel bushing 610 can be seen extending through the aperture defined by the first cylindrical flange 632A of the wheel. At this stage the wheel bushing 610 is ready to receive the wheel hub cap 640 in order to secure the wheel.

Figure 55:
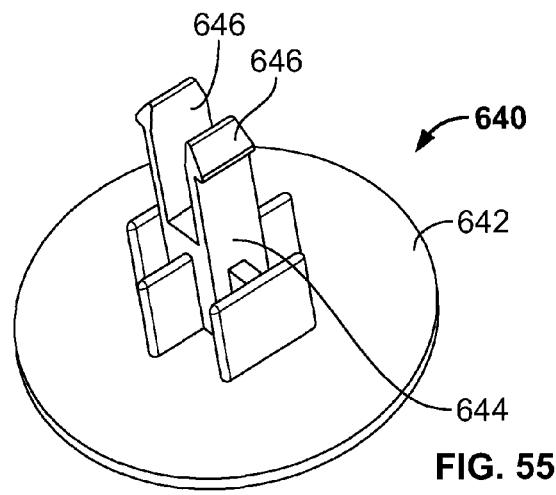
FIG. 55 depicts a perspective view of the wheel hub cap of wheel assembly the cleaner assembly of FIGS. 44-52.

With reference to FIG. 55 the wheel hub cap 640 is depicted in greater detail. The wheel hub cap advantageously defines a base 642 and a clip 644 which includes two deflectable arms 646. As depicted in FIG. 59 deflectable arms 646 are configured to interact with the aperture 616 defined in a base 612 of a wheel bushing 610 in order to lock the wheel 630 into place. In particular the deflectable arms deflect inward for insertion through the aperture 616 after which they deflect back out locking onto the inner surface of the base 612 of the wheel bushing 610. To release the wheel hub cap 640, the arms may again be deflected to allow for removal from the aperture 616. Advantageously, no tools are required to secure or remove the wheel hub cap 640 and/or to assemble or disassembly the wheel assembly. Thus allows, for quick and easy maintenance/interchangeability of the wheel 630 and/or the wheel hub cap 640. Indeed, different wheels 630 and/or wheel hub caps 640 may be used for different purposes, e.g., it may be advantageous to have different wheels for different surfaces. Some wheel hub caps 640 and/or the wheels 630 may include specific cleaning features such as brushes, cleaning solutions, scrapers and the like, which can be referenced as cleaning feature means for cleaning.

As noted above, FIGS. 54, 59 and 60 depict an exemplary process for assembling the wheel assembly 600. First, as depicted in FIG. 54 the wheel bushing 610 and wheel hub 620 inserted in opposite directions through the first aperture 512C in the side panel 512 (the wheel bushing 610 is inserted from the inside extending out while the wheel hub 620 is inserted from the outside extending in). As noted above, the wheel bushing 610 and wheel hub 620 may cooperate to define a race for receiving the wheel. Next, as depicted in FIG. 55, the wheel is mounted, e.g., with respect to the defined race. (See also FIGS. 62-64). Finally, as depicted in FIG. 60, the wheel hub cap 640 is inserted, e.g., through the aperture 616 defined by the wheel bushing 610, in order to secure the wheel 630 with respect to the side panel 512. Once the wheel assembly 600 is assembled, the side panel 512 may be mounted, e.g., using clip 512F, with respect to the base 511 of the cleaner 500, thereby aligning the wheel assembly 600 and the drive system 700. (See also FIGS. 62-64). Thus, as depicted in FIG. 59 the side panel 512 may define a second aperture 512A for receiving the drive assembly 700.

With reference now to FIGS. 65-68 a further exemplary embodiment of a wheel 830, e.g., for the cleaner 500 of FIGS. 44-64, is depicted. Wheel 830 may include a wheel base 832 and a tire/tread 834. The tire/tread 834 may be interchangeable. In exemplary embodiments, the wheel base 832 may define a notches 832E for interacting with stops 834A on the tire/tread 834 (e.g., for rotationally securing the tire/tread 834 with respect to the wheel base 832). Tire/tread 834 may include tread marks 834B for improved traction.

In some embodiments, the wheel 830 may include a wheel trim 836. The wheel trim 830 may be interchangeable and may be either functional, e.g., with cleaning functionality, or decorative. Thus, in exemplary embodiments, the wheel base 832 may include slots 832F for receiving flanges 836A on the wheel trim 836. The flanges 836A may facilitate quick and easy mounting and removal of the wheel trim 836.

The wheel base 832 may also define a first cylindrical flange 832A and, in some embodiments, a second cylindrical flange 832B to facilitate mounting the wheel 830 with respect to the cleaner 500, e.g., with respect to a race defined by a wheel bushing 610 a wheel hub 620, as previously described.

Figure 67:
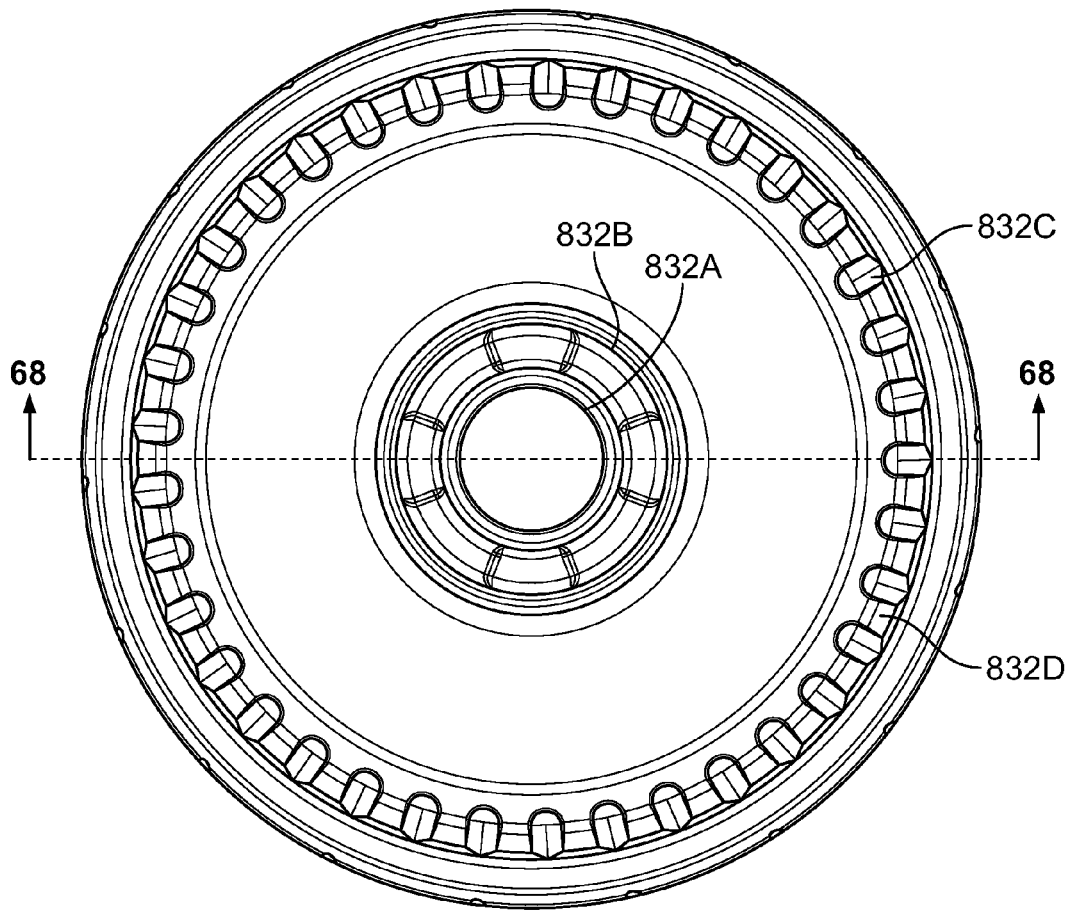
FIG. 67 depicts a side view of the wheel of FIGS. 65-66.
Figure 68:
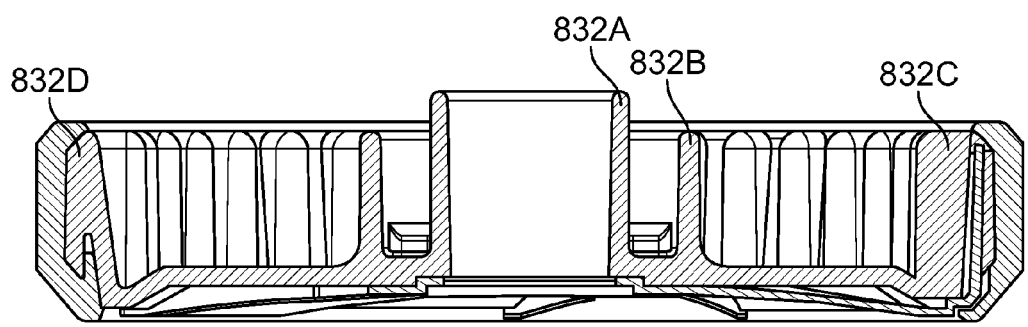
FIG. 68 depicts a cross-sectional view of the wheel of FIGS. 65-67 taken along section line 68-68 of FIG. 67 and looking in the direction of the arrows.

With specific reference to FIGS. 67 and 68 the wheel base may also define a first plurality of gear teeth 832C around the inner circumferential surface thereof. As illustrated in FIG. 68 the roots 832D of the gear teeth are advantageously sloped/angled with respect to the wheel axis. In particular, radial position of the root with respect to the wheel axis increases toward an open face of the wheel 630. This, sloping/angling of the roots 832D advantageously facilitates dislodging and removing debris from the around the gear teeth 832C and wheel in general. In exemplary embodiments, the gear teeth 832C themselves may also be sloped/angled. In further embodiments, the wheel may include two open faces. Thus, the roots 832D and/or gear teeth 832C may be sloped toward either of the open faces or toward both e.g. sloping in each direction from a ridge in the middle.

An advantageous feature of the wheel assemblies 600 and wheel drive assemblies 700 as herein described is that the axes of rotation for the bushing assemblies 535, axles 543$f$ and 543$r$, wheel drive assemblies 700 and/or roller assemblies 540$f$ and 540$r$ may be different than the axes of rotation for the wheel assemblies 600. Thus, wheels 630 may advantageously have diameters that are substantially larger than the drive belt bushing assemblies 535 and/or roller assemblies 540$f$ and 540$r$. The larger diameter may advantageously improve torque and/or traction as well as allow for an easier transition from cleaning a horizontal surface to cleaning a vertical surface (e.g., wall climbing as described herein).

For example, with specific reference to FIG. 61, a left side elevational schematic of an exemplary cleaner 500 is depicted illustrating internal components of a drive assembly 700 and wheel assembly 600. In the illustrated embodiment, it is noted that the roller assemblies 540$f$ and 540$r$ are aligned relative to the wheel assemblies 600 such that bottom surfaces of the front and rear roller assemblies 540$f$ and 540$r$ are slightly lower than bottom surfaces of the wheels of the wheel assemblies 600. This may advantageously enables improved cleaning, e.g. by allowing for compression of the roller assemblies 540$f$ and 540$r$ with respect to a target surface, e.g., underneath the cleaner 500. It is further noted that that front roller assembly 540$f$ is aligned relative to the front wheel assemblies 600 such that a front surface of the front wheels of the front wheel assemblies 600 are slightly forward of the front surface of the front roller assembly 540$f$. Similarly, the rear roller assemblies 540$r$ is aligned relative to the rear wheel assemblies 600 such that the rear surface of the rear wheels of the rear wheel assemblies 600 are slightly back of the rear surface of the rear roller assembly 540$r$. These configurations may advantageously promote improved traction, e.g., with respect to vertical surfaces such as walls, and/or enable easier transitions to and from climbing positions (such as described with respect to cleaner 300). Also, as depicted in FIG. 61, the drive gears of the front drive assemblies 700 may be configured to interact with respect to a bottom forward region of the inner circumferential surface front wheels of the wheel assemblies 600. Similarly, it is noted that the drive gears of the rear drive assemblies may be configured to interact with respect to a bottom rear region of the inner circumferential surface front wheels of the wheel assemblies 600. Thus, as depicted, the axes of rotation for the wheel drive assemblies 700 and roller assemblies 540$f$ and 540$r$ is different than the axes of rotation for the wheel assemblies 700.

In exemplary embodiments, such as that depicted in FIG. 61, the wheel assemblies 600 and wheel drive assemblies 700 may be configured such that the outer circumference of the roller assemblies 540$f$ and 540$r$ is slightly outside of the outer circumference of the wheels 630 around the point of contact with the target surface to be cleaned, thus allowing for compression such that the roller assembly is slightly compressed at the point of contact. In other In some embodiments, however, the wheel assemblies 600 and wheel drive assemblies 700 may be configured such that, during operation, the wheels 730 contact a target surface to be cleaned at substantially the time as the rollers assemblies 540$f$ and 540$r$. Thus, the wheel assemblies 600 and wheel drive assemblies 700 may be configured such that the outer circumference of the roller assemblies 540$f$ and 540$r$ may be "substantially tangent" with an outer circumference of the wheels 630 around the point of contact with the target surface to be cleaned ("substantially tangent" used in this sentence to mean tangent when projected onto a common plane).

In some embodiments, the wheel assemblies 600 and wheel drive assemblies 700 may be configured such that, during operation, the wheels 630 (and not the roller assemblies) initially contact a target surface to be climbed. For example, this might occur when the cleaner is traversing the bottom wall of the pool on approach to a vertical wall, such that initial contact with the vertical wall is had by the wheels, and such that contact between the rollers and the vertical wall happens thereafter when the cleaner is climbing the vertical wall. Thus, in exemplary embodiments, the wheel assemblies 600 and wheel drive assemblies 700 may be configured such that the outer circumference of the roller assemblies 540$f$ and 540$r$ is slightly inside of the outer circumference of the wheels 630 around the initial point of contact with the target surface to be climbed. This, advantageously enables improved traction with respect to the target surface to be climbed, especially when transitioning from a first wall to a second wall angled with respect to the first wall (e.g., from horizontal to vertical, vertical to horizontal, horizontal to a sloped beach entry/exit wall, etc.)

As compared to the embodiment depicted in FIG. 61, for example, embodiments are contemplated where the front of the front wheels 630 may be slightly more forward than the front of the front roller assembly 540$f$ and the rear of the rear wheels 630 may be slightly more back than the rear of the rear roller assembly 540$r$, e.g., to allow for some compression of a cleaning surface of the roller assemblies against a target surface to be cleaned. In yet other exemplary embodiments, the front of the front roller assembly 540$f$ may be slightly more forward than the front of the front wheels 630 and the rear of the rear roller assembly 540$r$ may be slightly more back than rear of the rear wheels 630, e.g., to allow for improved contact of the wheels with a surface to be climbed, e.g., a vertical surface. Such improved contact can improve traction and/or climbing capabilities.

In the embodiment depicted in FIG. 61, the front drive gears 720 may be configured to interact with respect to a bottom and/or forward region of the inner circumferential surface front wheels 630. Similarly, in exemplary embodiments the rear drive gears 720 may be configured to interact with respect to a bottom and/or rear region of the inner circumferential surface rear wheels 630. This positioning of the drive gears 720 and wheels 630 advantageously enables proper alignment of the wheels 620 with respect to the roller assemblies 540f and 540r.

FIGS. 69-72 relate to another embodiment of a cleaner, designated as cleaner 900, and with further reference to the disclosure of the cleaner 500 of FIGS. 44-68. As can be appreciated from FIGS. 69-72, there are many components in common between the cleaner 900 and the cleaner 500. For example, the cleaner 900 includes various motive-drive elements described with respect to the cleaner 500, such as drive belts 565, busing assemblies 535, drive axles 543f and 543r and front and/or rear roller/scrubbers 540f and 540r. Moreover, common elements include apparatus and functions internal to a base 511 of the cleaner 900, including apparatus and functions relating to an impeller motor, intake apertures, intake channels and filter assembly. Additionally, the cleaner 900 includes the wheel assemblies 600 and the wheel drive assemblies 700, and their respective associated components, and as provided with the supplemental and/or alternate features described below.

The cleaner 900 includes, inter alia, a wheel 902 with some features not present in the wheel 630 of cleaner 500, and further includes an idler gear 904 that is engaged with the wheel assemblies 600 and wheel drive assemblies 700. The wheel 902 and idler gear 904, and the advantages thereof, are discussed in greater detail in the sections that follow.

Figure 69:
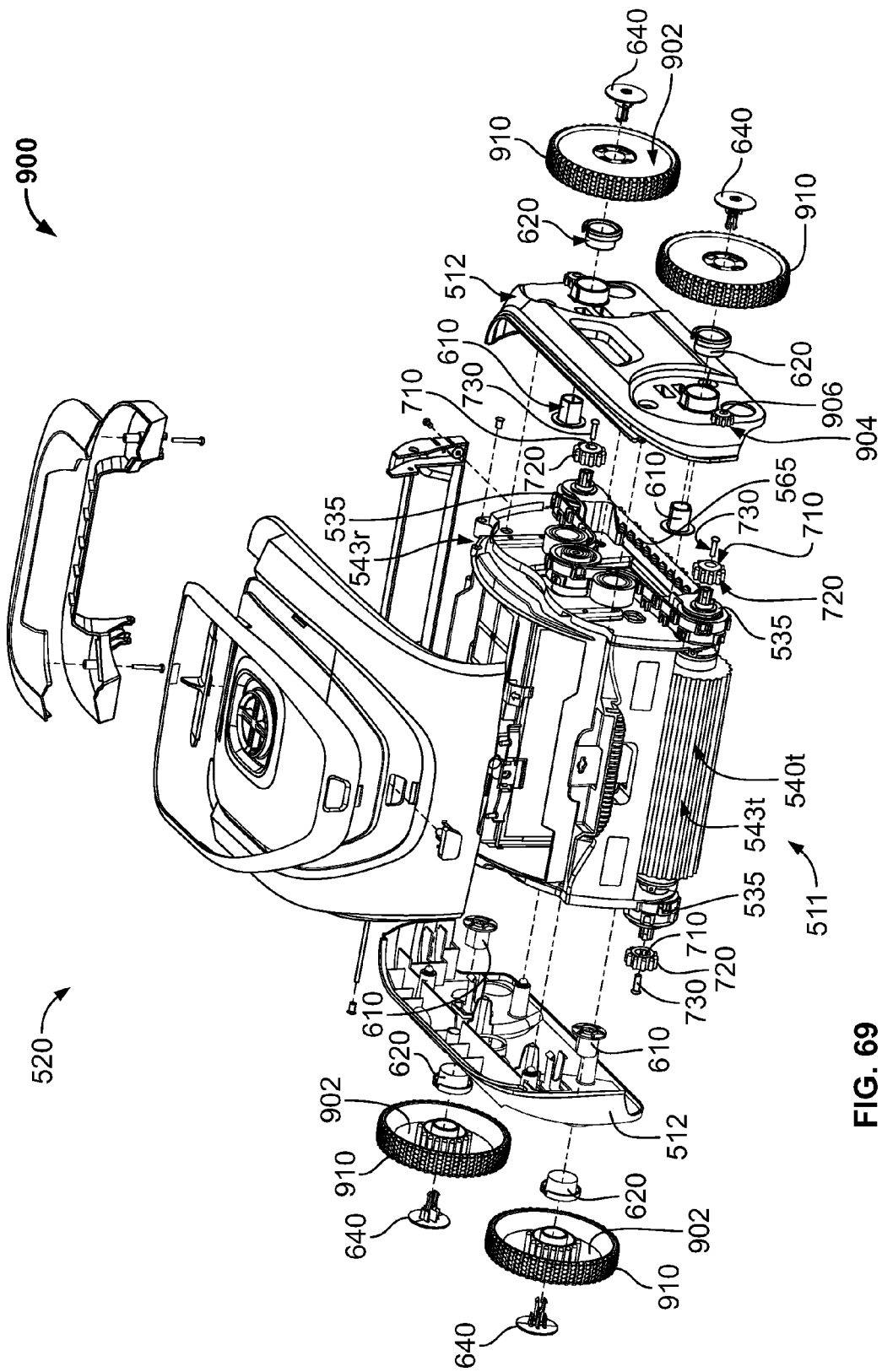
FIG. 69 depicts an exploded front perspective view of another exemplary cleaner in accordance with another embodiment of the present disclosure, the exemplary cleaner including, inter alia, a wheel assembly having a wheel, wheel hub, wheel bushing and wheel hub cap, and a wheel drive assembly including an idler gear.

Referring generally to FIGS. 69-72, and particularly FIG. 69, the cleaner 900 shares numerous components with the cleaner 500. As discussed previously in connection with the cleaner 500, the cleaner 900 is typically supported/propelled about a pool by a plurality of wheel assemblies 600 located relative to the bottom of the cleaner 900. The wheel assemblies 600 are usually powered by the motor drive assembly in conjunction with the drive transfer system, as discussed herein. In exemplary embodiments, the cleaner 900 includes a front pair of wheel assemblies 600 aligned along a front axis and a rear pair of wheel assemblies 600 aligned along a rear axis. As best depicted in FIG. 69, each wheel assembly 600 is operatively associated with a corresponding wheel drive assembly 700 which transfers power from a corresponding bushing assembly 535 to the wheel assembly 600. More particularly, each wheel drive assembly 700 may include a drive gear 720 that includes a drive gear hub 710 that is secured, e.g., via screw 730, relative to the axle driven by the corresponding bushing assembly 535. Thus, the drive gear 720 and bushing assembly 535 are aligned along a common axis of rotation. The outer circumferential surface of the drive gear 720 may define a first plurality of gear teeth 722 which may be configured to interact with a second plurality of gear teeth 904A on the idler gear 904, discussed in greater detail below.

Figure 70:
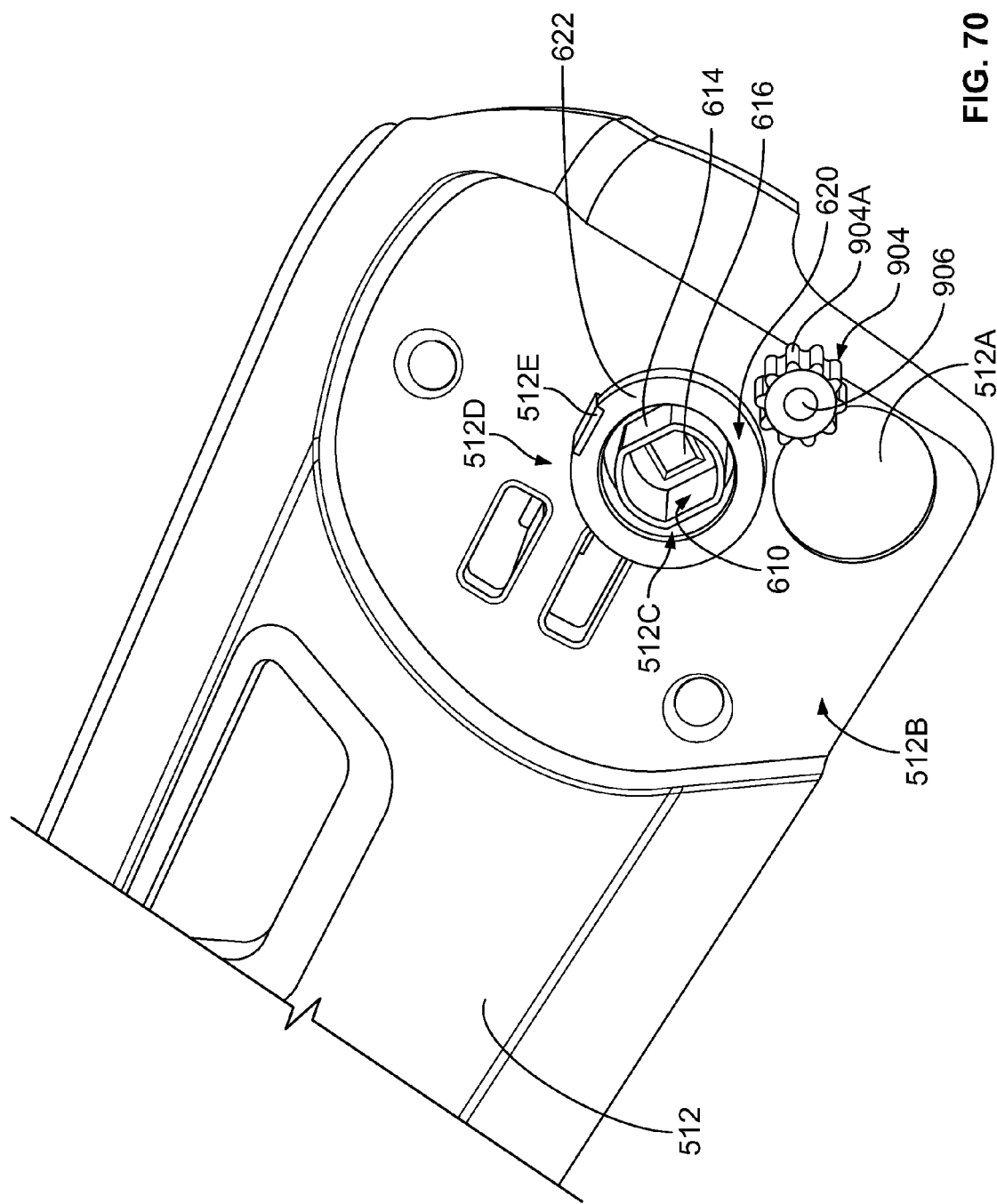
FIG. 70 depicts a perspective view of the idler gear of, and the wheel hub and wheel bushing of the wheel assembly received in, a side panel of the cleaner of FIG. 69.
Figure 71:
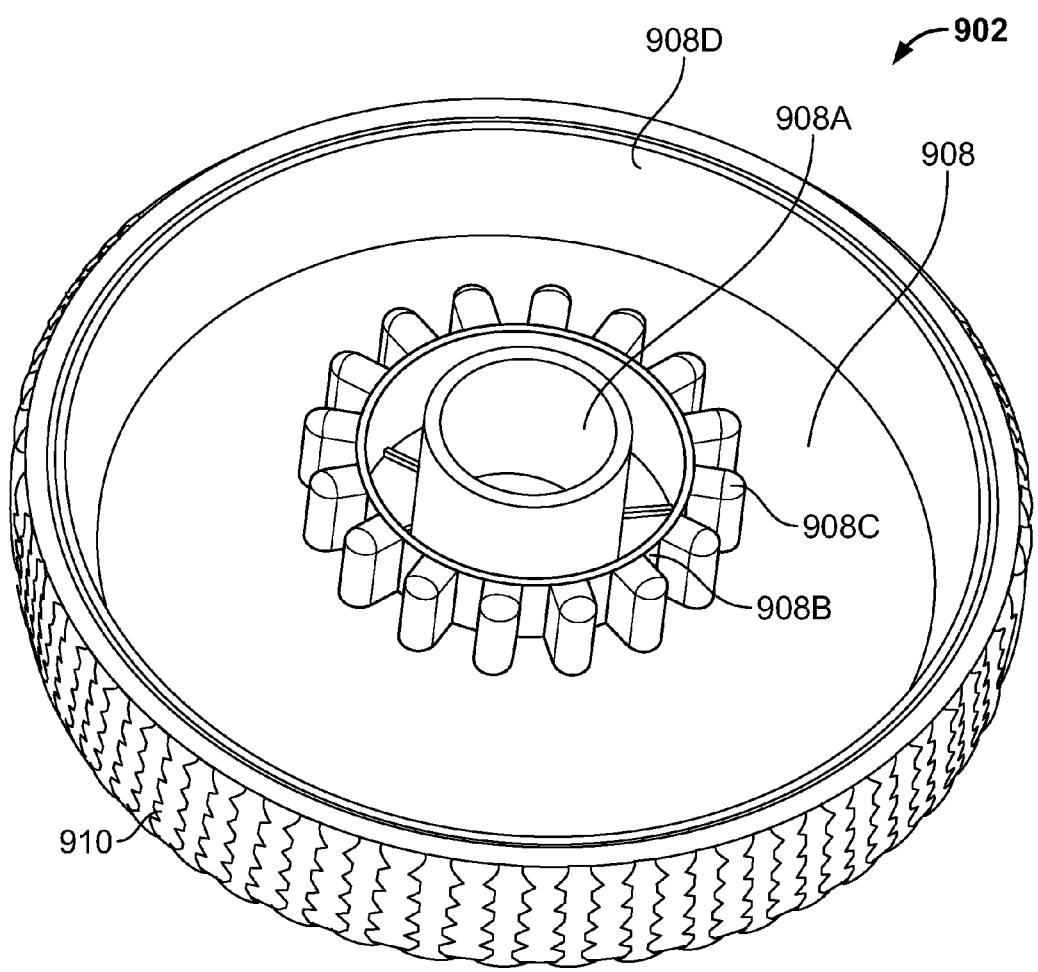
FIG. 71 depicts a perspective view of the wheel of the wheel assembly of the cleaner assembly of FIG. 69.

With reference to FIGS. 69-71, it is noted that the side panel 512 may define a recessed region 512B configured to receive the wheel 902 such that the wheel 902 can be at least partially set into the side panel 512. Additionally, each recessed region 512B of each side panel 512 includes a post 906 extending therefrom that includes an idler gear 904 rotatably mounted thereto. That is, each idler gear 904 can rotate about a respective post 906, and is inhibited from being easily removed from the post 906. The post 906 is integrally formed with and extends from the side panel 512. A fastener or rivet, such as a "Christmas tree" fastener, can implemented to secure the idler gear 904 to the post 906. The idler gears 904 are positioned in respective recessed region 512B such that the teeth 904A of the idler gear 904 engage the teeth 722 of the drive gear 720 that extends through the second aperture 512A of the side panel 512.

Figure 66:
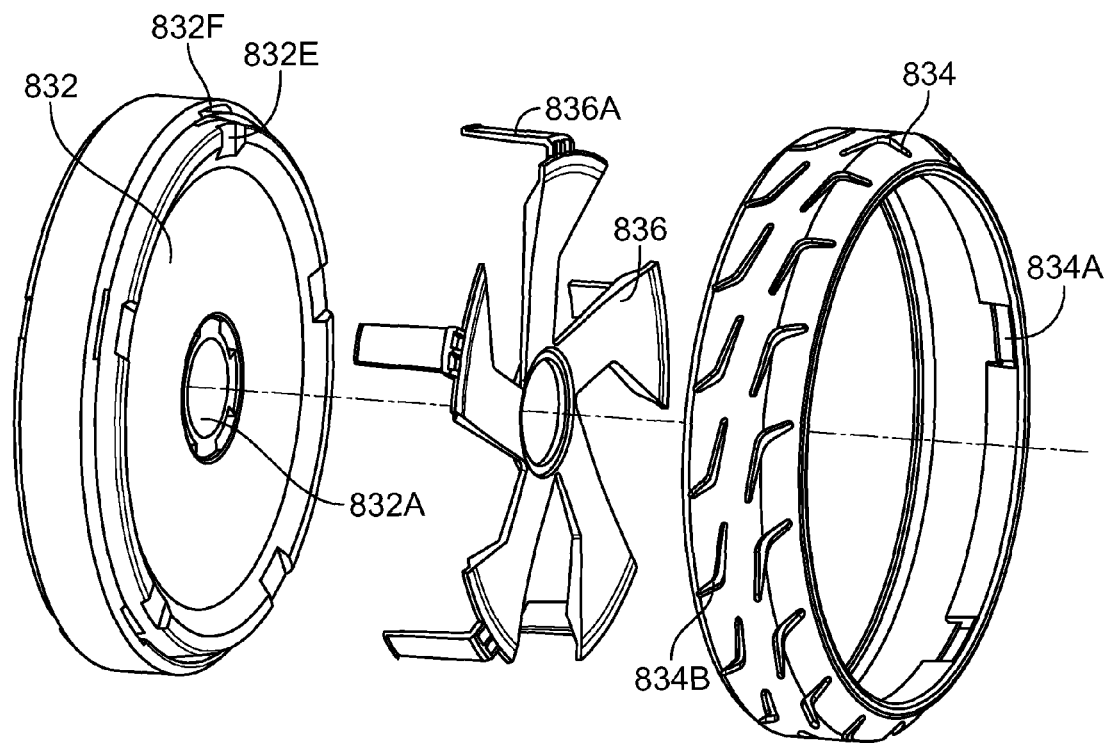
FIG. 66 depicts an exploded view of the wheel of FIG. 65.

Similar to wheel 830 of FIG. 66, the wheel 902 of the cleaner 900 is substantially similar to the wheel 630 in connection with the cleaner 500 of FIGS. 44-68. As depicted, the wheel 902 includes a wheel base 908 and a tire/tread 910. The tire/tread 910 may be interchangeable. In exemplary embodiments, the wheel base 908 can define a channel for receiving the tire/tread 910. The wheel base 908 includes a first cylindrical flange 908A defining an aperture, a second cylindrical flange/root 908B, gear teeth 908C, and a rim 908D. The first cylindrical flange 908A is configured for interacting with a race defined by the wheel bushing 610 and wheel hub 620 in similar fashion to that discussed previously. In particular, the first flange 908A is configured for insertion around a cylindrical wall 614 defined by the wheel bushing 610 and into the aperture 626 defined by the wheel hub 620. The second cylindrical flange 908B is configured for insertion around the lip of the base 622 of the wheel hub 620. As previously noted, the wheel drive assembly 700 is configured to interact with the idler gear 904, which in turn is configured to interact with a circumferential surface of the second cylindrical flange/root 908B of the wheel 902 thereby driving the wheel 902. Thus, as depicted in FIG. 71, the wheel base 908 can define a plurality of teeth 908C on the circumferential surface of the second cylindrical flange/root 908B.

Figure 72:
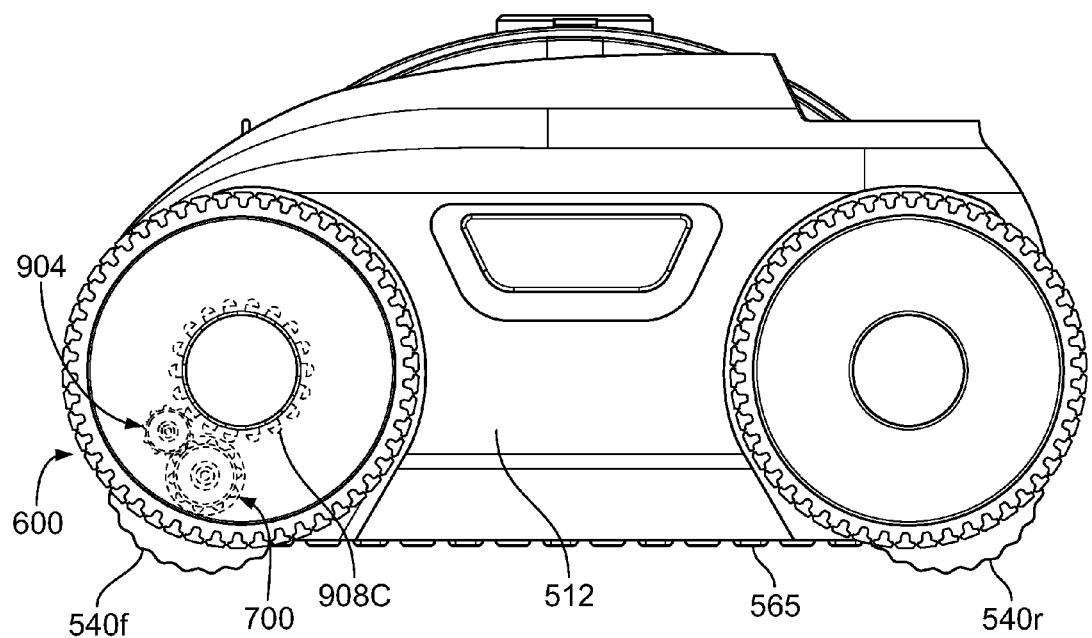
FIG. 72 depicts a left side elevational schematic of the cleaner of FIG. 69 illustrating internal components of the drive assembly and wheel assembly including the idler gear.

The interaction between the drive assembly 700, idler gear 904, and plurality of teeth 908C on the second cylindrical flange/root 908B can be best be seen in FIG. 72. As can be seen in FIG. 72, the drive assembly 700 engages the idler gear 904 and the idler gear 904 engages the teeth 908C of the wheel 902. Accordingly, the idler gear 904 is an intermediate gear that transfers rotational motion of the drive assembly 700 to the wheel 902.

The gear teeth 908C and/or the second cylindrical flange/root 908D of the gear teeth 908C of FIG. 71 can be advantageously sloped/angled in order to promote removal of debris from the wheel. In particular, radial position of the root with respect to the wheel axis increases toward an open face of the wheel 908. This, sloping/angling of the second cylindrical flange/root 908B advantageously facilitates dislodging and removing debris from the around the gear teeth 908C and wheel in general. In exemplary embodiments, the gear teeth 908C themselves may also be sloped/angled. In further embodiments, the wheel may include two open faces. Thus, the second cylindrical flange/root 908B and/or gear teeth 908C can be sloped toward either of the open faces or toward both e.g. sloping in each direction from a ridge in the middle.

As described in this embodiment, the cleaner 900 includes the wheel drive assembly 700 which advantageously interacts with interior circumferential teeth 908C of the wheel 902 of the wheel assembly 600 via the idler gear 904, thereby driving the wheel 902. The wheel drive assembly is connected to the bushing assembly 535 via the front drive axle 543f. Thus, the axes of rotation for the drive assembly 700 is the same as the for the bushing assembly 535, front drive axle 543f and front roller 540f. As depicted, the wheel drive assembly 700 is concentric with respect to the bushing assembly 535. Also as depicted, the wheel drive assembly 700 has a smaller diameter than the bushing assembly 535 and the roller assembly 540f.

An advantageous feature of the wheel assemblies 600 and wheel drive assemblies 700 as herein described is that the axes of rotation for the bushing assemblies 535, axles 543f and 543r, wheel drive assemblies 700 and/or roller assemblies 540f and 540r may be different than the axes of rotation for the wheel assemblies 600. Thus, wheels 902 can advantageously have diameters that are substantially larger than the drive belt bushing assemblies 535 and/or roller assemblies 540f and 540r. The larger diameter may advantageously improve torque and/or traction as well as allow for an easier transition from cleaning a horizontal surface to cleaning a vertical surface (e.g., wall climbing as described herein).

Figure 73:
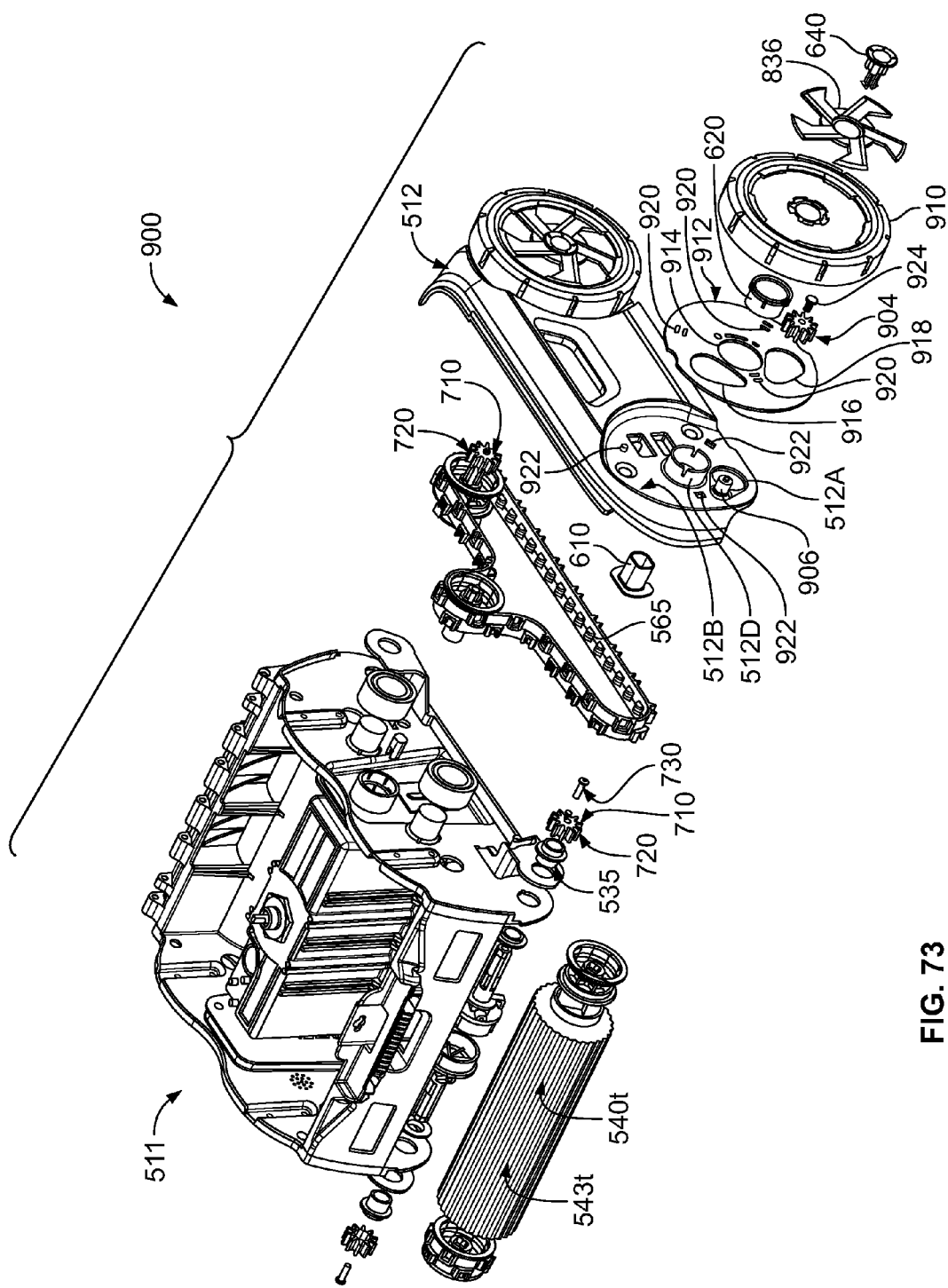
FIG. 73 is an exploded front perspective view of another exemplary cleaner in accordance with another embodiment of the present disclosure, the exemplary cleaner including, inter alia, a wheel shield.

FIG. 73 is an exploded front perspective view of an alternative embodiment of the cleaner 900. The cleaner 900 illustrated in FIG. 73 includes a wheel shield 912 positionable in the recessed region 512B of the side panel 512. The wheel shield 912 includes a central aperture 914, first and second placement apertures 916, 918, and a plurality of snap fasteners 920. The central aperture 914 is sized to fit over the cylindrical lip 512D, while the placement apertures 916, 918 are sized to fit over the post 906 and the second aperture 512A of the side panel 512. Such a configuration allows the wheel shield 912 to be positioned in the recessed region 512B of the side panel 512 without impacting the operation of the drive gear 720 or the idler gear 904. The recessed region 512B of the side panel 512 can include a plurality of notches 922 for receiving the snap fasteners 920 of the wheel shield 912. Accordingly, the wheel shield 912 can be connected to the side panel 512 through a snap-fit engagement between the snap fasteners 920 and the notches 922. Accordingly, to install the wheel shield 912, the wheel shield 912 is first connected to the side panel 512, then the idler gear 904 is placed over the integral post 906. The idler gear 904 can include a rivet fastener 924 (e.g., a "Christmas tree" fastener or retainer) that connects with the post 906, securing the idler gear 904 in place, and allowing the idler gear 904 to rotate about the post 906. Once the wheel shield 912 and idler gear 904 are connected, the wheel 910 can be installed. When connected, the wheel shield 912 is positioned between the side panel 512 and the idler gear 904, allowing the idler gear 904 to engage the gear teeth 908C of the wheel 902.

The wheel shield 912 falls on a plain between the side panel 512 and the wheel 902. To assemble the wheel 902 and the wheel shield 912 with the cleaner 900, the wheel shield 912 is first directly snapped onto the side panel 512. This can be through an engagement between the snap fasteners 920 and the notches 922. The wheel bushing 610 is then inserted into the side panel 512, and the idler gear 904 is inserted onto the post 906, which is integral with the side panel 512. A user then connects the plastic rivet fastener 924 with the post 906 to fasten the idler gear 904 to the post 906 of the side panel 512. Next, the wheel 902 is inserted into the wheel bushing 610, allowing the idler gear 904 to interface with the outwardly facing gear teeth 908C of the wheel 902. The wheel hub 620 is then inserted into the side panel 512 from the back, and the wheel hub cap 640 is inserted through the wheel 902 and snaps into the wheel hub 620 to secure the assembly in place on the side panel 512. Once the assembly is in place on the side panel 512, the wheel trim or styling 836 can be inserted onto the wheel 902.

The wheel shield 912 functions as a safety device by providing a safety barrier between the gear drive system 700, and all components thereof, and a user. That is, the wheel shield 912 restricts a user from directly contacting the rotating parts of the cleaner 900 that could pinch fingers, tangle hair, or otherwise cause bodily harm. Additionally, the wheel shield 912 limits the potential for pinching of a user's fingers between the wheel 910 and the side panel 512. The wheel shield 912 also limits the amount of debris that can enter the space containing the rotating gear drive system 700. Egress of debris into the rotating gear drive system 700 can cause failure of the cleaner, as well creates excessive wear. Accordingly, the wheel shield 912 prolongs the life of the cleaner 900. Also, the wheel shield 912 covers the inner workings of the drive gear system 700 of the cleaner 900, thus visually blocking them from a user beneficially.

Although the teachings herein have been described with reference to exemplary embodiments and implementations thereof, the disclosed systems and methods are not limited to such exemplary embodiments/implementations. Rather, as will be readily apparent to persons skilled in the art from the description taught herein, the disclosed systems and methods are susceptible to modifications, alterations and enhancements without departing from the spirit or scope hereof. Accordingly, all such modifications, alterations and enhancements within the scope hereof are encompassed herein.

What is claimed is:

1. In a pool or spa cleaner having a wheel assembly, the improvement comprising:
    a housing assembly with a side panel;
    a wheel having a wheel base (a) receiving in slots formed therein an interchangeable trim and (b) secured to a tire or an interchangeable tread;
    a wheel bushing and a wheel hub operatively coupled to each other and relative to the side panel, said wheel bushing and wheel hub defining a wheel race; and
    a wheel hub cap for securing the wheel to the wheel race.

2. The cleaner of claim 1, wherein the wheel hub cap is interchangeable.

3. The cleaner of claim 2, wherein said wheel hub cap includes at least one cleaner feature means for cleaning.

4. A pool or spa cleaner having a wheel assembly comprising:
    a housing assembly with a side panel;
    a wheel having an interchangeable trim;
    a wheel bushing and a wheel hub operatively coupled to each other and relative to the side panel, said wheel bushing and wheel hub defining a wheel race; and
    a wheel hub cap for securing the wheel to the wheel race;
    wherein the wheel bushing and the wheel hub each include a flange, wherein the flanges are inserted in opposite directions through an aperture in the side panel of the housing assembly so as to define the wheel race.

5. A pool or spa cleaner having a wheel assembly comprising:
    a housing assembly with a side panel;
    a wheel having an interchangeable trim;
    a wheel bushing and a wheel hub operatively coupled to each other and relative to the side panel, said wheel bushing and wheel hub defining a wheel race; and
    a wheel hub cab for securing the wheel to the wheel race;

wherein the wheel hub cap includes a flange including one or more deflectable arms for locking the wheel hub cap into place with respect to an aperture in the wheel bushing.

* * * * *